US011495218B2

(12) United States Patent
Newendorp et al.

(10) Patent No.: US 11,495,218 B2
(45) Date of Patent: Nov. 8, 2022

(54) VIRTUAL ASSISTANT OPERATION IN MULTI-DEVICE ENVIRONMENTS

(71) Applicant: Apple Inc., Cupertino, CA (US)

(72) Inventors: Brandon J. Newendorp, San Francisco, CA (US); Anumita Biswas, Santa Clara, CA (US); Gagan A. Gupta, Portage, MI (US); Benjamin S. Phipps, San Francisco, CA (US); Kisun You, Campbell, CA (US)

(73) Assignee: Apple Inc., Cupertino, CA (US)

( * ) Notice: Subject to any disclaimer, the term of this patent is extended or adjusted under 35 U.S.C. 154(b) by 484 days.

(21) Appl. No.: 16/119,576

(22) Filed: Aug. 31, 2018

(65) Prior Publication Data

US 2019/0371315 A1 Dec. 5, 2019

Related U.S. Application Data

(60) Provisional application No. 62/679,660, filed on Jun. 1, 2018.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
USPC .............................. 704/235, 231; 705/1–504
See application file for complete search history.

(56) References Cited

U.S. PATENT DOCUMENTS 7,315,809 B2 1/2008 Xun
7,315,818 B2 1/2008 Stevens et al.
(Continued)

FOREIGN PATENT DOCUMENTS

AU 2015203483 A1 7/2015
CA 2694314 A1 8/2010
(Continued)

OTHER PUBLICATIONS

Search Report received for Danish Patent Application No. PA201870355, dated Sep. 13, 2018, 9 pages.
(Continued)

*Primary Examiner* — Marcus T Riley
(74) *Attorney, Agent, or Firm* — Dentons US LLP

(57) ABSTRACT

Systems and processes for providing a virtual assistant service are provided. In accordance with one or more examples, a method includes receiving, from an accessory device communicatively coupled to the first electronic device, a representation of a speech input representing a user request. The method further includes detecting a second electronic device and transmitting, from the first electronic device, a representation of the user request and data associated with the detected second electronic device to a third electronic device. The method further includes receiving, from the third electronic device, a determination of whether a task is to be performed by the second electronic device in accordance with the user request; and in accordance with a determination that a task is to be performed by the second electronic device, requesting the second electronic device to performed the task in accordance with the user request.

43 Claims, 28 Drawing Sheets

(51) Int. Cl.
*G10L 15/30* (2013.01)
*G10L 15/18* (2013.01)
*H04L 67/10* (2022.01)

(52) U.S. Cl.
CPC ........ *G10L 15/30* (2013.01); *G10L 2015/223* (2013.01); *H04L 67/10* (2013.01)

(56) References Cited

U.S. PATENT DOCUMENTS 7,318,020 B1 1/2008 Kim
7,319,957 B2 1/2008 Robinson et al.
7,321,783 B2 1/2008 Kim
7,322,023 B2 1/2008 Shulman et al.
7,324,833 B2 1/2008 White et al.
7,324,947 B2 1/2008 Jordan et al.
7,328,155 B2 2/2008 Endo et al.
7,328,250 B2 2/2008 Wang et al.
7,333,998 B2 2/2008 Heckerman et al.
7,337,108 B2 2/2008 Florencio et al.
7,345,670 B2 3/2008 Armstrong
7,345,671 B2 3/2008 Robbin et al.
7,349,953 B2 3/2008 Lisitsa et al.
7,353,139 B1 4/2008 Burrell et al.
7,356,748 B2 4/2008 Taleb
7,359,493 B1 4/2008 Wang et al.
7,359,671 B2 4/2008 Richenstein et al.
7,359,851 B2 4/2008 Tong et al.
7,360,158 B1 4/2008 Beeman
7,362,738 B2 4/2008 Taube et al.
7,363,227 B2 4/2008 Mapes-Riordan et al.
7,363,586 B1 4/2008 Briggs et al.
7,365,260 B2 4/2008 Kawashima
7,366,461 B1 4/2008 Brown
7,369,984 B2 5/2008 Fairweather
7,369,993 B1 5/2008 Atal
7,373,291 B2 5/2008 Garst
7,373,612 B2 5/2008 Risch et al.
7,376,556 B2 5/2008 Bennett
7,376,632 B1 5/2008 Sadek et al.
7,376,645 B2 5/2008 Bernard
7,378,963 B1 5/2008 Begault et al.
7,379,874 B2 5/2008 Schmid et al.
7,380,203 B2 5/2008 Keely et al.
7,383,170 B2 6/2008 Mills et al.
7,386,110 B2 6/2008 Petrunka et al.
7,386,438 B1 6/2008 Franz et al.
7,386,449 B2 6/2008 Sun et al.
7,386,799 B1 6/2008 Clanton et al.
7,389,224 B1 6/2008 Elworthy
7,389,225 B1 6/2008 Jensen et al.
7,392,185 B2 6/2008 Bennett
7,394,947 B2 7/2008 Li et al.
7,398,209 B2 7/2008 Kennewick et al.
7,401,300 B2 7/2008 Nurmi
7,403,938 B2 7/2008 Harrison et al.
7,403,941 B2 7/2008 Bedworth et al.
7,404,143 B2 7/2008 Freelander et al.
7,409,337 B1 8/2008 Potter et al.
7,409,347 B1 8/2008 Bellegarda
7,412,389 B2 8/2008 Yang
7,412,470 B2 8/2008 Masuno et al.
7,415,100 B2 8/2008 Cooper et al.
7,415,469 B2 8/2008 Singh et al.
7,418,382 B1 8/2008 Maes
7,418,389 B2 8/2008 Chu et al.
7,418,392 B1 8/2008 Mozer et al.
7,426,467 B2 9/2008 Nashida et al.
7,426,468 B2 9/2008 Coifman et al.
7,427,024 B1 9/2008 Gazdzinski et al.
7,428,541 B2 9/2008 Houle
7,430,508 B2 9/2008 Williamson et al.
7,433,869 B2 10/2008 Gollapudi
7,433,921 B2 10/2008 Ludwig et al.
7,436,947 B2 10/2008 Wadler et al.
7,441,184 B2 10/2008 Frerebeau et al.
7,443,316 B2 10/2008 Lim
7,444,589 B2 10/2008 Zellner
7,447,360 B2 11/2008 Li et al.
7,447,624 B2 11/2008 Fuhrmann et al.
7,447,635 B1 11/2008 Konopka et al.
7,447,637 B1 11/2008 Grant et al.
7,451,081 B1 11/2008 Gajic et al.
7,454,351 B2 11/2008 Jeschke et al.
7,460,652 B2 12/2008 Chang
7,461,043 B2 12/2008 Hess
7,467,087 B1 12/2008 Gillick et al.
7,467,164 B2 12/2008 Marsh
7,472,061 B1 12/2008 Alewine et al.
7,472,065 B2 12/2008 Aaron et al.
7,475,010 B2 1/2009 Chao
7,475,015 B2 1/2009 Epstein et al.
7,475,063 B2 1/2009 Datta et al.
7,477,238 B2 1/2009 Fux et al.
7,477,240 B2 1/2009 Yanagisawa
7,478,037 B2 1/2009 Strong
7,478,091 B2 1/2009 Mojsilovic et al.
7,478,129 B1 1/2009 Chemtob
7,479,948 B2 1/2009 Kim et al.
7,479,949 B2 1/2009 Jobs et al.
7,483,832 B2 1/2009 Tischer
7,483,894 B2 1/2009 Cao
7,487,089 B2 2/2009 Mozer
7,487,093 B2 2/2009 Mutsuno et al.
7,490,034 B2 2/2009 Finnigan et al.
7,490,039 B1 2/2009 Shaffer et al.
7,493,251 B2 2/2009 Gao et al.
7,493,560 B1 2/2009 Kipnes et al.
7,496,498 B2 2/2009 Chu et al.
7,496,512 B2 2/2009 Zhao et al.
7,499,923 B2 3/2009 Kawatani
7,502,738 B2 3/2009 Kennewick et al.
7,505,795 B1 3/2009 Lim et al.
7,508,324 B2 3/2009 Suraqui
7,508,373 B2 3/2009 Lin et al.
7,516,123 B2 4/2009 Betz et al.
7,519,327 B2 4/2009 White
7,519,398 B2 4/2009 Hirose
7,522,927 B2 4/2009 Fitch et al.
7,523,036 B2 4/2009 Akabane et al.
7,523,108 B2 4/2009 Cao
7,526,466 B2 4/2009 Au
7,526,738 B2 4/2009 Ording et al.
7,528,713 B2 5/2009 Singh et al.
7,529,671 B2 5/2009 Rockenbeck et al.
7,529,676 B2 5/2009 Koyama
7,535,997 B1 5/2009 McQuaide, Jr. et al.
7,536,029 B2 5/2009 Choi et al.
7,536,565 B2 5/2009 Girish et al.
7,538,685 B1 5/2009 Cooper et al.
7,539,619 B1 5/2009 Seligman et al.
7,539,656 B2 5/2009 Fratkina et al.
7,541,940 B2 6/2009 Upton
7,542,967 B2 6/2009 Hurst-Hiller et al.
7,542,971 B2 6/2009 Thione et al.
7,543,232 B2 6/2009 Easton, Jr. et al.
7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.
7,558,381 B1 7/2009 Ali et al.
7,558,730 B2 7/2009 Davis et al.
7,559,026 B2 7/2009 Girish et al.
7,561,069 B2 7/2009 Horstemeyer
7,562,007 B2 7/2009 Hwang, II
7,562,032 B2 7/2009 Abbosh et al.
7,565,104 B1 7/2009 Brown et al.
7,565,380 B1 7/2009 Venkatachary
7,568,151 B2 7/2009 Bargeron et al.
7,571,092 B1 8/2009 Nieh
7,571,106 B2 8/2009 Cao et al.
7,577,522 B2 8/2009 Rosenberg

(56) References Cited

U.S. PATENT DOCUMENTS

| | | | |
|---|---|---|---|
| 7,580,551 | B1 | 8/2009 | Srihari et al. |
| 7,580,576 | B2 | 8/2009 | Wang et al. |
| 7,580,839 | B2 | 8/2009 | Tamura et al. |
| 7,584,092 | B2 | 9/2009 | Brockett et al. |
| 7,584,093 | B2 | 9/2009 | Potter et al. |
| 7,584,278 | B2 | 9/2009 | Rajarajan et al. |
| 7,584,429 | B2 | 9/2009 | Fabritius |
| 7,593,868 | B2 | 9/2009 | Margiloff et al. |
| 7,596,269 | B2 | 9/2009 | King et al. |
| 7,596,499 | B2 | 9/2009 | Anguera et al. |
| 7,596,606 | B2 | 9/2009 | Codignotto |
| 7,596,765 | B2 | 9/2009 | Almas |
| 7,599,918 | B2 | 10/2009 | Shen et al. |
| 7,603,349 | B1 | 10/2009 | Kraft et al. |
| 7,603,381 | B2 | 10/2009 | Burke et al. |
| 7,606,444 | B1 | 10/2009 | Erol et al. |
| 7,607,083 | B2 | 10/2009 | Gong et al. |
| 7,609,179 | B2 | 10/2009 | Diaz-Gutierrez et al. |
| 7,610,258 | B2 | 10/2009 | Yuknewicz et al. |
| 7,613,264 | B2 | 11/2009 | Wells et al. |
| 7,614,008 | B2 | 11/2009 | Ording |
| 7,617,094 | B2 | 11/2009 | Aoki et al. |
| 7,620,407 | B1 | 11/2009 | Donald et al. |
| 7,620,549 | B2 | 11/2009 | Di Cristo et al. |
| 7,620,894 | B1 | 11/2009 | Kahn |
| 7,623,119 | B2 | 11/2009 | Autio et al. |
| 7,624,007 | B2 | 11/2009 | Bennett |
| 7,627,481 | B1 | 12/2009 | Kuo et al. |
| 7,630,900 | B1 | 12/2009 | Strom |
| 7,630,901 | B2 | 12/2009 | Omi |
| 7,633,076 | B2 | 12/2009 | Huppi et al. |
| 7,634,409 | B2 | 12/2009 | Kennewick et al. |
| 7,634,413 | B1 | 12/2009 | Kuo et al. |
| 7,634,718 | B2 | 12/2009 | Nakajima |
| 7,634,732 | B1 | 12/2009 | Blagsvedt et al. |
| 7,636,657 | B2 | 12/2009 | Ju et al. |
| 7,640,158 | B2 | 12/2009 | Detlef et al. |
| 7,640,160 | B2 | 12/2009 | Di Cristo et al. |
| 7,643,990 | B1 | 1/2010 | Bellegarda |
| 7,647,225 | B2 | 1/2010 | Bennett et al. |
| 7,649,454 | B2 | 1/2010 | Singh et al. |
| 7,649,877 | B2 | 1/2010 | Vieri et al. |
| 7,653,883 | B2 | 1/2010 | Hotelling et al. |
| 7,656,393 | B2 | 2/2010 | King et al. |
| 7,657,424 | B2 | 2/2010 | Bennett |
| 7,657,828 | B2 | 2/2010 | Lucas et al. |
| 7,657,844 | B2 | 2/2010 | Gibson et al. |
| 7,657,849 | B2 | 2/2010 | Chaudhri et al. |
| 7,660,715 | B1 | 2/2010 | Thambiratnam |
| 7,663,607 | B2 | 2/2010 | Hotelling et al. |
| 7,664,558 | B2 | 2/2010 | Lindahl et al. |
| 7,664,638 | B2 | 2/2010 | Cooper et al. |
| 7,668,710 | B2 | 2/2010 | Doyle |
| 7,669,134 | B1 | 2/2010 | Christie et al. |
| 7,672,841 | B2 | 3/2010 | Bennett |
| 7,672,952 | B2 | 3/2010 | Isaacson et al. |
| 7,673,238 | B2 | 3/2010 | Girish et al. |
| 7,673,251 | B1 | 3/2010 | Wibisono |
| 7,673,340 | B1 | 3/2010 | Cohen et al. |
| 7,676,026 | B1 | 3/2010 | Baxter, Jr. |
| 7,676,365 | B2 | 3/2010 | Hwang et al. |
| 7,676,463 | B2 | 3/2010 | Thompson et al. |
| 7,679,534 | B2 | 3/2010 | Kay et al. |
| 7,680,649 | B2 | 3/2010 | Park |
| 7,681,126 | B2 | 3/2010 | Roose |
| 7,683,886 | B2 | 3/2010 | Willey |
| 7,683,893 | B2 | 3/2010 | Kim |
| 7,684,985 | B2 | 3/2010 | Dominach et al. |
| 7,684,990 | B2 | 3/2010 | Caskey et al. |
| 7,684,991 | B2 | 3/2010 | Stohr et al. |
| 7,689,245 | B2 | 3/2010 | Cox et al. |
| 7,689,408 | B2 | 3/2010 | Chen et al. |
| 7,689,409 | B2 | 3/2010 | Heinecke |
| 7,689,412 | B2 | 3/2010 | Wu et al. |
| 7,689,421 | B2 | 3/2010 | Li et al. |
| 7,693,715 | B2 | 4/2010 | Hwang et al. |
| 7,693,717 | B2 | 4/2010 | Kahn et al. |
| 7,693,719 | B2 | 4/2010 | Chu et al. |
| 7,693,720 | B2 | 4/2010 | Kennewick et al. |
| 7,698,131 | B2 | 4/2010 | Bennett |
| 7,702,500 | B2 | 4/2010 | Blaedow |
| 7,702,508 | B2 | 4/2010 | Bennett |
| 7,703,091 | B1 | 4/2010 | Martin et al. |
| 7,706,510 | B2 | 4/2010 | Ng |
| 7,707,026 | B2 | 4/2010 | Liu |
| 7,707,027 | B2 | 4/2010 | Balchandran et al. |
| 7,707,032 | B2 | 4/2010 | Wang et al. |
| 7,707,221 | B1 | 4/2010 | Dunning et al. |
| 7,707,226 | B1 | 4/2010 | Tonse |
| 7,707,267 | B2 | 4/2010 | Lisitsa et al. |
| 7,710,262 | B2 | 5/2010 | Ruha |
| 7,711,129 | B2 | 5/2010 | Lindahl et al. |
| 7,711,550 | B1 | 5/2010 | Feinberg et al. |
| 7,711,565 | B1 | 5/2010 | Gazdzinski |
| 7,711,672 | B2 | 5/2010 | Au |
| 7,712,053 | B2 | 5/2010 | Bradford et al. |
| 7,716,056 | B2 | 5/2010 | Weng et al. |
| 7,716,216 | B1 | 5/2010 | Harik et al. |
| 7,720,674 | B2 | 5/2010 | Kaiser et al. |
| 7,720,683 | B1 | 5/2010 | Vermeulen et al. |
| 7,721,226 | B2 | 5/2010 | Barabe et al. |
| 7,721,301 | B2 | 5/2010 | Wong et al. |
| 7,724,242 | B2 | 5/2010 | Hillis et al. |
| 7,724,696 | B1 | 5/2010 | Parekh |
| 7,725,307 | B2 | 5/2010 | Bennett |
| 7,725,318 | B2 | 5/2010 | Gavalda et al. |
| 7,725,320 | B2 | 5/2010 | Bennett |
| 7,725,321 | B2 | 5/2010 | Bennett |
| 7,725,838 | B2 | 5/2010 | Williams |
| 7,729,904 | B2 | 6/2010 | Bennett |
| 7,729,916 | B2 | 6/2010 | Coffman et al. |
| 7,734,461 | B2 | 6/2010 | Kwak et al. |
| 7,735,012 | B2 | 6/2010 | Naik |
| 7,739,588 | B2 | 6/2010 | Reynar et al. |
| 7,742,953 | B2 | 6/2010 | King et al. |
| 7,743,188 | B2 | 6/2010 | Haitani et al. |
| 7,747,616 | B2 | 6/2010 | Yamada et al. |
| 7,752,152 | B2 | 7/2010 | Paek et al. |
| 7,756,707 | B2 | 7/2010 | Garner et al. |
| 7,756,708 | B2 | 7/2010 | Cohen et al. |
| 7,756,868 | B2 | 7/2010 | Lee |
| 7,756,871 | B2 | 7/2010 | Yacoub et al. |
| 7,757,173 | B2 | 7/2010 | Beaman |
| 7,757,182 | B2 | 7/2010 | Elliott et al. |
| 7,761,296 | B1 | 7/2010 | Bakis et al. |
| 7,763,842 | B2 | 7/2010 | Hsu et al. |
| 7,774,202 | B2 | 8/2010 | Spengler et al. |
| 7,774,204 | B2 | 8/2010 | Mozer et al. |
| 7,774,388 | B1 | 8/2010 | Runchey |
| 7,777,717 | B2 | 8/2010 | Fux et al. |
| 7,778,432 | B2 | 8/2010 | Larsen |
| 7,778,595 | B2 | 8/2010 | White et al. |
| 7,778,632 | B2 | 8/2010 | Kurlander et al. |
| 7,778,830 | B2 | 8/2010 | Davis et al. |
| 7,779,353 | B2 | 8/2010 | Grigoriu et al. |
| 7,779,356 | B2 | 8/2010 | Griesmer |
| 7,779,357 | B2 | 8/2010 | Naik |
| 7,783,283 | B2 | 8/2010 | Kuusinen et al. |
| 7,783,486 | B2 | 8/2010 | Rosser et al. |
| 7,788,590 | B2 | 8/2010 | Taboada et al. |
| 7,788,663 | B2 | 8/2010 | Illowsky et al. |
| 7,796,980 | B1 | 9/2010 | McKinney et al. |
| 7,797,265 | B2 | 9/2010 | Brinker et al. |
| 7,797,269 | B2 | 9/2010 | Rieman et al. |
| 7,797,331 | B2 | 9/2010 | Theimer et al. |
| 7,797,629 | B2 | 9/2010 | Fux et al. |
| 7,801,721 | B2 | 9/2010 | Rosart et al. |
| 7,801,728 | B2 | 9/2010 | Ben-David et al. |
| 7,801,729 | B2 | 9/2010 | Mozer |
| 7,805,299 | B2 | 9/2010 | Coifman |
| 7,809,550 | B1 | 10/2010 | Barrows |
| 7,809,565 | B2 | 10/2010 | Coifman |
| 7,809,569 | B2 | 10/2010 | Attwater et al. |
| 7,809,570 | B2 | 10/2010 | Kennewick et al. |

(56) References Cited

U.S. PATENT DOCUMENTS 7,809,610 B2 10/2010 Cao
7,809,744 B2 10/2010 Nevidomski et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.
7,836,437 B2 11/2010 Kacmarcik
7,840,348 B2 11/2010 Kim et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,865,817 B2 1/2011 Ryan et al.
7,869,998 B1 1/2011 Di Fabbrizio et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,936,339 B2 5/2011 Marggraff et al.
7,936,861 B2 5/2011 Martin et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 Lange et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,363 B2 10/2011 Cha et al.
8,046,374 B1 10/2011 Bromwich et al.
8,050,500 B1 11/2011 Batty et al.
8,054,180 B1 11/2011 Scofield et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longe et al.

(56) References Cited

U.S. PATENT DOCUMENTS 8,099,289 B2 1/2012 Mozer et al.
8,099,395 B2 1/2012 Pabla et al.
8,099,418 B2 1/2012 Inoue et al.
8,103,510 B2 1/2012 Sato
8,107,401 B2 1/2012 John et al.
8,112,275 B2 2/2012 Kennewick et al.
8,112,280 B2 2/2012 Lu
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,247 B2 9/2012 Lazaridis et al.
8,260,617 B2 9/2012 Dhanakshirur et al.
8,270,933 B2 9/2012 Riemer et al.
8,271,287 B1 9/2012 Kermani
8,275,621 B2 9/2012 Alewine et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,401,163 B1 3/2013 Kirchhoff et al.
8,406,745 B1 3/2013 Upadhyay et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,442,821 B1 5/2013 Vanhoucke
8,447,612 B2 5/2013 Gazdzinski
8,452,597 B2 5/2013 Bringert et al.
8,457,959 B2 6/2013 Kaiser
8,458,115 B2 6/2013 Cai et al.
8,458,278 B2 6/2013 Christie et al.
8,464,150 B2 6/2013 Davidson et al.
8,473,289 B2 6/2013 Jitkoff et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,750 B1 8/2013 Lei et al.
8,521,513 B2 8/2013 Millett et al.
8,521,531 B1 8/2013 Kim
8,527,276 B1 9/2013 Senior et al.
8,537,033 B2 9/2013 Gueziec
8,543,398 B1 9/2013 Strope et al.
8,560,229 B1 10/2013 Park et al.
8,571,851 B1 10/2013 Tickner et al.
8,583,416 B2 11/2013 Huang et al.
8,583,511 B2 11/2013 Hendrickson
8,589,869 B2 11/2013 Wolfram
8,589,911 B1 11/2013 Sharkey et al.
8,595,004 B2 11/2013 Koshinaka
8,600,743 B2 12/2013 Lindahl et al.
8,600,930 B2 12/2013 Sata et al.
8,606,568 B1 12/2013 Tickner et al.
8,620,659 B2 12/2013 Di Cristo et al.
8,620,662 B2 12/2013 Bellegarda
8,626,681 B1 1/2014 Jurca et al.

(56) References Cited

U.S. PATENT DOCUMENTS 8,638,363 B2 1/2014 King et al.
8,639,516 B2 1/2014 Lindahl et al.
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,687,777 B1 4/2014 Lavian et al.
8,688,446 B2 4/2014 Yanagihara
8,688,453 B1 4/2014 Joshi et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,931 B2 7/2014 Fux et al.
8,781,456 B2 7/2014 Prociw
8,781,841 B1 7/2014 Wang
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,302 B2 8/2014 Xiao et al.
8,838,457 B2 9/2014 Cerra et al.
8,855,915 B2 10/2014 Furuhata et al.
8,861,925 B1 10/2014 Ohme
8,862,252 B2 10/2014 Rottler et al.
8,868,409 B1 10/2014 Mengibar et al.
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 * 11/2014 Cheyer .................. G10L 21/06
704/251
8,893,023 B2 11/2014 Perry et al.
8,898,568 B2 11/2014 Bull et al.
8,903,716 B2 12/2014 Chen et al.
8,909,693 B2 12/2014 Frissora et al.
8,930,176 B2 1/2015 Li et al.
8,930,191 B2 1/2015 Gruber et al.
8,938,394 B1 1/2015 Faaborg et al.
8,938,688 B2 1/2015 Bradford et al.
8,942,986 B2 1/2015 Cheyer et al.
8,943,423 B2 1/2015 Merrill et al.
8,972,240 B2 3/2015 Brockett et al.
8,972,432 B2 3/2015 Shaw et al.
8,972,878 B2 3/2015 Mohler et al.
8,983,383 B1 3/2015 Haskin
8,989,713 B2 3/2015 Doulton
8,990,235 B2 3/2015 King et al.
8,994,660 B2 3/2015 Neels et al.
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,009,046 B1 4/2015 Stewart
9,020,804 B2 4/2015 Barbaiani et al.
9,026,425 B2 5/2015 Nikoulina et al.
9,031,834 B2 5/2015 Coorman et al.
9,037,967 B1 5/2015 Al-Jefri et al.
9,043,208 B2 5/2015 Koch et al.
9,049,255 B2 6/2015 MacFarlane et al.
9,049,295 B1 6/2015 Cooper et al.
9,053,706 B2 6/2015 Jitkoff et al.
9,058,811 B2 6/2015 Wang et al.
9,063,979 B2 6/2015 Chiu et al.
9,070,366 B1 6/2015 Mathias et al.
9,071,701 B2 6/2015 Donaldson et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,171,541 B2 10/2015 Kennewick et al.
9,171,546 B1 10/2015 Pike
9,190,062 B2 11/2015 Haughay
9,208,153 B1 12/2015 Zaveri et al.
9,218,809 B2 12/2015 Bellegarda
9,218,819 B1 12/2015 Stekkelpak et al.
9,223,537 B2 12/2015 Brown et al.
9,255,812 B2 2/2016 Maeoka et al.
9,258,604 B1 2/2016 Bilobrov et al.
9,262,612 B2 2/2016 Cheyer
9,286,910 B1 3/2016 Li et al.
9,292,487 B1 3/2016 Weber
9,292,489 B1 3/2016 Sak et al.
9,299,344 B2 3/2016 Braho et al.
9,300,718 B2 3/2016 Khanna
9,305,543 B2 4/2016 Fleizach et al.
9,305,548 B2 4/2016 Kennewick et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,330,659 B2 5/2016 Ju et al.
9,330,720 B2 5/2016 Lee
9,338,493 B2 5/2016 Van Os et al.
9,349,368 B1 5/2016 LeBeau et al.
9,361,084 B1 6/2016 Costa
9,367,541 B1 6/2016 Servan et al.
9,377,871 B2 6/2016 Waddell et al.
9,378,740 B1 6/2016 Rosen et al.
9,380,155 B1 6/2016 Reding et al.
9,390,726 B1 7/2016 Smus et al.
9,396,722 B2 7/2016 Chung et al.
9,401,147 B2 7/2016 Jitkoff et al.
9,406,224 B1 8/2016 Sanders et al.
9,412,392 B2 8/2016 Lindahl
9,423,266 B2 8/2016 Clark et al.
9,436,918 B2 9/2016 Pantel et al.
9,437,186 B1 9/2016 Liu et al.
9,437,189 B2 9/2016 Epstein et al.
9,443,527 B1 * 9/2016 Watanabe ............... G10L 15/30
9,454,957 B1 9/2016 Mathias et al.
9,471,566 B1 10/2016 Zhang et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,535,906 B2 1/2017 Lee et al.

(56) References Cited

U.S. PATENT DOCUMENTS

| | | | |
|---|---|---|---|
| 9,536,527 | B1 | 1/2017 | Carlson |
| 9,547,647 | B2 | 1/2017 | Badaskar |
| 9,548,050 | B2 | 1/2017 | Gruber et al. |
| 9,569,549 | B1 | 2/2017 | Jenkins et al. |
| 9,575,964 | B2 | 2/2017 | Yadgar et al. |
| 9,578,173 | B2 | 2/2017 | Sanghavi et al. |
| 9,607,612 | B2 | 3/2017 | Deleeuw |
| 9,620,113 | B2 | 4/2017 | Kennewick et al. |
| 9,620,126 | B2 | 4/2017 | Chiba |
| 9,626,955 | B2 | 4/2017 | Fleizach et al. |
| 9,633,004 | B2 | 4/2017 | Giuli et al. |
| 9,633,660 | B2 | 4/2017 | Haughay |
| 9,652,453 | B2 | 5/2017 | Mathur et al. |
| 9,658,746 | B2 | 5/2017 | Cohn et al. |
| 9,665,567 | B2 | 5/2017 | Liu et al. |
| 9,668,121 | B2 | 5/2017 | Naik et al. |
| 9,672,725 | B2 | 6/2017 | Dotan-Cohen et al. |
| 9,691,378 | B1 | 6/2017 | Meyers et al. |
| 9,697,827 | B1 | 7/2017 | Lilly et al. |
| 9,720,907 | B2 | 8/2017 | Bangalore et al. |
| 9,723,130 | B2 * | 8/2017 | Rand ..................... H04L 51/046 |
| 9,734,839 | B1 | 8/2017 | Adams |
| 9,741,343 | B1 | 8/2017 | Miles et al. |
| 9,747,083 | B1 | 8/2017 | Roman et al. |
| 9,858,925 | B2 * | 1/2018 | Gruber .................... G10L 15/18 |
| 9,934,785 | B1 | 4/2018 | Hulaud |
| 9,959,129 | B2 * | 5/2018 | Kannan ................... G10L 15/22 |
| 9,967,381 | B1 | 5/2018 | Kashimba et al. |
| 9,990,176 | B1 | 6/2018 | Gray |
| 10,037,758 | B2 | 7/2018 | Jing et al. |
| 10,089,072 | B2 * | 10/2018 | Piersol .................... G10L 15/22 |
| 10,096,319 | B1 | 10/2018 | Jin et al. |
| 10,403,283 | B1 * | 9/2019 | Schramm ............. H04M 3/527 |
| 2008/0001785 | A1 | 1/2008 | Elizarov et al. |
| 2008/0010050 | A1 | 1/2008 | Fux et al. |
| 2008/0010355 | A1 | 1/2008 | Vieri et al. |
| 2008/0010605 | A1 | 1/2008 | Frank et al. |
| 2008/0012950 | A1 | 1/2008 | Lee et al. |
| 2008/0013751 | A1 | 1/2008 | Hiselius |
| 2008/0015863 | A1 | 1/2008 | Agapi et al. |
| 2008/0015864 | A1 | 1/2008 | Ross et al. |
| 2008/0016575 | A1 | 1/2008 | Vincent et al. |
| 2008/0021708 | A1 | 1/2008 | Bennett et al. |
| 2008/0021886 | A1 | 1/2008 | Wang-Aryattanwanich et al. |
| 2008/0022208 | A1 | 1/2008 | Morse |
| 2008/0027711 | A1 | 1/2008 | Rajendran et al. |
| 2008/0027726 | A1 | 1/2008 | Hansen et al. |
| 2008/0031475 | A1 | 2/2008 | Goldstein |
| 2008/0033719 | A1 | 2/2008 | Hall et al. |
| 2008/0033723 | A1 | 2/2008 | Jang et al. |
| 2008/0034032 | A1 | 2/2008 | Healey et al. |
| 2008/0034044 | A1 | 2/2008 | Bhakta et al. |
| 2008/0034081 | A1 | 2/2008 | Marshall et al. |
| 2008/0036743 | A1 | 2/2008 | Westerman et al. |
| 2008/0040339 | A1 | 2/2008 | Zhou et al. |
| 2008/0042970 | A1 | 2/2008 | Liang et al. |
| 2008/0043936 | A1 | 2/2008 | Liebermann |
| 2008/0043943 | A1 | 2/2008 | Sipher et al. |
| 2008/0046239 | A1 | 2/2008 | Boo |
| 2008/0046250 | A1 | 2/2008 | Agapi et al. |
| 2008/0046422 | A1 | 2/2008 | Lee et al. |
| 2008/0046820 | A1 | 2/2008 | Lee et al. |
| 2008/0046948 | A1 | 2/2008 | Verosub |
| 2008/0048908 | A1 | 2/2008 | Sato |
| 2008/0050027 | A1 | 2/2008 | Bashyam et al. |
| 2008/0052063 | A1 | 2/2008 | Bennett et al. |
| 2008/0052073 | A1 | 2/2008 | Goto et al. |
| 2008/0052077 | A1 | 2/2008 | Bennett et al. |
| 2008/0052080 | A1 | 2/2008 | Narayanan et al. |
| 2008/0052262 | A1 | 2/2008 | Kosinov et al. |
| 2008/0055194 | A1 | 3/2008 | Baudino et al. |
| 2008/0056459 | A1 | 3/2008 | Vallier et al. |
| 2008/0056579 | A1 | 3/2008 | Guha |
| 2008/0057922 | A1 | 3/2008 | Kokes et al. |
| 2008/0059190 | A1 | 3/2008 | Chu et al. |
| 2008/0059200 | A1 | 3/2008 | Puli |
| 2008/0059876 | A1 | 3/2008 | Hantler et al. |
| 2008/0062141 | A1 | 3/2008 | Chaudhri |
| 2008/0065382 | A1 | 3/2008 | Gerl et al. |
| 2008/0065387 | A1 | 3/2008 | Cross et al. |
| 2008/0071529 | A1 | 3/2008 | Silverman et al. |
| 2008/0071544 | A1 | 3/2008 | Beaufays et al. |
| 2008/0071742 | A1 | 3/2008 | Yang et al. |
| 2008/0072143 | A1 | 3/2008 | Assadollahi |
| 2008/0075296 | A1 | 3/2008 | Lindahl et al. |
| 2008/0076972 | A1 | 3/2008 | Dorogusker et al. |
| 2008/0077310 | A1 | 3/2008 | Murlidar et al. |
| 2008/0077384 | A1 | 3/2008 | Agapi et al. |
| 2008/0077386 | A1 | 3/2008 | Gao et al. |
| 2008/0077391 | A1 | 3/2008 | Chino et al. |
| 2008/0077393 | A1 | 3/2008 | Gao et al. |
| 2008/0077406 | A1 | 3/2008 | Ganong, III |
| 2008/0077859 | A1 | 3/2008 | Schabes et al. |
| 2008/0079566 | A1 | 4/2008 | Singh et al. |
| 2008/0080411 | A1 | 4/2008 | Cole |
| 2008/0082332 | A1 | 4/2008 | Mallett et al. |
| 2008/0082338 | A1 | 4/2008 | O"Neil et al. |
| 2008/0082390 | A1 | 4/2008 | Hawkins et al. |
| 2008/0082576 | A1 | 4/2008 | Bodin et al. |
| 2008/0082651 | A1 | 4/2008 | Singh et al. |
| 2008/0084974 | A1 | 4/2008 | Dhanakshirur |
| 2008/0085689 | A1 | 4/2008 | Zellner |
| 2008/0086306 | A1 | 4/2008 | Hirota et al. |
| 2008/0091406 | A1 | 4/2008 | Baldwin et al. |
| 2008/0091426 | A1 | 4/2008 | Rempel et al. |
| 2008/0091428 | A1 | 4/2008 | Bellegarda |
| 2008/0091443 | A1 | 4/2008 | Strope et al. |
| 2008/0096531 | A1 | 4/2008 | Mcquaide et al. |
| 2008/0096533 | A1 | 4/2008 | Manfredi et al. |
| 2008/0096726 | A1 | 4/2008 | Riley et al. |
| 2008/0097937 | A1 | 4/2008 | Hadjarian |
| 2008/0098302 | A1 | 4/2008 | Roose |
| 2008/0098480 | A1 | 4/2008 | Henry et al. |
| 2008/0100579 | A1 | 5/2008 | Robinson et al. |
| 2008/0101584 | A1 | 5/2008 | Gray et al. |
| 2008/0103774 | A1 | 5/2008 | White |
| 2008/0109222 | A1 | 5/2008 | Liu |
| 2008/0109402 | A1 | 5/2008 | Wang et al. |
| 2008/0114480 | A1 | 5/2008 | Harb |
| 2008/0114598 | A1 | 5/2008 | Prieto et al. |
| 2008/0114604 | A1 | 5/2008 | Wei et al. |
| 2008/0114841 | A1 | 5/2008 | Lambert |
| 2008/0115084 | A1 | 5/2008 | Scott et al. |
| 2008/0118143 | A1 | 5/2008 | Gordon et al. |
| 2008/0119953 | A1 | 5/2008 | Reed |
| 2008/0120102 | A1 | 5/2008 | Rao |
| 2008/0120112 | A1 | 5/2008 | Jordan et al. |
| 2008/0120196 | A1 | 5/2008 | Reed et al. |
| 2008/0120311 | A1 | 5/2008 | Reed |
| 2008/0120312 | A1 | 5/2008 | Reed |
| 2008/0120330 | A1 | 5/2008 | Reed |
| 2008/0120342 | A1 | 5/2008 | Reed et al. |
| 2008/0122796 | A1 | 5/2008 | Jobs et al. |
| 2008/0124695 | A1 | 5/2008 | Myers et al. |
| 2008/0126075 | A1 | 5/2008 | Thorn et al. |
| 2008/0126077 | A1 | 5/2008 | Thorn |
| 2008/0126091 | A1 | 5/2008 | Clark et al. |
| 2008/0126093 | A1 | 5/2008 | Sivadas |
| 2008/0126100 | A1 | 5/2008 | Grost et al. |
| 2008/0126491 | A1 | 5/2008 | Portele et al. |
| 2008/0129520 | A1 | 6/2008 | Lee |
| 2008/0130867 | A1 | 6/2008 | Bowen |
| 2008/0131006 | A1 | 6/2008 | Oliver |
| 2008/0132221 | A1 | 6/2008 | Willey et al. |
| 2008/0132295 | A1 | 6/2008 | Horowitz |
| 2008/0133215 | A1 | 6/2008 | Sarukkai |
| 2008/0133228 | A1 | 6/2008 | Rao |
| 2008/0133230 | A1 | 6/2008 | Herforth et al. |
| 2008/0133241 | A1 | 6/2008 | Baker et al. |
| 2008/0133244 | A1 | 6/2008 | Bodin et al. |
| 2008/0133245 | A1 | 6/2008 | Proulx et al. |
| 2008/0133479 | A1 | 6/2008 | Zelevinsky et al. |
| 2008/0133956 | A1 | 6/2008 | Fadell |
| 2008/0140413 | A1 | 6/2008 | Millman et al. |

(56) References Cited

U.S. PATENT DOCUMENTS

| | | | |
|---|---|---|---|
| 2008/0140415 | A1 | 6/2008 | Shostak |
| 2008/0140416 | A1 | 6/2008 | Shostak |
| 2008/0140652 | A1 | 6/2008 | Millman et al. |
| 2008/0140657 | A1 | 6/2008 | Azvine et al. |
| 2008/0140702 | A1 | 6/2008 | Reed et al. |
| 2008/0141125 | A1 | 6/2008 | Ghassabian et al. |
| 2008/0141180 | A1 | 6/2008 | Reed et al. |
| 2008/0141182 | A1 | 6/2008 | Barsness et al. |
| 2008/0146245 | A1 | 6/2008 | Appaji |
| 2008/0146290 | A1 | 6/2008 | Sreeram et al. |
| 2008/0147408 | A1 | 6/2008 | Da Palma et al. |
| 2008/0147411 | A1 | 6/2008 | Dames et al. |
| 2008/0147874 | A1 | 6/2008 | Yoneda et al. |
| 2008/0150900 | A1 | 6/2008 | Han |
| 2008/0154577 | A1 | 6/2008 | Kim et al. |
| 2008/0154599 | A1 | 6/2008 | Muschett et al. |
| 2008/0154600 | A1 | 6/2008 | Tian et al. |
| 2008/0154603 | A1 | 6/2008 | Oddo |
| 2008/0154612 | A1 | 6/2008 | Evermann et al. |
| 2008/0154828 | A1 | 6/2008 | Antebi et al. |
| 2008/0157867 | A1 | 7/2008 | Krah |
| 2008/0161113 | A1 | 7/2008 | Hansen et al. |
| 2008/0162120 | A1 | 7/2008 | Mactavish et al. |
| 2008/0162137 | A1 | 7/2008 | Saitoh et al. |
| 2008/0162471 | A1 | 7/2008 | Bernard |
| 2008/0163119 | A1 | 7/2008 | Kim et al. |
| 2008/0163131 | A1 | 7/2008 | Hirai et al. |
| 2008/0165144 | A1 | 7/2008 | Forstall et al. |
| 2008/0165980 | A1 | 7/2008 | Pavlovic et al. |
| 2008/0165994 | A1 | 7/2008 | Caren et al. |
| 2008/0167013 | A1 | 7/2008 | Novick et al. |
| 2008/0167858 | A1 | 7/2008 | Christie et al. |
| 2008/0167876 | A1 | 7/2008 | Bakis et al. |
| 2008/0168052 | A1 | 7/2008 | Ott et al. |
| 2008/0168144 | A1 | 7/2008 | Lee |
| 2008/0168366 | A1 | 7/2008 | Kocienda et al. |
| 2008/0172698 | A1 | 7/2008 | Berger et al. |
| 2008/0183473 | A1 | 7/2008 | Nagano et al. |
| 2008/0186960 | A1 | 8/2008 | Kocheisen et al. |
| 2008/0189099 | A1 | 8/2008 | Friedman et al. |
| 2008/0189106 | A1 | 8/2008 | Low et al. |
| 2008/0189110 | A1 | 8/2008 | Freeman et al. |
| 2008/0189114 | A1 | 8/2008 | Fail et al. |
| 2008/0189360 | A1 | 8/2008 | Kiley et al. |
| 2008/0189606 | A1 | 8/2008 | Rybak |
| 2008/0195312 | A1 | 8/2008 | Aaron et al. |
| 2008/0195388 | A1 | 8/2008 | Bower et al. |
| 2008/0195391 | A1 | 8/2008 | Marple et al. |
| 2008/0195601 | A1 | 8/2008 | Ntoulas et al. |
| 2008/0195630 | A1 | 8/2008 | Exartier et al. |
| 2008/0195940 | A1 | 8/2008 | Gail et al. |
| 2008/0200142 | A1 | 8/2008 | Abdel-Kader et al. |
| 2008/0201000 | A1 | 8/2008 | Heikkila et al. |
| 2008/0201306 | A1 | 8/2008 | Cooper et al. |
| 2008/0201375 | A1 | 8/2008 | Khedouri et al. |
| 2008/0201434 | A1 | 8/2008 | Holmes et al. |
| 2008/0204379 | A1 | 8/2008 | Perez-Noguera |
| 2008/0207176 | A1 | 8/2008 | Brackbill et al. |
| 2008/0208585 | A1 | 8/2008 | Ativanichayaphong et al. |
| 2008/0208587 | A1 | 8/2008 | Ben-David et al. |
| 2008/0208864 | A1 | 8/2008 | Cucerzan et al. |
| 2008/0212796 | A1 | 9/2008 | Denda |
| 2008/0219641 | A1 | 9/2008 | Sandrew et al. |
| 2008/0221866 | A1 | 9/2008 | Katragadda et al. |
| 2008/0221879 | A1 | 9/2008 | Cerra et al. |
| 2008/0221880 | A1 | 9/2008 | Cerra et al. |
| 2008/0221887 | A1 | 9/2008 | Rose et al. |
| 2008/0221889 | A1 | 9/2008 | Cerra et al. |
| 2008/0221903 | A1 | 9/2008 | Kanevsky et al. |
| 2008/0222118 | A1 | 9/2008 | Scian et al. |
| 2008/0226130 | A1 | 9/2008 | Kansal et al. |
| 2008/0228463 | A1 | 9/2008 | Mori et al. |
| 2008/0228485 | A1 | 9/2008 | Owen |
| 2008/0228490 | A1 | 9/2008 | Fischer et al. |
| 2008/0228495 | A1 | 9/2008 | Cross et al. |
| 2008/0228496 | A1 | 9/2008 | Yu et al. |
| 2008/0228928 | A1 | 9/2008 | Donelli et al. |
| 2008/0229185 | A1 | 9/2008 | Lynch |
| 2008/0229218 | A1 | 9/2008 | Maeng |
| 2008/0235017 | A1 | 9/2008 | Satomura et al. |
| 2008/0235023 | A1 | 9/2008 | Kennewick et al. |
| 2008/0235024 | A1 | 9/2008 | Goldberg et al. |
| 2008/0235027 | A1 | 9/2008 | Cross |
| 2008/0240569 | A1 | 10/2008 | Tonouchi |
| 2008/0242280 | A1 | 10/2008 | Shapiro et al. |
| 2008/0242322 | A1 | 10/2008 | Scott et al. |
| 2008/0242363 | A1 | 10/2008 | Onda et al. |
| 2008/0243501 | A1 | 10/2008 | Hafsteinsson et al. |
| 2008/0243834 | A1 | 10/2008 | Rieman et al. |
| 2008/0244390 | A1 | 10/2008 | Fux et al. |
| 2008/0244446 | A1 | 10/2008 | Lefevre et al. |
| 2008/0247519 | A1 | 10/2008 | Abella et al. |
| 2008/0247529 | A1 | 10/2008 | Barton et al. |
| 2008/0248797 | A1 | 10/2008 | Freeman et al. |
| 2008/0249770 | A1 | 10/2008 | Kim et al. |
| 2008/0249778 | A1 | 10/2008 | Barton et al. |
| 2008/0253577 | A1 | 10/2008 | Eppolito |
| 2008/0254419 | A1 | 10/2008 | Cohen |
| 2008/0254425 | A1 | 10/2008 | Cohen et al. |
| 2008/0255837 | A1 | 10/2008 | Kahn et al. |
| 2008/0255842 | A1 | 10/2008 | Simhi et al. |
| 2008/0255845 | A1 | 10/2008 | Bennett |
| 2008/0256613 | A1 | 10/2008 | Grover |
| 2008/0259022 | A1 | 10/2008 | Mansfield et al. |
| 2008/0261572 | A1 | 10/2008 | Tsui et al. |
| 2008/0262828 | A1 | 10/2008 | Och et al. |
| 2008/0262838 | A1 | 10/2008 | Nurminen et al. |
| 2008/0262846 | A1 | 10/2008 | Burns et al. |
| 2008/0263139 | A1 | 10/2008 | Martin |
| 2008/0267416 | A1 | 10/2008 | Goldstein et al. |
| 2008/0270118 | A1 | 10/2008 | Kuo et al. |
| 2008/0270138 | A1 | 10/2008 | Knight et al. |
| 2008/0270139 | A1 | 10/2008 | Shi et al. |
| 2008/0270140 | A1 | 10/2008 | Hertz et al. |
| 2008/0270151 | A1 | 10/2008 | Mahoney et al. |
| 2008/0270344 | A1 | 10/2008 | Yurick et al. |
| 2008/0273672 | A1 | 11/2008 | Didcock et al. |
| 2008/0277473 | A1 | 11/2008 | Kotlarsky et al. |
| 2008/0281510 | A1 | 11/2008 | Shahine |
| 2008/0281582 | A1 | 11/2008 | Hsu et al. |
| 2008/0288259 | A1 | 11/2008 | Chambers et al. |
| 2008/0288460 | A1 | 11/2008 | Poniatowski et al. |
| 2008/0292112 | A1 | 11/2008 | Valenzuela et al. |
| 2008/0294418 | A1 | 11/2008 | Cleary et al. |
| 2008/0294517 | A1 | 11/2008 | Hill |
| 2008/0294651 | A1 | 11/2008 | Masuyama et al. |
| 2008/0294981 | A1 | 11/2008 | Balzano et al. |
| 2008/0298563 | A1 | 12/2008 | Rondeau et al. |
| 2008/0298766 | A1 | 12/2008 | Wen et al. |
| 2008/0299523 | A1 | 12/2008 | Chai et al. |
| 2008/0300857 | A1 | 12/2008 | Barbaiani et al. |
| 2008/0300871 | A1 | 12/2008 | Gilbert |
| 2008/0300877 | A1 | 12/2008 | Gilbert et al. |
| 2008/0300878 | A1 | 12/2008 | Bennett |
| 2008/0300886 | A1 | 12/2008 | Patch |
| 2008/0301567 | A1 | 12/2008 | Martin et al. |
| 2008/0303645 | A1 | 12/2008 | Seymour et al. |
| 2008/0306727 | A1 | 12/2008 | Thurmair et al. |
| 2008/0312909 | A1 | 12/2008 | Hermansen et al. |
| 2008/0312928 | A1 | 12/2008 | Goebel et al. |
| 2008/0313335 | A1 | 12/2008 | Jung et al. |
| 2008/0316183 | A1 | 12/2008 | Westerman et al. |
| 2008/0319735 | A1 | 12/2008 | Kambhatla et al. |
| 2008/0319738 | A1 | 12/2008 | Liu et al. |
| 2008/0319753 | A1 | 12/2008 | Hancock |
| 2008/0319763 | A1 | 12/2008 | Di Fabbrizio et al. |
| 2008/0319783 | A1 | 12/2008 | Yao et al. |
| 2009/0003115 | A1 | 1/2009 | Lindahl et al. |
| 2009/0005012 | A1 | 1/2009 | Van Heugten |
| 2009/0005891 | A1 | 1/2009 | Batson et al. |
| 2009/0006096 | A1 | 1/2009 | Li et al. |
| 2009/0006097 | A1 | 1/2009 | Etezadi et al. |
| 2009/0006099 | A1 | 1/2009 | Sharpe et al. |
| 2009/0006100 | A1 | 1/2009 | Badger et al. |

(56) References Cited

U.S. PATENT DOCUMENTS

| | | | |
|---|---|---|---|
| 2009/0006343 | A1 | 1/2009 | Platt et al. |
| 2009/0006345 | A1 | 1/2009 | Platt et al. |
| 2009/0006488 | A1 | 1/2009 | Lindahl et al. |
| 2009/0006671 | A1 | 1/2009 | Batson et al. |
| 2009/0007001 | A1 | 1/2009 | Morin et al. |
| 2009/0011709 | A1 | 1/2009 | Akasaka et al. |
| 2009/0012748 | A1 | 1/2009 | Beish et al. |
| 2009/0012775 | A1 | 1/2009 | El Hady et al. |
| 2009/0018828 | A1 | 1/2009 | Nakadai et al. |
| 2009/0018829 | A1 | 1/2009 | Kuperstein |
| 2009/0018834 | A1 | 1/2009 | Cooper et al. |
| 2009/0018835 | A1 | 1/2009 | Cooper et al. |
| 2009/0018839 | A1 | 1/2009 | Cooper et al. |
| 2009/0018840 | A1 | 1/2009 | Lutz et al. |
| 2009/0022329 | A1 | 1/2009 | Mahowald |
| 2009/0024595 | A1 | 1/2009 | Chen |
| 2009/0028435 | A1 | 1/2009 | Wu et al. |
| 2009/0030685 | A1 | 1/2009 | Cerra et al. |
| 2009/0030800 | A1 | 1/2009 | Grois |
| 2009/0030978 | A1 | 1/2009 | Johnson et al. |
| 2009/0043580 | A1 | 2/2009 | Mozer et al. |
| 2009/0043583 | A1 | 2/2009 | Agapi et al. |
| 2009/0043763 | A1 | 2/2009 | Peng |
| 2009/0044094 | A1 | 2/2009 | Rapp et al. |
| 2009/0048821 | A1 | 2/2009 | Yam et al. |
| 2009/0048841 | A1 | 2/2009 | Pollet et al. |
| 2009/0048845 | A1 | 2/2009 | Burckart et al. |
| 2009/0049067 | A1 | 2/2009 | Murray |
| 2009/0055168 | A1 | 2/2009 | Wu et al. |
| 2009/0055175 | A1 | 2/2009 | Terrell et al. |
| 2009/0055179 | A1 | 2/2009 | Cho et al. |
| 2009/0055186 | A1 | 2/2009 | Lance et al. |
| 2009/0055380 | A1 | 2/2009 | Peng et al. |
| 2009/0055381 | A1 | 2/2009 | Wu et al. |
| 2009/0055648 | A1 | 2/2009 | Kim et al. |
| 2009/0058823 | A1 | 3/2009 | Kocienda |
| 2009/0058860 | A1 | 3/2009 | Fong et al. |
| 2009/0060351 | A1 | 3/2009 | Li et al. |
| 2009/0060472 | A1 | 3/2009 | Bull et al. |
| 2009/0063974 | A1 | 3/2009 | Bull et al. |
| 2009/0064031 | A1 | 3/2009 | Bull et al. |
| 2009/0070097 | A1 | 3/2009 | Wu et al. |
| 2009/0070102 | A1 | 3/2009 | Maegawa |
| 2009/0070109 | A1 | 3/2009 | Didcock et al. |
| 2009/0070114 | A1 | 3/2009 | Staszak |
| 2009/0074214 | A1 | 3/2009 | Bradford et al. |
| 2009/0076792 | A1 | 3/2009 | Lawson-Tancred |
| 2009/0076796 | A1 | 3/2009 | Daraselia |
| 2009/0076798 | A1 | 3/2009 | Oh et al. |
| 2009/0076819 | A1 | 3/2009 | Wouters et al. |
| 2009/0076821 | A1 | 3/2009 | Brenner et al. |
| 2009/0076825 | A1 | 3/2009 | Bradford et al. |
| 2009/0077047 | A1 | 3/2009 | Cooper et al. |
| 2009/0077165 | A1 | 3/2009 | Rhodes et al. |
| 2009/0077464 | A1 | 3/2009 | Goldsmith et al. |
| 2009/0079622 | A1 | 3/2009 | Seshadri et al. |
| 2009/0083034 | A1 | 3/2009 | Hernandez et al. |
| 2009/0083035 | A1 | 3/2009 | Huang et al. |
| 2009/0083036 | A1 | 3/2009 | Zhao et al. |
| 2009/0083037 | A1 | 3/2009 | Gleason et al. |
| 2009/0083047 | A1 | 3/2009 | Lindahl et al. |
| 2009/0089058 | A1 | 4/2009 | Bellegarda |
| 2009/0091537 | A1 | 4/2009 | Huang et al. |
| 2009/0092239 | A1 | 4/2009 | Macwan et al. |
| 2009/0092260 | A1 | 4/2009 | Powers |
| 2009/0092261 | A1 | 4/2009 | Bard |
| 2009/0092262 | A1 | 4/2009 | Costa et al. |
| 2009/0094029 | A1 | 4/2009 | Koch et al. |
| 2009/0094033 | A1 | 4/2009 | Mozer et al. |
| 2009/0097634 | A1 | 4/2009 | Nambiar et al. |
| 2009/0097637 | A1 | 4/2009 | Boscher et al. |
| 2009/0098903 | A1 | 4/2009 | Donaldson et al. |
| 2009/0100049 | A1 | 4/2009 | Cao |
| 2009/0100454 | A1 | 4/2009 | Weber |
| 2009/0104898 | A1 | 4/2009 | Harris |
| 2009/0106026 | A1 | 4/2009 | Ferrieux |
| 2009/0106376 | A1 | 4/2009 | Tom et al. |
| 2009/0106397 | A1 | 4/2009 | O'Keefe |
| 2009/0112572 | A1 | 4/2009 | Thom |
| 2009/0112576 | A1 | 4/2009 | Jackson et al. |
| 2009/0112592 | A1 | 4/2009 | Candelore et al. |
| 2009/0112677 | A1 | 4/2009 | Rhett |
| 2009/0112892 | A1 | 4/2009 | Cardie et al. |
| 2009/0119587 | A1 | 5/2009 | Allen et al. |
| 2009/0123021 | A1 | 5/2009 | Jung et al. |
| 2009/0123071 | A1 | 5/2009 | Iwasaki |
| 2009/0125477 | A1 | 5/2009 | Lu et al. |
| 2009/0125602 | A1 | 5/2009 | Bhatia et al. |
| 2009/0125947 | A1 | 5/2009 | Ibaraki |
| 2009/0128505 | A1 | 5/2009 | Partridge et al. |
| 2009/0132253 | A1 | 5/2009 | Bellegarda |
| 2009/0132255 | A1 | 5/2009 | Lu |
| 2009/0137286 | A1 | 5/2009 | Luke et al. |
| 2009/0138263 | A1 | 5/2009 | Shozakai et al. |
| 2009/0138430 | A1 | 5/2009 | Nambiar et al. |
| 2009/0138736 | A1 | 5/2009 | Chin |
| 2009/0138828 | A1 | 5/2009 | Schultz et al. |
| 2009/0144036 | A1 | 6/2009 | Jorgensen et al. |
| 2009/0144049 | A1 | 6/2009 | Haddad et al. |
| 2009/0144428 | A1 | 6/2009 | Bowater et al. |
| 2009/0144609 | A1 | 6/2009 | Liang et al. |
| 2009/0146848 | A1 | 6/2009 | Ghassabian |
| 2009/0150147 | A1 | 6/2009 | Jacoby et al. |
| 2009/0150156 | A1 | 6/2009 | Kennewick et al. |
| 2009/0152349 | A1 | 6/2009 | Bonev et al. |
| 2009/0153288 | A1 | 6/2009 | Hope et al. |
| 2009/0154669 | A1 | 6/2009 | Wood et al. |
| 2009/0157382 | A1 | 6/2009 | Bar |
| 2009/0157384 | A1 | 6/2009 | Toutanova et al. |
| 2009/0157401 | A1 | 6/2009 | Bennett |
| 2009/0158200 | A1 | 6/2009 | Palahnuk et al. |
| 2009/0158323 | A1 | 6/2009 | Bober et al. |
| 2009/0158423 | A1 | 6/2009 | Orlassino et al. |
| 2009/0160803 | A1 | 6/2009 | Hashimoto |
| 2009/0163243 | A1 | 6/2009 | Barbera |
| 2009/0164301 | A1 | 6/2009 | O'Sullivan et al. |
| 2009/0164441 | A1 | 6/2009 | Cheyer |
| 2009/0164655 | A1 | 6/2009 | Pettersson et al. |
| 2009/0164937 | A1 | 6/2009 | Alviar et al. |
| 2009/0167508 | A1 | 7/2009 | Fadell et al. |
| 2009/0167509 | A1 | 7/2009 | Fadell et al. |
| 2009/0171578 | A1 | 7/2009 | Kim et al. |
| 2009/0171662 | A1 | 7/2009 | Huang et al. |
| 2009/0171664 | A1 | 7/2009 | Kennewick et al. |
| 2009/0172108 | A1 | 7/2009 | Singh |
| 2009/0172542 | A1 | 7/2009 | Girish et al. |
| 2009/0174667 | A1 | 7/2009 | Kocienda et al. |
| 2009/0174677 | A1 | 7/2009 | Gehani et al. |
| 2009/0177300 | A1 | 7/2009 | Lee |
| 2009/0177461 | A1 | 7/2009 | Ehsani et al. |
| 2009/0177966 | A1 | 7/2009 | Chaudhri |
| 2009/0182445 | A1 | 7/2009 | Girish et al. |
| 2009/0182549 | A1 | 7/2009 | Anisimovich et al. |
| 2009/0182702 | A1 | 7/2009 | Miller |
| 2009/0183070 | A1 | 7/2009 | Robbins |
| 2009/0187402 | A1 | 7/2009 | Scholl |
| 2009/0187577 | A1 | 7/2009 | Reznik et al. |
| 2009/0187950 | A1 | 7/2009 | Nicas et al. |
| 2009/0190774 | A1 | 7/2009 | Wang et al. |
| 2009/0191895 | A1 | 7/2009 | Singh et al. |
| 2009/0192782 | A1 | 7/2009 | Drewes |
| 2009/0192787 | A1 | 7/2009 | Roon |
| 2009/0192798 | A1 | 7/2009 | Basson et al. |
| 2009/0198497 | A1 | 8/2009 | Kwon |
| 2009/0204402 | A1 | 8/2009 | Marhawa et al. |
| 2009/0204409 | A1 | 8/2009 | Mozer et al. |
| 2009/0204478 | A1 | 8/2009 | Kaib et al. |
| 2009/0204596 | A1 | 8/2009 | Brun et al. |
| 2009/0204601 | A1 | 8/2009 | Grasset |
| 2009/0204620 | A1 | 8/2009 | Thione et al. |
| 2009/0210230 | A1 | 8/2009 | Schwarz et al. |
| 2009/0210232 | A1 | 8/2009 | Sanchez et al. |
| 2009/0213134 | A1 | 8/2009 | Stephanick et al. |
| 2009/0215466 | A1 | 8/2009 | Ahl et al. |

(56) References Cited

U.S. PATENT DOCUMENTS

| | | | |
|---|---|---|---|
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0278804 A1 | 11/2009 | Rubanovich et al. |
| 2009/0281789 A1 | 11/2009 | Waibel et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottier et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036928 A1 | 2/2010 | Granito et al. |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Wiliams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |

(56) References Cited

U.S. PATENT DOCUMENTS

2010/0076760 A1 3/2010 Kraenzel et al.
2010/0076993 A1 3/2010 Klawitter et al.
2010/0077350 A1 3/2010 Lim et al.
2010/0079501 A1 4/2010 Ikeda et al.
2010/0080398 A1 4/2010 Waldmann
2010/0080470 A1 4/2010 Deluca et al.
2010/0081456 A1 4/2010 Singh et al.
2010/0081487 A1 4/2010 Chen et al.
2010/0082286 A1 4/2010 Leung
2010/0082327 A1 4/2010 Rogers et al.
2010/0082328 A1 4/2010 Rogers et al.
2010/0082329 A1 4/2010 Silverman et al.
2010/0082333 A1 4/2010 Al-Shammari
2010/0082346 A1 4/2010 Rogers et al.
2010/0082347 A1 4/2010 Rogers et al.
2010/0082348 A1 4/2010 Silverman et al.
2010/0082349 A1 4/2010 Bellegarda et al.
2010/0082567 A1 4/2010 Rosenblatt et al.
2010/0082970 A1 4/2010 Lindahl et al.
2010/0086152 A1 4/2010 Rank et al.
2010/0086153 A1 4/2010 Hagen et al.
2010/0086156 A1 4/2010 Rank et al.
2010/0088020 A1 4/2010 Sano et al.
2010/0088093 A1 4/2010 Lee et al.
2010/0088100 A1 4/2010 Lindahl
2010/0094632 A1 4/2010 Davis et al.
2010/0098231 A1 4/2010 Wohlert et al.
2010/0100212 A1 4/2010 Lindahl et al.
2010/0100384 A1 4/2010 Ju et al.
2010/0100385 A1 4/2010 Davis et al.
2010/0100816 A1 4/2010 Mccloskey et al.
2010/0103776 A1 4/2010 Chan
2010/0106486 A1 4/2010 Hua et al.
2010/0106498 A1 4/2010 Morrison et al.
2010/0106500 A1 4/2010 McKee et al.
2010/0106503 A1 4/2010 Farrell et al.
2010/0114856 A1 5/2010 Kuboyama
2010/0114887 A1 5/2010 Conway et al.
2010/0121637 A1 5/2010 Roy et al.
2010/0125456 A1 5/2010 Weng et al.
2010/0125458 A1 5/2010 Franco et al.
2010/0125460 A1 5/2010 Mellott et al.
2010/0125811 A1 5/2010 Moore et al.
2010/0131269 A1 5/2010 Park et al.
2010/0131273 A1 5/2010 Aley-Raz et al.
2010/0131498 A1 5/2010 Linthicum et al.
2010/0131899 A1 5/2010 Hubert
2010/0138215 A1 6/2010 Williams
2010/0138224 A1 6/2010 Bedingfield, Sr.
2010/0138416 A1 6/2010 Bellotti
2010/0138680 A1 6/2010 Brisebois et al.
2010/0138759 A1 6/2010 Roy
2010/0138798 A1 6/2010 Wilson et al.
2010/0142740 A1 6/2010 Roerup
2010/0145694 A1 6/2010 Ju et al.
2010/0145700 A1 6/2010 Kennewick et al.
2010/0145707 A1 6/2010 Ljolje et al.
2010/0146442 A1 6/2010 Nagasaka et al.
2010/0150321 A1 6/2010 Harris et al.
2010/0153114 A1 6/2010 Shih et al.
2010/0153115 A1 6/2010 Klee et al.
2010/0153448 A1 6/2010 Harpur et al.
2010/0161311 A1 6/2010 Massuh
2010/0161313 A1 6/2010 Karttunen
2010/0161337 A1 6/2010 Pulz et al.
2010/0161554 A1 6/2010 Datuashvili et al.
2010/0164897 A1 7/2010 Morin et al.
2010/0169075 A1 7/2010 Raffa et al.
2010/0169093 A1 7/2010 Washio
2010/0169097 A1 7/2010 Nachman et al.
2010/0169098 A1 7/2010 Patch
2010/0171713 A1 7/2010 Kwok et al.
2010/0174544 A1 7/2010 Heifets
2010/0175066 A1 7/2010 Paik
2010/0179932 A1 7/2010 Yoon et al.
2010/0179991 A1 7/2010 Lorch et al.
2010/0180218 A1 7/2010 Boston et al.
2010/0185448 A1 7/2010 Meisel
2010/0185949 A1 7/2010 Jaeger
2010/0191520 A1 7/2010 Gruhn et al.
2010/0197359 A1 8/2010 Harris
2010/0199180 A1 8/2010 Brichter et al.
2010/0199215 A1 8/2010 Seymour et al.
2010/0204986 A1 8/2010 Kennewick et al.
2010/0211199 A1 8/2010 Naik et al.
2010/0211379 A1 8/2010 Gorman et al.
2010/0211644 A1 8/2010 Lavoie et al.
2010/0216509 A1 8/2010 Riemer et al.
2010/0217604 A1 8/2010 Baldwin et al.
2010/0222033 A1 9/2010 Scott et al.
2010/0222098 A1 9/2010 Garg
2010/0223055 A1 9/2010 Mclean
2010/0223056 A1 9/2010 Kadirkamanathan et al.
2010/0223131 A1 9/2010 Scott et al.
2010/0225599 A1 9/2010 Danielsson et al.
2010/0225809 A1 9/2010 Connors et al.
2010/0227642 A1 9/2010 Kim et al.
2010/0228540 A1 9/2010 Bennett
2010/0228549 A1 9/2010 Herman et al.
2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0235780 A1 9/2010 Westerman et al.
2010/0241418 A1 9/2010 Maeda et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0262599 A1 10/2010 Nitz
2010/0268537 A1 10/2010 Al-Telmissani
2010/0268539 A1 10/2010 Xu et al.
2010/0269040 A1 10/2010 Lee
2010/0274753 A1 10/2010 Liberty et al.
2010/0277579 A1 11/2010 Cho et al.
2010/0278320 A1 11/2010 Arsenault et al.
2010/0278453 A1 11/2010 King
2010/0280983 A1 11/2010 Cho et al.
2010/0281034 A1 11/2010 Petrou et al.
2010/0286984 A1 11/2010 Wandinger et al.
2010/0286985 A1 11/2010 Kennewick et al.
2010/0287514 A1 11/2010 Cragun et al.
2010/0290632 A1 11/2010 Lin
2010/0293460 A1 11/2010 Budelli
2010/0295645 A1 11/2010 Falldin et al.
2010/0299133 A1 11/2010 Kopparapu et al.
2010/0299138 A1 11/2010 Kim
2010/0299142 A1 11/2010 Freeman et al.
2010/0302056 A1 12/2010 Dutton et al.
2010/0304342 A1 12/2010 Zilber
2010/0304705 A1 12/2010 Hursey et al.
2010/0305807 A1 12/2010 Basir et al.
2010/0305947 A1 12/2010 Schwarz et al.
2010/0312547 A1 12/2010 Van Os et al.
2010/0312566 A1 12/2010 Odinak et al.
2010/0318366 A1 12/2010 Sullivan et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.
2010/0325131 A1 12/2010 Dumais et al.
2010/0325158 A1 12/2010 Oral et al.
2010/0325573 A1 12/2010 Estrada et al.
2010/0325588 A1 12/2010 Reddy et al.
2010/0330908 A1 12/2010 Maddern et al.
2010/0332220 A1 12/2010 Hursey et al.

(56) References Cited

U.S. PATENT DOCUMENTS

2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0006876 A1 1/2011 Moberg et al.
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0016421 A1 1/2011 Krupka et al.
2011/0018695 A1 1/2011 Bells et al.
2011/0021211 A1 1/2011 Ohki
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0029616 A1 2/2011 Wang et al.
2011/0030067 A1 2/2011 Wilson
2011/0033064 A1 2/2011 Johnson et al.
2011/0034183 A1 2/2011 Haag et al.
2011/0035144 A1 2/2011 Okamoto et al.
2011/0035434 A1 2/2011 Lockwood
2011/0038489 A1 2/2011 Visser et al.
2011/0040707 A1 2/2011 Theisen et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0047266 A1 2/2011 Yu et al.
2011/0047605 A1 2/2011 Sontag et al.
2011/0050591 A1 3/2011 Kim et al.
2011/0050592 A1 3/2011 Kim et al.
2011/0054647 A1 3/2011 Chipchase
2011/0054894 A1 3/2011 Phillips et al.
2011/0054901 A1 3/2011 Qin et al.
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg et al.
2011/0060807 A1 3/2011 Martin et al.
2011/0064387 A1 3/2011 Mendeloff et al.
2011/0065456 A1 3/2011 Brennan et al.
2011/0066366 A1 3/2011 Ellanti et al.
2011/0066468 A1 3/2011 Huang et al.
2011/0066634 A1 3/2011 Phillips et al.
2011/0072033 A1 3/2011 White et al.
2011/0072492 A1 3/2011 Mohler et al.
2011/0076994 A1 3/2011 Kim et al.
2011/0077943 A1 3/2011 Miki et al.
2011/0080260 A1 4/2011 Wang et al.
2011/0081889 A1 4/2011 Gao et al.
2011/0082688 A1 4/2011 Kim et al.
2011/0083079 A1 4/2011 Farrell et al.
2011/0087491 A1 4/2011 Wittenstein et al.
2011/0087685 A1 4/2011 Lin et al.
2011/0090078 A1 4/2011 Kim et al.
2011/0092187 A1 4/2011 Miller
2011/0093261 A1 4/2011 Angott
2011/0093265 A1 4/2011 Stent et al.
2011/0093271 A1 4/2011 Bernard et al.
2011/0093272 A1 4/2011 Isobe et al.
2011/0099000 A1 4/2011 Rai et al.
2011/0103682 A1 5/2011 Chidlovskii et al.
2011/0105097 A1 5/2011 Tadayon et al.
2011/0106736 A1 5/2011 Aharonson et al.
2011/0106892 A1 5/2011 Nelson et al.
2011/0110502 A1 5/2011 Daye et al.
2011/0111724 A1 5/2011 Baptiste
2011/0112825 A1 5/2011 Bellegarda
2011/0112827 A1 5/2011 Kennewick et al.
2011/0112837 A1 5/2011 Kurki-Suonio et al.
2011/0112838 A1 5/2011 Adibi
2011/0112921 A1 5/2011 Kennewick et al.
2011/0116610 A1 5/2011 Shaw et al.
2011/0119049 A1 5/2011 Ylonen
2011/0119051 A1 5/2011 Li et al.
2011/0119623 A1 5/2011 Kim
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0125701 A1 5/2011 Nair et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0141141 A1 6/2011 Kankainen
2011/0143726 A1 6/2011 de Silva
2011/0143811 A1 6/2011 Rodriguez
2011/0144857 A1 6/2011 Wingrove et al.
2011/0144901 A1 6/2011 Wang
2011/0144973 A1 6/2011 Bocchieri et al.
2011/0144999 A1 6/2011 Jang et al.
2011/0145718 A1 6/2011 Ketola et al.
2011/0151830 A1 6/2011 Blanda et al.
2011/0153209 A1 6/2011 Geelen
2011/0153322 A1 6/2011 Kwak et al.
2011/0153324 A1 6/2011 Ballinger et al.
2011/0153329 A1 6/2011 Moorer
2011/0153330 A1 6/2011 Yazdani et al.
2011/0153373 A1 6/2011 Dantzig et al.
2011/0154193 A1 6/2011 Creutz et al.
2011/0157029 A1 6/2011 Tseng
2011/0161072 A1 6/2011 Terao et al.
2011/0161076 A1 6/2011 Davis et al.
2011/0161079 A1 6/2011 Gruhn et al.
2011/0161309 A1 6/2011 Lung et al.
2011/0161852 A1 6/2011 Vainio et al.
2011/0166851 A1 7/2011 LeBeau et al.
2011/0167350 A1 7/2011 Hoellwarth
2011/0175810 A1 7/2011 Markovic et al.
2011/0179002 A1 7/2011 Dumitru et al.
2011/0179372 A1 7/2011 Moore et al.
2011/0183650 A1 7/2011 Mckee et al.
2011/0184721 A1 7/2011 Subramanian et al.
2011/0184730 A1 7/2011 LeBeau et al.
2011/0184736 A1 7/2011 Slotznick
2011/0184737 A1 7/2011 Nakano et al.
2011/0184768 A1 7/2011 Norton et al.
2011/0185288 A1 7/2011 Gupta et al.
2011/0191108 A1 8/2011 Friedlander
2011/0191271 A1 8/2011 Baker et al.
2011/0191344 A1 8/2011 Jin et al.
2011/0195758 A1 8/2011 Damale et al.
2011/0196670 A1 8/2011 Dang et al.
2011/0197128 A1 8/2011 Assadollahi et al.
2011/0199312 A1 8/2011 Okuta
2011/0201385 A1 8/2011 Higginbotham et al.
2011/0201387 A1 8/2011 Paek et al.
2011/0202526 A1 8/2011 Lee et al.
2011/0205149 A1 8/2011 Tom et al.
2011/0208511 A1 8/2011 Sikstrom et al.
2011/0208524 A1 8/2011 Haughay
2011/0209088 A1 8/2011 Hinckley et al.
2011/0212717 A1 9/2011 Rhoads et al.
2011/0216093 A1 9/2011 Griffin
2011/0218806 A1 9/2011 Alewine et al.
2011/0218855 A1 9/2011 Cao et al.
2011/0219018 A1 9/2011 Bailey et al.
2011/0223893 A1 9/2011 Lau et al.
2011/0224972 A1 9/2011 Millett et al.
2011/0228913 A1 9/2011 Cochinwala et al.

(56) References Cited

U.S. PATENT DOCUMENTS

2011/0231182 A1 9/2011 Weider et al.
2011/0231184 A1 9/2011 Kerr
2011/0231188 A1 9/2011 Kennewick et al.
2011/0231432 A1 9/2011 Sata et al.
2011/0231474 A1 9/2011 Locker et al.
2011/0238191 A1 9/2011 Kristjansson et al.
2011/0238407 A1 9/2011 Kent
2011/0238408 A1 9/2011 Larcheveque et al.
2011/0238676 A1 9/2011 Liu et al.
2011/0239111 A1 9/2011 Grover
2011/0242007 A1 10/2011 Gray et al.
2011/0244888 A1 10/2011 Ohki
2011/0246471 A1 10/2011 Rakib et al.
2011/0249144 A1 10/2011 Chang
2011/0250570 A1 10/2011 Mack et al.
2011/0257966 A1 10/2011 Rychlik
2011/0258188 A1 10/2011 Abdalmageed et al.
2011/0260829 A1 10/2011 Lee
2011/0260861 A1 10/2011 Singh et al.
2011/0264643 A1 10/2011 Cao
2011/0264999 A1 10/2011 Bells et al.
2011/0274303 A1 11/2011 Filson et al.
2011/0276595 A1 11/2011 Kirkland et al.
2011/0276598 A1 11/2011 Kozempel
2011/0276944 A1 11/2011 Bergman et al.
2011/0279368 A1 11/2011 Klein et al.
2011/0282663 A1 11/2011 Talwar et al.
2011/0282888 A1 11/2011 Koperski et al.
2011/0282906 A1 11/2011 Wong
2011/0283189 A1 11/2011 McCarty
2011/0288852 A1 11/2011 Dymetman et al.
2011/0288855 A1 11/2011 Roy
2011/0288861 A1 11/2011 Kurzweil et al.
2011/0288863 A1 11/2011 Rasmussen
2011/0288866 A1 11/2011 Rasmussen
2011/0298585 A1 12/2011 Barry
2011/0301943 A1 12/2011 Patch
2011/0302162 A1 12/2011 Xiao et al.
2011/0306426 A1 12/2011 Novak et al.
2011/0307241 A1 12/2011 Waibel et al.
2011/0307491 A1 12/2011 Fisk et al.
2011/0307810 A1 12/2011 Hilerio et al.
2011/0313775 A1 12/2011 Laligand et al.
2011/0314003 A1 12/2011 Ju et al.
2011/0314032 A1 12/2011 Bennett et al.
2011/0314404 A1 12/2011 Kotler et al.
2011/0320187 A1 12/2011 Motik et al.
2012/0002820 A1 1/2012 Leichter
2012/0005602 A1 1/2012 Anttila et al.
2012/0008754 A1 1/2012 Mukherjee et al.
2012/0010886 A1 1/2012 Razavilar
2012/0011138 A1 1/2012 Dunning et al.
2012/0013609 A1 1/2012 Reponen et al.
2012/0015629 A1 1/2012 Olsen et al.
2012/0016658 A1 1/2012 Wu et al.
2012/0016678 A1 1/2012 Gruber et al.
2012/0019400 A1 1/2012 Patel et al.
2012/0020490 A1 1/2012 Leichter
2012/0022787 A1 1/2012 LeBeau et al.
2012/0022857 A1 1/2012 Baldwin et al.
2012/0022860 A1 1/2012 Lloyd et al.
2012/0022868 A1 1/2012 LeBeau et al.
2012/0022869 A1 1/2012 Lloyd et al.
2012/0022870 A1 1/2012 Kristjansson et al.
2012/0022872 A1* 1/2012 Gruber .................... G06F 40/35
704/270.1
2012/0022874 A1 1/2012 Lloyd et al.
2012/0022876 A1 1/2012 LeBeau et al.
2012/0022967 A1 1/2012 Bachman et al.
2012/0023088 A1 1/2012 Cheng et al.
2012/0023095 A1 1/2012 Wadycki et al.
2012/0023462 A1 1/2012 Rosing et al.
2012/0029661 A1 2/2012 Jones et al.
2012/0029910 A1 2/2012 Medlock et al.
2012/0034904 A1 2/2012 LeBeau et al.
2012/0035907 A1 2/2012 Lebeau et al.
2012/0035908 A1 2/2012 Lebeau et al.
2012/0035924 A1 2/2012 Jitkoff et al.
2012/0035925 A1 2/2012 Friend et al.
2012/0035926 A1 2/2012 Ambler
2012/0035931 A1 2/2012 LeBeau et al.
2012/0035932 A1 2/2012 Jitkoff et al.
2012/0035935 A1 2/2012 Park et al.
2012/0036556 A1 2/2012 LeBeau et al.
2012/0039539 A1 2/2012 Boiman et al.
2012/0041752 A1 2/2012 Wang et al.
2012/0042014 A1 2/2012 Desai et al.
2012/0042343 A1 2/2012 Laligand et al.
2012/0053815 A1 3/2012 Montanari et al.
2012/0053829 A1 3/2012 Agarwal et al.
2012/0053945 A1 3/2012 Gupta et al.
2012/0056815 A1 3/2012 Mehra
2012/0059655 A1 3/2012 Cartales
2012/0059813 A1 3/2012 Sejnoha et al.
2012/0062473 A1 3/2012 Xiao et al.
2012/0066212 A1 3/2012 Jennings
2012/0066581 A1 3/2012 Spalink
2012/0075054 A1 3/2012 Ge et al.
2012/0077479 A1 3/2012 Sabotta et al.
2012/0078611 A1 3/2012 Soltani et al.
2012/0078624 A1 3/2012 Yook et al.
2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084634 A1 4/2012 Wong et al.
2012/0088219 A1 4/2012 Briscoe et al.
2012/0089331 A1 4/2012 Schmidt et al.
2012/0101823 A1 4/2012 Weng et al.
2012/0108166 A1 5/2012 Hymel
2012/0108221 A1 5/2012 Thomas et al.
2012/0116770 A1 5/2012 Chen et al.
2012/0117499 A1 5/2012 Mori et al.
2012/0124126 A1 5/2012 Alcazar et al.
2012/0128322 A1 5/2012 Shaffer et al.
2012/0130709 A1 5/2012 Bocchieri et al.
2012/0136572 A1 5/2012 Norton
2012/0136855 A1 5/2012 Ni et al.
2012/0136985 A1 5/2012 Popescu et al.
2012/0137367 A1 5/2012 Dupont et al.
2012/0149342 A1 6/2012 Cohen et al.
2012/0149394 A1 6/2012 Singh et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0163710 A1 6/2012 Skaff et al.
2012/0166196 A1 6/2012 Ju et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0179457 A1 7/2012 Newman et al.
2012/0179467 A1 7/2012 Williams
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0209853 A1 8/2012 Desai et al.
2012/0209874 A1 8/2012 Wong et al.
2012/0210266 A1 8/2012 Jiang et al.
2012/0214141 A1 8/2012 Raya et al.
2012/0214517 A1 8/2012 Singh et al.
2012/0215762 A1 8/2012 Hall et al.
2012/0221339 A1 8/2012 Wang et al.

(56) References Cited

U.S. PATENT DOCUMENTS

| | | | |
|---|---|---|---|
| 2012/0221552 | A1 | 8/2012 | Reponen et al. |
| 2012/0223889 | A1 | 9/2012 | Medlock et al. |
| 2012/0223936 | A1 | 9/2012 | Aughey et al. |
| 2012/0232885 | A1 | 9/2012 | Barbosa et al. |
| 2012/0232886 | A1 | 9/2012 | Capuozzo et al. |
| 2012/0232906 | A1 | 9/2012 | Lindahl et al. |
| 2012/0233266 | A1 | 9/2012 | Hassan et al. |
| 2012/0239661 | A1 | 9/2012 | Giblin |
| 2012/0239761 | A1 | 9/2012 | Linner et al. |
| 2012/0242482 | A1 | 9/2012 | Elumalai et al. |
| 2012/0245719 | A1 | 9/2012 | Story, Jr. et al. |
| 2012/0245939 | A1 | 9/2012 | Braho et al. |
| 2012/0245941 | A1 | 9/2012 | Cheyer |
| 2012/0245944 | A1 | 9/2012 | Gruber et al. |
| 2012/0246064 | A1 | 9/2012 | Balkow |
| 2012/0027164 | A1 | 10/2012 | Basir |
| 2012/0250858 | A1 | 10/2012 | Iqbal et al. |
| 2012/0252367 | A1 | 10/2012 | Gaglio et al. |
| 2012/0252540 | A1 | 10/2012 | Kirigaya |
| 2012/0253785 | A1 | 10/2012 | Hamid et al. |
| 2012/0254143 | A1 | 10/2012 | Varma et al. |
| 2012/0254152 | A1 | 10/2012 | Park et al. |
| 2012/0254290 | A1 | 10/2012 | Naaman |
| 2012/0259615 | A1 | 10/2012 | Morin et al. |
| 2012/0265528 | A1 | 10/2012 | Gruber et al. |
| 2012/0265535 | A1 | 10/2012 | Bryant-Rich et al. |
| 2012/0265806 | A1 | 10/2012 | Blanchflower et al. |
| 2012/0271625 | A1 | 10/2012 | Bernard |
| 2012/0271634 | A1 | 10/2012 | Lenke |
| 2012/0271635 | A1 | 10/2012 | Ljolje |
| 2012/0271676 | A1 | 10/2012 | Aravamudan et al. |
| 2012/0029030 | A1 | 11/2012 | Lee et al. |
| 2012/0029663 | A1 | 11/2012 | Patwa |
| 2012/0275377 | A1 | 11/2012 | Lehane et al. |
| 2012/0284015 | A1 | 11/2012 | Drewes |
| 2012/0284027 | A1 | 11/2012 | Mallett et al. |
| 2012/0290291 | A1 | 11/2012 | Shelley et al. |
| 2012/0295708 | A1 | 11/2012 | Hernandez-Abrego et al. |
| 2012/0296649 | A1 | 11/2012 | Bansal et al. |
| 2012/0296654 | A1 | 11/2012 | Hendrickson et al. |
| 2012/0296891 | A1 | 11/2012 | Rangan |
| 2012/0297348 | A1 | 11/2012 | Santoro |
| 2012/0303369 | A1 | 11/2012 | Brush et al. |
| 2012/0303371 | A1 | 11/2012 | Labsky et al. |
| 2012/0304124 | A1 | 11/2012 | Chen et al. |
| 2012/0309363 | A1 | 12/2012 | Gruber et al. |
| 2012/0310642 | A1 | 12/2012 | Cao et al. |
| 2012/0310649 | A1 | 12/2012 | Cannistraro et al. |
| 2012/0310652 | A1 | 12/2012 | O'Sullivan |
| 2012/0310922 | A1 | 12/2012 | Johnson et al. |
| 2012/0311478 | A1 | 12/2012 | Van Os et al. |
| 2012/0311583 | A1 | 12/2012 | Gruber et al. |
| 2012/0311584 | A1 | 12/2012 | Gruber et al. |
| 2012/0311585 | A1 | 12/2012 | Gruber et al. |
| 2012/0316862 | A1 | 12/2012 | Sultan et al. |
| 2012/0316875 | A1 | 12/2012 | Nyquist et al. |
| 2012/0316878 | A1 | 12/2012 | Singleton et al. |
| 2012/0317194 | A1 | 12/2012 | Tian |
| 2012/0317498 | A1 | 12/2012 | Logan et al. |
| 2012/0321112 | A1 | 12/2012 | Schubert et al. |
| 2012/0324391 | A1 | 12/2012 | Tocci et al. |
| 2012/0327009 | A1 | 12/2012 | Fleizach |
| 2012/0329529 | A1 | 12/2012 | van der Raadt |
| 2012/0330660 | A1 | 12/2012 | Jaiswal |
| 2012/0330661 | A1 | 12/2012 | Lindahl |
| 2012/0330990 | A1 | 12/2012 | Chen et al. |
| 2013/0002716 | A1 | 1/2013 | Walker et al. |
| 2013/0005405 | A1 | 1/2013 | Prociw |
| 2013/0006633 | A1 | 1/2013 | Grokop et al. |
| 2013/0006637 | A1 | 1/2013 | Kanevsky et al. |
| 2013/0006638 | A1 | 1/2013 | Lindahl |
| 2013/0007648 | A1 | 1/2013 | Gamon et al. |
| 2013/0010575 | A1 | 1/2013 | He et al. |
| 2013/0013313 | A1 | 1/2013 | Shechtman et al. |
| 2013/0013319 | A1 | 1/2013 | Grant et al. |
| 2013/0018659 | A1 | 1/2013 | Chi |
| 2013/0024576 | A1 | 1/2013 | Dishneau et al. |
| 2013/0027875 | A1 | 1/2013 | Zhu et al. |
| 2013/0030787 | A1 | 1/2013 | Cancedda et al. |
| 2013/0030789 | A1 | 1/2013 | Dalce |
| 2013/0030804 | A1 | 1/2013 | Zavaliagko et al. |
| 2013/0030815 | A1 | 1/2013 | Madhvanath et al. |
| 2013/0030913 | A1 | 1/2013 | Zhu et al. |
| 2013/0030955 | A1 | 1/2013 | David |
| 2013/0031162 | A1 | 1/2013 | Willis et al. |
| 2013/0031476 | A1 | 1/2013 | Coin et al. |
| 2013/0033643 | A1 | 2/2013 | Kim et al. |
| 2013/0035086 | A1 | 2/2013 | Chardon et al. |
| 2013/0035942 | A1 | 2/2013 | Kim et al. |
| 2013/0035961 | A1 | 2/2013 | Yegnanarayanan |
| 2013/0041647 | A1 | 2/2013 | Ramerth et al. |
| 2013/0041654 | A1 | 2/2013 | Walker et al. |
| 2013/0041661 | A1 | 2/2013 | Lee et al. |
| 2013/0041665 | A1 | 2/2013 | Jang et al. |
| 2013/0041667 | A1 | 2/2013 | Longe et al. |
| 2013/0041968 | A1 | 2/2013 | Cohen et al. |
| 2013/0046544 | A1 | 2/2013 | Kay et al. |
| 2013/0050089 | A1 | 2/2013 | Neels et al. |
| 2013/0054550 | A1 | 2/2013 | Bolohan |
| 2013/0054609 | A1 | 2/2013 | Rajput et al. |
| 2013/0054613 | A1 | 2/2013 | Bishop |
| 2013/0054675 | A1 | 2/2013 | Jenkins et al. |
| 2013/0054706 | A1 | 2/2013 | Graham et al. |
| 2013/0055099 | A1 | 2/2013 | Yao et al. |
| 2013/0055147 | A1 | 2/2013 | Vasudev et al. |
| 2013/0063611 | A1 | 3/2013 | Papakipos et al. |
| 2013/0066832 | A1 | 3/2013 | Sheehan et al. |
| 2013/0067307 | A1 | 3/2013 | Tian et al. |
| 2013/0073286 | A1 | 3/2013 | Bastea-Forte et al. |
| 2013/0073346 | A1 | 3/2013 | Chun et al. |
| 2013/0080152 | A1 | 3/2013 | Brun et al. |
| 2013/0080162 | A1 | 3/2013 | Chang et al. |
| 2013/0080167 | A1 | 3/2013 | Mozer |
| 2013/0080177 | A1 | 3/2013 | Chen |
| 2013/0080251 | A1 | 3/2013 | Dempski |
| 2013/0082967 | A1 | 4/2013 | Hillis et al. |
| 2013/0085755 | A1 | 4/2013 | Bringert et al. |
| 2013/0085761 | A1 | 4/2013 | Bringert et al. |
| 2013/0090921 | A1 | 4/2013 | Liu et al. |
| 2013/0091090 | A1 | 4/2013 | Spivack et al. |
| 2013/0095805 | A1 | 4/2013 | Lebeau et al. |
| 2013/0096909 | A1 | 4/2013 | Brun et al. |
| 2013/0096917 | A1 | 4/2013 | Edgar et al. |
| 2013/0097566 | A1 | 4/2013 | Berglund |
| 2013/0097682 | A1 | 4/2013 | Zeljkovic et al. |
| 2013/0100268 | A1 | 4/2013 | Mihailidis et al. |
| 2013/0103391 | A1 | 4/2013 | Millmore et al. |
| 2013/0103405 | A1 | 4/2013 | Namba et al. |
| 2013/0106742 | A1 | 5/2013 | Lee et al. |
| 2013/0110505 | A1 | 5/2013 | Gruber et al. |
| 2013/0110515 | A1 | 5/2013 | Guzzoni et al. |
| 2013/0110518 | A1 | 5/2013 | Gruber et al. |
| 2013/0110519 | A1 | 5/2013 | Cheyer et al. |
| 2013/0110520 | A1 | 5/2013 | Cheyer et al. |
| 2013/0110943 | A1 | 5/2013 | Menon et al. |
| 2013/0111330 | A1 | 5/2013 | Staikos et al. |
| 2013/0111348 | A1 | 5/2013 | Gruber et al. |
| 2013/0111487 | A1 | 5/2013 | Cheyer et al. |
| 2013/0111581 | A1 | 5/2013 | Griffin et al. |
| 2013/0115927 | A1 | 5/2013 | Gruber et al. |
| 2013/0117022 | A1 | 5/2013 | Chen et al. |
| 2013/0124189 | A1 | 5/2013 | Baldwin et al. |
| 2013/0132084 | A1 | 5/2013 | Stonehocker et al. |
| 2013/0132089 | A1 | 5/2013 | Fanty et al. |
| 2013/0132871 | A1 | 5/2013 | Zeng et al. |
| 2013/0141551 | A1 | 6/2013 | Kim |
| 2013/0142317 | A1 | 6/2013 | Reynolds |
| 2013/0142345 | A1 | 6/2013 | Waldmann |
| 2013/0144594 | A1 | 6/2013 | Bangalore et al. |
| 2013/0144616 | A1 | 6/2013 | Bangalore et al. |
| 2013/0151339 | A1 | 6/2013 | Kim et al. |
| 2013/0152092 | A1 | 6/2013 | Yadgar et al. |
| 2013/0154811 | A1 | 6/2013 | Ferren et al. |
| 2013/0157629 | A1 | 6/2013 | Lee et al. |

(56) References Cited

U.S. PATENT DOCUMENTS

2013/0158977 A1 6/2013 Senior
2013/0165232 A1 6/2013 Nelson et al.
2013/0166303 A1 6/2013 Chang et al.
2013/0166442 A1 6/2013 Nakajima et al.
2013/0170738 A1 7/2013 Capuozzo et al.
2013/0172022 A1 7/2013 Seymour et al.
2013/0176244 A1 7/2013 Yamamoto et al.
2013/0176592 A1 7/2013 Sasaki
2013/0179440 A1 7/2013 Gordon
2013/0183944 A1 7/2013 Mozer et al.
2013/0185059 A1 7/2013 Riccardi et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0191117 A1 7/2013 Atti et al.
2013/0197911 A1 8/2013 Wei et al.
2013/0204813 A1 8/2013 Master et al.
2013/0204897 A1 8/2013 McDougall
2013/0207898 A1 8/2013 Sullivan et al.
2013/0218553 A1 8/2013 Fujii et al.
2013/0218560 A1 8/2013 Hsiao et al.
2013/0219333 A1 8/2013 Palwe et al.
2013/0222249 A1 8/2013 Pasquero et al.
2013/0225128 A1 8/2013 Gomar
2013/0226935 A1 8/2013 Bai et al.
2013/0231917 A1 9/2013 Naik
2013/0234947 A1 9/2013 Kristensson et al.
2013/0235987 A1 9/2013 Arroniz-Escobar et al.
2013/0238647 A1 9/2013 Thompson
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0275117 A1 10/2013 Winer
2013/0275138 A1* 10/2013 Gruber .................... G10L 13/00 704/260
2013/0275164 A1 10/2013 Gruber et al.
2013/0275199 A1 10/2013 Proctor, Jr. et al.
2013/0275625 A1 10/2013 Taivalsaari et al.
2013/0275875 A1* 10/2013 Gruber .................... G06F 3/167 715/728
2013/0275899 A1* 10/2013 Schubert ................ B60K 35/00 715/765
2013/0282709 A1 10/2013 Zhu et al.
2013/0283168 A1 10/2013 Brown et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kem et al.
2013/0307855 A1 11/2013 Lamb et al.
2013/0307997 A1 11/2013 O'Keefe et al.
2013/0308922 A1 11/2013 Sano et al.
2013/0311184 A1 11/2013 Badavne et al.
2013/0311997 A1 11/2013 Gruber et al.
2013/0316746 A1 11/2013 Miller et al.
2013/0322634 A1 12/2013 Bennett et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325481 A1 12/2013 Van Os et al.
2013/0325484 A1 12/2013 Chakladar et al.
2013/0325967 A1 12/2013 Parks et al.
2013/0325979 A1 12/2013 Mansfield et al.
2013/0329023 A1 12/2013 Suplee, III et al.
2013/0331127 A1 12/2013 Sabatelli et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332400 A1 12/2013 González
2013/0339256 A1 12/2013 Shroff
2013/0346068 A1 12/2013 Solem et al.
2013/0346347 A1 12/2013 Patterson et al.
2014/0006012 A1 1/2014 Zhou et al.
2014/0006025 A1 1/2014 Krishnan et al.
2014/0006027 A1 1/2014 Kim et al.
2014/0006030 A1 1/2014 Fleizach et al.
2014/0006153 A1 1/2014 Thangam et al.
2014/0012574 A1 1/2014 Pasupalak et al.
2014/0012580 A1 1/2014 Ganong et al.
2014/0012586 A1 1/2014 Rubin et al.
2014/0019116 A1 1/2014 Lundberg et al.
2014/0019133 A1 1/2014 Bao et al.
2014/0019460 A1 1/2014 Sambrani et al.
2014/0028735 A1 1/2014 Williams et al.
2014/0032453 A1 1/2014 Eustice et al.
2014/0033071 A1 1/2014 Gruber et al.
2014/0035823 A1 2/2014 Khoe et al.
2014/0039894 A1 2/2014 Shostak
2014/0040274 A1 2/2014 Aravamudan et al.
2014/0040748 A1 2/2014 Lemay et al.
2014/0040801 A1 2/2014 Patel et al.
2014/0040918 A1 2/2014 Li et al.
2014/0046934 A1 2/2014 Zhou et al.
2014/0047001 A1 2/2014 Phillips et al.
2014/0052680 A1 2/2014 Nitz et al.
2014/0052791 A1 2/2014 Chakra et al.
2014/0053082 A1 2/2014 Park
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0068751 A1 3/2014 Last et al.
2014/0074466 A1 3/2014 Sharifi et al.
2014/0074470 A1 3/2014 Jansche et al.
2014/0074472 A1 3/2014 Lin et al.
2014/0074483 A1 3/2014 Van Os
2014/0074815 A1 3/2014 Plimton
2014/0078065 A1 3/2014 Akkok
2014/0079195 A1 3/2014 Srivastava et al.
2014/0080428 A1 3/2014 Rhoads et al.
2014/0081633 A1 3/2014 Badaskar et al.
2014/0082501 A1 3/2014 Bae et al.
2014/0086458 A1 3/2014 Rogers et al.
2014/0087711 A1 3/2014 Geyer et al.
2014/0088961 A1 3/2014 Woodward et al.
2014/0095171 A1 4/2014 Lynch et al.
2014/0095173 A1 4/2014 Cabaco et al.
2014/0096209 A1 4/2014 Saraf et al.
2014/0098247 A1 4/2014 Rao et al.
2014/0108017 A1 4/2014 Mason et al.
2014/0114554 A1 4/2014 Lagassey
2014/0118155 A1 5/2014 Bowers et al.
2014/0122059 A1 5/2014 Patel et al.
2014/0122086 A1 5/2014 Kapur et al.
2014/0122136 A1 5/2014 Jayanthi
2014/0122153 A1 5/2014 Truitt
2014/0134983 A1 5/2014 Jung
2014/0135036 A1 5/2014 Bonanni et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0142922 A1 5/2014 Liang et al.
2014/0142923 A1 5/2014 Jones et al.
2014/0142935 A1 5/2014 Lindahl et al.
2014/0143550 A1 5/2014 Ganong, III et al.
2014/0143721 A1 5/2014 Suzuki et al.

(56) References Cited

U.S. PATENT DOCUMENTS

| | | | |
|---|---|---|---|
| 2014/0146200 | A1 | 5/2014 | Scott et al. |
| 2014/0152577 | A1 | 6/2014 | Yuen et al. |
| 2014/0155031 | A1 | 6/2014 | Lee et al. |
| 2014/0157422 | A1 | 6/2014 | Livshits et al. |
| 2014/0163951 | A1 | 6/2014 | Nikoulina et al. |
| 2014/0163953 | A1 | 6/2014 | Parikh |
| 2014/0163954 | A1 | 6/2014 | Joshi et al. |
| 2014/0163977 | A1 | 6/2014 | Hoffmeister et al. |
| 2014/0163981 | A1 | 6/2014 | Cook et al. |
| 2014/0163995 | A1 | 6/2014 | Burns et al. |
| 2014/0164476 | A1 | 6/2014 | Thomson |
| 2014/0164532 | A1 | 6/2014 | Lynch et al. |
| 2014/0164533 | A1 | 6/2014 | Lynch et al. |
| 2014/0169795 | A1 | 6/2014 | Clough |
| 2014/0172878 | A1 | 6/2014 | Clark et al. |
| 2014/0173460 | A1 | 6/2014 | Kim |
| 2014/0180499 | A1 | 6/2014 | Cooper et al. |
| 2014/0180689 | A1 | 6/2014 | Kim et al. |
| 2014/0180697 | A1 | 6/2014 | Torok et al. |
| 2014/0181865 | A1 | 6/2014 | Koganei |
| 2014/0188477 | A1 | 7/2014 | Zhang |
| 2014/0195226 | A1 | 7/2014 | Yun et al. |
| 2014/0195230 | A1 | 7/2014 | Han et al. |
| 2014/0195233 | A1 | 7/2014 | Bapat |
| 2014/0195244 | A1 | 7/2014 | Cha et al. |
| 2014/0195251 | A1 | 7/2014 | Zeinstra et al. |
| 2014/0195252 | A1 | 7/2014 | Gruber et al. |
| 2014/0198048 | A1 | 7/2014 | Unruh et al. |
| 2014/0203939 | A1 | 7/2014 | Harrington et al. |
| 2014/0205076 | A1 | 7/2014 | Kumar et al. |
| 2014/0207439 | A1 | 7/2014 | Venkatapathy et al. |
| 2014/0207446 | A1 | 7/2014 | Klein et al. |
| 2014/0207468 | A1 | 7/2014 | Bartnik |
| 2014/0207582 | A1 | 7/2014 | Flinn et al. |
| 2014/0214429 | A1 | 7/2014 | Pantel |
| 2014/0214537 | A1 | 7/2014 | Yoo et al. |
| 2014/0218372 | A1 | 8/2014 | Missig et al. |
| 2014/0222436 | A1 | 8/2014 | Binder et al. |
| 2014/0222678 | A1 | 8/2014 | Sheets et al. |
| 2014/0223377 | A1 | 8/2014 | Shaw et al. |
| 2014/0223481 | A1 | 8/2014 | Fundament |
| 2014/0230055 | A1 | 8/2014 | Boehl |
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0244248 | A1 | 8/2014 | Arisoy et al. |
| 2014/0244249 | A1 | 8/2014 | Mohamed et al. |
| 2014/0244254 | A1 | 8/2014 | Ju et al. |
| 2014/0244257 | A1 | 8/2014 | Colibro et al. |
| 2014/0244258 | A1 | 8/2014 | Song et al. |
| 2014/0244263 | A1 | 8/2014 | Pontual et al. |
| 2014/0244268 | A1 | 8/2014 | Abdelsamie et al. |
| 2014/0244271 | A1 | 8/2014 | Lindahl |
| 2014/0244712 | A1 | 8/2014 | Walters et al. |
| 2014/0245140 | A1 | 8/2014 | Brown et al. |
| 2014/0247383 | A1 | 9/2014 | Dave et al. |
| 2014/0247926 | A1 | 9/2014 | Gainsboro et al. |
| 2014/0249817 | A1 | 9/2014 | Hart et al. |
| 2014/0249821 | A1 | 9/2014 | Kennewick et al. |
| 2014/0250046 | A1 | 9/2014 | Winn et al. |
| 2014/0257809 | A1 | 9/2014 | Goel et al. |
| 2014/0257815 | A1 | 9/2014 | Zhao et al. |
| 2014/0258857 | A1 | 9/2014 | Dykstra-Erickson et al. |
| 2014/0267022 | A1 | 9/2014 | Kim |
| 2014/0267599 | A1 | 9/2014 | Drouin et al. |
| 2014/0272821 | A1 | 9/2014 | Pitschel et al. |
| 2014/0274005 | A1 | 9/2014 | Luna et al. |
| 2014/0274203 | A1 | 9/2014 | Ganong et al. |
| 2014/0274211 | A1 | 9/2014 | Sejnoha et al. |
| 2014/0278343 | A1 | 9/2014 | Tran |
| 2014/0278349 | A1 | 9/2014 | Grieves et al. |
| 2014/0278379 | A1 | 9/2014 | Coccaro et al. |
| 2014/0278390 | A1 | 9/2014 | Kingsbury et al. |
| 2014/0278391 | A1 | 9/2014 | Braho et al. |
| 2014/0278394 | A1 | 9/2014 | Bastyr et al. |
| 2014/0278406 | A1 | 9/2014 | Tsumura et al. |
| 2014/0278413 | A1 | 9/2014 | Pitschel et al. |
| 2014/0278429 | A1 | 9/2014 | Ganong, III |
| 2014/0278435 | A1 | 9/2014 | Ganong et al. |
| 2014/0278443 | A1 | 9/2014 | Gunn et al. |
| 2014/0278513 | A1 | 9/2014 | Prakash et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0281983 | A1 | 9/2014 | Xian et al. |
| 2014/0282003 | A1 | 9/2014 | Gruber et al. |
| 2014/0282007 | A1 | 9/2014 | Fleizach |
| 2014/0282045 | A1 | 9/2014 | Ayanam et al. |
| 2014/0282201 | A1 | 9/2014 | Pasquero et al. |
| 2014/0282586 | A1 | 9/2014 | Shear et al. |
| 2014/0282743 | A1 | 9/2014 | Howard et al. |
| 2014/0288990 | A1 | 9/2014 | Moore et al. |
| 2014/0289508 | A1 | 9/2014 | Wang |
| 2014/0297267 | A1 | 10/2014 | Spencer et al. |
| 2014/0297281 | A1 | 10/2014 | Togawa et al. |
| 2014/0297284 | A1 | 10/2014 | Gruber et al. |
| 2014/0297288 | A1 | 10/2014 | Yu et al. |
| 2014/0304605 | A1 | 10/2014 | Ohmura et al. |
| 2014/0310001 | A1 | 10/2014 | Kalns et al. |
| 2014/0310002 | A1 | 10/2014 | Nitz et al. |
| 2014/0316585 | A1 | 10/2014 | Boesveld et al. |
| 2014/0317030 | A1 | 10/2014 | Shen et al. |
| 2014/0317502 | A1 | 10/2014 | Brown et al. |
| 2014/0324884 | A1 | 10/2014 | Lindahl et al. |
| 2014/0337048 | A1 | 11/2014 | Brown et al. |
| 2014/0337266 | A1 | 11/2014 | Wolverton et al. |
| 2014/0337371 | A1 | 11/2014 | Li |
| 2014/0337438 | A1 | 11/2014 | Govande et al. |
| 2014/0337751 | A1 | 11/2014 | Lim et al. |
| 2014/0337814 | A1 | 11/2014 | Kalns et al. |
| 2014/0342762 | A1 | 11/2014 | Hajdu et al. |
| 2014/0344627 | A1 | 11/2014 | Schaub et al. |
| 2014/0344687 | A1 | 11/2014 | Durham et al. |
| 2014/0350924 | A1 | 11/2014 | Zurek et al. |
| 2014/0350933 | A1 | 11/2014 | Bak et al. |
| 2014/0351741 | A1 | 11/2014 | Medlock et al. |
| 2014/0351760 | A1 | 11/2014 | Skory et al. |
| 2014/0358519 | A1 | 12/2014 | Mirkin et al. |
| 2014/0358523 | A1 | 12/2014 | Sheth et al. |
| 2014/0361973 | A1 | 12/2014 | Raux et al. |
| 2014/0365209 | A1 | 12/2014 | Evermann |
| 2014/0365214 | A1 | 12/2014 | Bayley |
| 2014/0365216 | A1 | 12/2014 | Gruber et al. |
| 2014/0365226 | A1 | 12/2014 | Sinha |
| 2014/0365227 | A1 | 12/2014 | Cash et al. |
| 2014/0365407 | A1 | 12/2014 | Brown et al. |
| 2014/0365880 | A1 | 12/2014 | Bellegarda |
| 2014/0365885 | A1 | 12/2014 | Carson et al. |
| 2014/0365895 | A1 | 12/2014 | Luna |
| 2014/0365922 | A1 | 12/2014 | Yang |
| 2014/0370817 | A1 | 12/2014 | Luna |
| 2014/0370841 | A1 | 12/2014 | Roberts et al. |
| 2014/0372112 | A1 | 12/2014 | Xue et al. |
| 2014/0372356 | A1 | 12/2014 | Bilal et al. |
| 2014/0372931 | A1 | 12/2014 | Zhai et al. |
| 2014/0379334 | A1 | 12/2014 | Fry |
| 2015/0003797 | A1 | 1/2015 | Schmidt |
| 2015/0006148 | A1 | 1/2015 | Goldszmit et al. |
| 2015/0006157 | A1 | 1/2015 | Andrade Silva et al. |
| 2015/0006176 | A1 | 1/2015 | Pogue et al. |
| 2015/0006178 | A1 | 1/2015 | Peng et al. |
| 2015/0006184 | A1 | 1/2015 | Marti et al. |
| 2015/0006199 | A1 | 1/2015 | Snider et al. |
| 2015/0012271 | A1 | 1/2015 | Peng et al. |
| 2015/0019219 | A1 | 1/2015 | Tzirkel-hancock et al. |
| 2015/0019221 | A1 | 1/2015 | Lee et al. |
| 2015/0031416 | A1 | 1/2015 | Wells et al. |
| 2015/0033219 | A1 | 1/2015 | Breiner et al. |
| 2015/0039292 | A1 | 2/2015 | Suleman et al. |
| 2015/0039299 | A1 | 2/2015 | Weinstein et al. |
| 2015/0039305 | A1 | 2/2015 | Huang |
| 2015/0040012 | A1 | 2/2015 | Faaborg et al. |

(56) References Cited

U.S. PATENT DOCUMENTS

| | | | |
|---|---|---|---|
| 2015/0045003 | A1 | 2/2015 | Vora et al. |
| 2015/0045068 | A1 | 2/2015 | Softer et al. |
| 2015/0046537 | A1 | 2/2015 | Rakib |
| 2015/0050633 | A1 | 2/2015 | Christmas et al. |
| 2015/0058013 | A1 | 2/2015 | Pakhomov et al. |
| 2015/0058018 | A1 | 2/2015 | Georges et al. |
| 2015/0058785 | A1 | 2/2015 | Ookawara |
| 2015/0065200 | A1 | 3/2015 | Namgung et al. |
| 2015/0066494 | A1 | 3/2015 | Salvador et al. |
| 2015/0066496 | A1 | 3/2015 | Deoras et al. |
| 2015/0066506 | A1 | 3/2015 | Romano et al. |
| 2015/0066516 | A1 | 3/2015 | Nishikawa et al. |
| 2015/0067485 | A1 | 3/2015 | Kim et al. |
| 2015/0067822 | A1 | 3/2015 | Randall |
| 2015/0073788 | A1 | 3/2015 | Allauzen et al. |
| 2015/0073804 | A1 | 3/2015 | Senior et al. |
| 2015/0074524 | A1 | 3/2015 | Nicholson et al. |
| 2015/0082229 | A1 | 3/2015 | Ouyang et al. |
| 2015/0088511 | A1 | 3/2015 | Bharadwaj et al. |
| 2015/0088514 | A1 | 3/2015 | Typrin |
| 2015/0088522 | A1 | 3/2015 | Hendrickson et al. |
| 2015/0088523 | A1 | 3/2015 | Schuster |
| 2015/0095031 | A1 | 4/2015 | Conkie et al. |
| 2015/0095278 | A1 | 4/2015 | Flinn et al. |
| 2015/0100316 | A1 | 4/2015 | Williams et al. |
| 2015/0100537 | A1 | 4/2015 | Grieves et al. |
| 2015/0100983 | A1 | 4/2015 | Pan |
| 2015/0106093 | A1 | 4/2015 | Weeks et al. |
| 2015/0113407 | A1 | 4/2015 | Hoffert et al. |
| 2015/0120723 | A1 | 4/2015 | Deshmukh et al. |
| 2015/0121216 | A1 | 4/2015 | Brown et al. |
| 2015/0127350 | A1 | 5/2015 | Agiomyrgiannakis |
| 2015/0133109 | A1 | 5/2015 | Freeman et al. |
| 2015/0134334 | A1 | 5/2015 | Sachidanandam et al. |
| 2015/0135085 | A1 | 5/2015 | Shoham et al. |
| 2015/0135123 | A1 | 5/2015 | Carr et al. |
| 2015/0142420 | A1 | 5/2015 | Sarikaya et al. |
| 2015/0142438 | A1 | 5/2015 | Dai et al. |
| 2015/0142447 | A1 | 5/2015 | Kennewick et al. |
| 2015/0142851 | A1 | 5/2015 | Gupta et al. |
| 2015/0148013 | A1 | 5/2015 | Baldwin et al. |
| 2015/0149177 | A1 | 5/2015 | Kains et al. |
| 2015/0149182 | A1 | 5/2015 | Kains et al. |
| 2015/0149354 | A1 | 5/2015 | Mccoy |
| 2015/0149469 | A1 | 5/2015 | Xu et al. |
| 2015/0154185 | A1 | 6/2015 | Waibel |
| 2015/0154976 | A1 | 6/2015 | Mutagi |
| 2015/0161370 | A1 | 6/2015 | North et al. |
| 2015/0161989 | A1 | 6/2015 | Hsu et al. |
| 2015/0162001 | A1 | 6/2015 | Kar et al. |
| 2015/0163558 | A1 | 6/2015 | Wheatley |
| 2015/0169284 | A1 | 6/2015 | Quast et al. |
| 2015/0169336 | A1 | 6/2015 | Harper et al. |
| 2015/0170664 | A1 | 6/2015 | Doherty et al. |
| 2015/0172463 | A1 | 6/2015 | Quast et al. |
| 2015/0178388 | A1 | 6/2015 | Wmnemoeller et al. |
| 2015/0179176 | A1 | 6/2015 | Ryu et al. |
| 2015/0185964 | A1 | 7/2015 | Stout |
| 2015/0186012 | A1 | 7/2015 | Coleman et al. |
| 2015/0186110 | A1 | 7/2015 | Kannan |
| 2015/0186155 | A1 | 7/2015 | Brown et al. |
| 2015/0186156 | A1 | 7/2015 | Brown et al. |
| 2015/0186351 | A1 | 7/2015 | Hicks et al. |
| 2015/0187355 | A1 | 7/2015 | Parkinson et al. |
| 2015/0187369 | A1 | 7/2015 | Dadu et al. |
| 2015/0189362 | A1 | 7/2015 | Lee et al. |
| 2015/0193379 | A1 | 7/2015 | Mehta |
| 2015/0193391 | A1 | 7/2015 | Khvostichenko et al. |
| 2015/0193392 | A1 | 7/2015 | Greenblatt et al. |
| 2015/0194152 | A1 | 7/2015 | Katuri et al. |
| 2015/0195372 | A1 | 7/2015 | Zhang et al. |
| 2015/0195606 | A1 | 7/2015 | McDevitt |
| 2015/0199077 | A1 | 7/2015 | Zuger et al. |
| 2015/0199960 | A1 | 7/2015 | Huo et al. |
| 2015/0199965 | A1 | 7/2015 | Leak et al. |
| 2015/0199967 | A1 | 7/2015 | Reddy et al. |
| 2015/0201064 | A1 | 7/2015 | Bells et al. |
| 2015/0205858 | A1 | 7/2015 | Xie et al. |
| 2015/0208226 | A1 | 7/2015 | Kuusilinna et al. |
| 2015/0212791 | A1 | 7/2015 | Kumar et al. |
| 2015/0213796 | A1 | 7/2015 | Waltermann et al. |
| 2015/0220507 | A1 | 8/2015 | Mohaier et al. |
| 2015/0221304 | A1 | 8/2015 | Stewart |
| 2015/0221307 | A1 | 8/2015 | Shah et al. |
| 2015/0227505 | A1 | 8/2015 | Morimoto |
| 2015/0227633 | A1 | 8/2015 | Shapira |
| 2015/0228281 | A1 | 8/2015 | Raniere |
| 2015/0234636 | A1 | 8/2015 | Barnes, Jr. |
| 2015/0234800 | A1 | 8/2015 | Patrick et al. |
| 2015/0242091 | A1 | 8/2015 | Lu et al. |
| 2015/0243278 | A1 | 8/2015 | Kibre et al. |
| 2015/0243283 | A1 | 8/2015 | Halash et al. |
| 2015/0245154 | A1 | 8/2015 | Dadu et al. |
| 2015/0248651 | A1 | 9/2015 | Akutagawa et al. |
| 2015/0248886 | A1 | 9/2015 | Sarikaya et al. |
| 2015/0254057 | A1 | 9/2015 | Klein et al. |
| 2015/0254058 | A1 | 9/2015 | Klein et al. |
| 2015/0254333 | A1 | 9/2015 | Fife et al. |
| 2015/0255071 | A1 | 9/2015 | Chiba |
| 2015/0256873 | A1 | 9/2015 | Klein et al. |
| 2015/0261496 | A1 | 9/2015 | Faaborg et al. |
| 2015/0269139 | A1 | 9/2015 | McAteer et al. |
| 2015/0277574 | A1 | 10/2015 | Jain et al. |
| 2015/0278370 | A1 | 10/2015 | Stratvert et al. |
| 2015/0279358 | A1 | 10/2015 | Kingsbury et al. |
| 2015/0279360 | A1 | 10/2015 | Mengibar et al. |
| 2015/0281380 | A1 | 10/2015 | Wang et al. |
| 2015/0286627 | A1 | 10/2015 | Chang et al. |
| 2015/0287401 | A1 | 10/2015 | Lee et al. |
| 2015/0287409 | A1 | 10/2015 | Jang |
| 2015/0288629 | A1 | 10/2015 | Choi et al. |
| 2015/0294086 | A1 | 10/2015 | Kare et al. |
| 2015/0294516 | A1 | 10/2015 | Chiang |
| 2015/0295915 | A1 | 10/2015 | Xiu |
| 2015/0302855 | A1 | 10/2015 | Kim et al. |
| 2015/0302856 | A1 | 10/2015 | Kim et al. |
| 2015/0302857 | A1 | 10/2015 | Yamada |
| 2015/0309997 | A1 | 10/2015 | Lee et al. |
| 2015/0310858 | A1 | 10/2015 | Li et al. |
| 2015/0310862 | A1 | 10/2015 | Dauphin et al. |
| 2015/0310879 | A1 | 10/2015 | Buchanan et al. |
| 2015/0312182 | A1 | 10/2015 | Langholz |
| 2015/0317069 | A1 | 11/2015 | Clements et al. |
| 2015/0317310 | A1 | 11/2015 | Eiche et al. |
| 2015/0324041 | A1 | 11/2015 | Varley et al. |
| 2015/0324334 | A1 | 11/2015 | Lee et al. |
| 2015/0331664 | A1 | 11/2015 | Osawa et al. |
| 2015/0331711 | A1 | 11/2015 | Huang et al. |
| 2015/0332667 | A1 | 11/2015 | Mason |
| 2015/0339049 | A1 | 11/2015 | Kasemset et al. |
| 2015/0339391 | A1 | 11/2015 | Kang et al. |
| 2015/0340040 | A1 | 11/2015 | Mun et al. |
| 2015/0340042 | A1 | 11/2015 | Sejnoha et al. |
| 2015/0341717 | A1 | 11/2015 | Song et al. |
| 2015/0347086 | A1 | 12/2015 | Liedholm et al. |
| 2015/0347381 | A1 | 12/2015 | Bellegarda |
| 2015/0347382 | A1 | 12/2015 | Dolfing et al. |
| 2015/0347385 | A1 | 12/2015 | Flor et al. |
| 2015/0347393 | A1 | 12/2015 | Futrell et al. |
| 2015/0347733 | A1 | 12/2015 | Tsou et al. |
| 2015/0347985 | A1 | 12/2015 | Gross et al. |
| 2015/0348547 | A1 | 12/2015 | Paulik et al. |
| 2015/0348548 | A1 | 12/2015 | Piernot et al. |
| 2015/0348549 | A1 | 12/2015 | Giuli et al. |
| 2015/0348551 | A1 | 12/2015 | Gruber et al. |
| 2015/0348554 | A1 | 12/2015 | Orr et al. |
| 2015/0350031 | A1 | 12/2015 | Burks et al. |
| 2015/0352999 | A1 | 12/2015 | Bando et al. |
| 2015/0355879 | A1 | 12/2015 | Beckhardt et al. |
| 2015/0364140 | A1 | 12/2015 | Thorn |
| 2015/0370531 | A1 | 12/2015 | Faaborg |
| 2015/0370780 | A1 | 12/2015 | Wang et al. |
| 2015/0371639 | A1 | 12/2015 | Foerster et al. |
| 2015/0371665 | A1 | 12/2015 | Naik et al. |

(56) References Cited

U.S. PATENT DOCUMENTS

2015/0373183 A1 12/2015 Woolsey et al.
2015/0382047 A1 12/2015 Napolitano et al.
2015/0382079 A1 12/2015 Lister et al.
2016/0004690 A1 1/2016 Bangalore et al.
2016/0014476 A1 1/2016 Caliendo, Jr. et al.
2016/0019886 A1 1/2016 Hong
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034811 A1 2/2016 Paulik et al.
2016/0042735 A1 2/2016 Vibbert et al.
2016/0042748 A1 2/2016 Jain et al.
2016/0048666 A1 2/2016 Dey et al.
2016/0055422 A1 2/2016 Li
2016/0062605 A1 3/2016 Agarwal et al.
2016/0063998 A1 3/2016 Krishnamoorthy et al.
2016/0070581 A1 3/2016 Soon-Shiong
2016/0071516 A1 3/2016 Lee et al.
2016/0071521 A1 3/2016 Haughay
2016/0077794 A1 3/2016 Kim et al.
2016/0078860 A1 3/2016 Paulik et al.
2016/0080165 A1 3/2016 Ehsani et al.
2016/0086116 A1 3/2016 Rao et al.
2016/0091967 A1 3/2016 Prokofieva et al.
2016/0092447 A1 3/2016 Venkataraman et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094979 A1 3/2016 Naik et al.
2016/0098991 A1 4/2016 Luo et al.
2016/0111091 A1 4/2016 Bakish
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0147725 A1 5/2016 Patten et al.
2016/0148610 A1 5/2016 Kennewick, Jr. et al.
2016/0155442 A1 6/2016 Kannan et al.
2016/0155443 A1 6/2016 Khan et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173960 A1 6/2016 Snibbe et al.
2016/0179462 A1 6/2016 Bjorkengren
2016/0180844 A1 6/2016 Vanbion et al.
2016/0182410 A1 6/2016 Janakiraman et al.
2016/0188181 A1 6/2016 Smith
2016/0188738 A1 6/2016 Gruber et al.
2016/0189717 A1 6/2016 Kannan et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0240187 A1 8/2016 Fleizach et al.
2016/0247061 A1 8/2016 Trask et al.
2016/0253312 A1 9/2016 Rhodes
2016/0259623 A1 9/2016 Sumner et al.
2016/0259656 A1* 9/2016 Sumner .................. G06F 3/167
2016/0259779 A1 9/2016 Labsk et al.
2016/0260431 A1* 9/2016 Newendorp ............ G10L 15/32
2016/0260433 A1 9/2016 Sumner et al.
2016/0260434 A1 9/2016 Gelfenbeyn et al.
2016/0260436 A1* 9/2016 Lemay .................... G10L 15/22
2016/0266871 A1 9/2016 Schmid et al.
2016/0267904 A1 9/2016 Biadsy et al.
2016/0275941 A1 9/2016 Bellegarda et al.
2016/0275947 A1 9/2016 Li et al.
2016/0282956 A1 9/2016 Ouyang et al.
2016/0284005 A1 9/2016 Daniel et al.
2016/0284199 A1 9/2016 Dotan-Cohen et al.
2016/0286045 A1 9/2016 Shaltiel et al.
2016/0299685 A1 10/2016 Zhai et al.
2016/0299882 A1 10/2016 Hegerty et al.
2016/0299883 A1 10/2016 Zhu et al.
2016/0307566 A1 10/2016 Bellegarda
2016/0314788 A1 10/2016 Jitkoff et al.
2016/0314792 A1 10/2016 Alvarez et al.
2016/0321261 A1 11/2016 Spasojevic et al.
2016/0322045 A1 11/2016 Hatfeild et al.
2016/0322050 A1 11/2016 Wang et al.
2016/0328893 A1 11/2016 Cordova et al.
2016/0336007 A1 11/2016 Hanazawa
2016/0336010 A1 11/2016 Lindahl
2016/0336024 A1 11/2016 Choi et al.
2016/0337299 A1 11/2016 Lane et al.
2016/0337301 A1 11/2016 Rollins et al.
2016/0342685 A1 11/2016 Basu et al.
2016/0351190 A1 12/2016 Binder et al.
2016/0357304 A1 12/2016 Hatori et al.
2016/0357728 A1 12/2016 Bellegarda et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad et al.
2016/0359771 A1 12/2016 Sridhar
2016/0360039 A1 12/2016 Sanghavi et al.
2016/0364378 A1 12/2016 Futrell et al.
2016/0371250 A1 12/2016 Rhodes
2016/0378747 A1 12/2016 Orr et al.
2016/0379091 A1 12/2016 Lin et al.
2016/0379626 A1 12/2016 Deisher et al.
2016/0379641 A1 12/2016 Liu et al.
2017/0004824 A1 1/2017 Yoo et al.
2017/0011303 A1 1/2017 Annapureddy et al.
2017/0011742 A1 1/2017 Jing et al.
2017/0018271 A1 1/2017 Khan et al.
2017/0019987 A1 1/2017 Dragone et al.
2017/0026509 A1* 1/2017 Rand ................ H04M 1/72448
2017/0031576 A1 2/2017 Saoji et al.
2017/0040002 A1 2/2017 Basson et al.
2017/0055895 A1 3/2017 Des Jardins et al.
2017/0060853 A1 3/2017 Lee et al.
2017/0068423 A1 3/2017 Napolitano et al.
2017/0068513 A1 3/2017 Stasior et al.
2017/0068550 A1* 3/2017 Zeitlin .................. G10L 15/285
2017/0068670 A1 3/2017 Orr et al.
2017/0083179 A1 3/2017 Gruber et al.
2017/0083285 A1 3/2017 Meyers et al.
2017/0091168 A1 3/2017 Bellegarda et al.
2017/0092270 A1* 3/2017 Newendorp ....... H04N 21/4394
2017/0092278 A1 3/2017 Evermann et al.
2017/0102915 A1 4/2017 Kuscher et al.
2017/0103749 A1 4/2017 Zhao et al.
2017/0105190 A1 4/2017 Logan et al.
2017/0116989 A1 4/2017 Yadgar et al.
2017/0124190 A1 5/2017 Wang et al.
2017/0125016 A1 5/2017 Wang
2017/0127124 A9 5/2017 Wilson et al.
2017/0132199 A1 5/2017 Vescovi et al.
2017/0140644 A1 5/2017 Hwang et al.
2017/0154033 A1 6/2017 Lee
2017/0154055 A1 6/2017 Dimson et al.
2017/0161018 A1 6/2017 Lemay et al.
2017/0162191 A1* 6/2017 Grost .................... G10L 15/075
2017/0169819 A1 6/2017 Mese et al.
2017/0178619 A1 6/2017 Naik et al.
2017/0178626 A1 6/2017 Gruber et al.
2017/0180499 A1 6/2017 Gelfenbeyn et al.
2017/0185581 A1 6/2017 Bojja et al.
2017/0186429 A1 6/2017 Giuli et al.
2017/0193083 A1 7/2017 Bhatt et al.

(56) References Cited

U.S. PATENT DOCUMENTS

| | | | | |
|---|---|---|---|---|
| 2017/0199874 | A1 | 7/2017 | Patel et al. | |
| 2017/0200066 | A1 | 7/2017 | Wang et al. | |
| 2017/0221486 | A1 | 8/2017 | Kurata et al. | |
| 2017/0227935 | A1 | 8/2017 | Su et al. | |
| 2017/0228382 | A1 | 8/2017 | Haviv et al. | |
| 2017/0230709 | A1 | 8/2017 | Van Os et al. | |
| 2017/0242653 | A1 | 8/2017 | Lang et al. | |
| 2017/0243468 | A1 | 8/2017 | Dotan-Cohen et al. | |
| 2017/0256256 | A1 | 9/2017 | Wang et al. | |
| 2017/0263248 | A1 | 9/2017 | Gruber et al. | |
| 2017/0263249 | A1 | 9/2017 | Akbacak et al. | |
| 2017/0278514 | A1 | 9/2017 | Mathias et al. | |
| 2017/0285915 | A1 | 10/2017 | Napolitano et al. | |
| 2017/0286397 | A1 | 10/2017 | Gonzalez | |
| 2017/0316775 | A1 | 11/2017 | Le et al. | |
| 2017/0316782 | A1 | 11/2017 | Haughay et al. | |
| 2017/0323637 | A1 | 11/2017 | Naik | |
| 2017/0345411 | A1 | 11/2017 | Raitio et al. | |
| 2017/0346949 | A1 | 11/2017 | Sanghavi et al. | |
| 2017/0352346 | A1 | 12/2017 | Paulik et al. | |
| 2017/0352350 | A1 | 12/2017 | Booker et al. | |
| 2017/0357478 | A1* | 12/2017 | Piersol | G10L 15/30 |
| 2017/0357632 | A1 | 12/2017 | Pagallo et al. | |
| 2017/0357633 | A1 | 12/2017 | Wang et al. | |
| 2017/0357637 | A1 | 12/2017 | Nell et al. | |
| 2017/0357640 | A1 | 12/2017 | Bellegarda et al. | |
| 2017/0357716 | A1 | 12/2017 | Bellegarda et al. | |
| 2017/0358300 | A1* | 12/2017 | Laurens | G06F 3/167 |
| 2017/0358301 | A1 | 12/2017 | Raitio et al. | |
| 2017/0358303 | A1* | 12/2017 | Walker, II | G10L 15/22 |
| 2017/0358304 | A1 | 12/2017 | Castillo et al. | |
| 2017/0358305 | A1 | 12/2017 | Kudurshian et al. | |
| 2018/0007060 | A1 | 1/2018 | Leblang et al. | |
| 2018/0007538 | A1 | 1/2018 | Naik et al. | |
| 2018/0012596 | A1 | 1/2018 | Piernot et al. | |
| 2018/0033431 | A1 | 2/2018 | Newendorp et al. | |
| 2018/0054505 | A1 | 2/2018 | Hart et al. | |
| 2018/0060312 | A1 | 3/2018 | Won | |
| 2018/0062691 | A1 | 3/2018 | Barnett, Jr. | |
| 2018/0063624 | A1 | 3/2018 | Boesen | |
| 2018/0067914 | A1 | 3/2018 | Chen et al. | |
| 2018/0090143 | A1 | 3/2018 | Saddler et al. | |
| 2018/0107945 | A1 | 4/2018 | Gao et al. | |
| 2018/0108346 | A1 | 4/2018 | Paulik et al. | |
| 2018/0137857 | A1 | 5/2018 | Zhou et al. | |
| 2018/0144748 | A1 | 5/2018 | Leong | |
| 2018/0196683 | A1* | 7/2018 | Radebaugh | G06F 9/453 |
| 2019/0371315 | A1* | 12/2019 | Newendorp | G10L 15/22 |

FOREIGN PATENT DOCUMENTS

| | | | |
|---|---|---|---|
| CA | 2792412 | A1 | 7/2011 |
| CA | 2666438 | C | 6/2013 |
| CN | 101162153 | A | 4/2008 |
| CN | 101174366 | A | 5/2008 |
| CN | 101179754 | A | 5/2008 |
| CN | 101183525 | A | 5/2008 |
| CN | 101188644 | A | 5/2008 |
| CN | 101228503 | A | 7/2008 |
| CN | 101233741 | A | 7/2008 |
| CN | 101246020 | A | 8/2008 |
| CN | 101271689 | A | 9/2008 |
| CN | 101277501 | A | 10/2008 |
| CN | 101281745 | A | 10/2008 |
| CN | 101292282 | A | 10/2008 |
| CN | 101297541 | A | 10/2008 |
| CN | 101325756 | A | 12/2008 |
| CN | 101416471 | A | 4/2009 |
| CN | 101427244 | A | 5/2009 |
| CN | 101448340 | A | 6/2009 |
| CN | 101453498 | A | 6/2009 |
| CN | 101499156 | A | 8/2009 |
| CN | 101500041 | A | 8/2009 |
| CN | 101535983 | A | 9/2009 |
| CN | 101547396 | A | 9/2009 |
| CN | 101557432 | A | 10/2009 |
| CN | 101604521 | A | 12/2009 |
| CN | 101632316 | A | 1/2010 |
| CN | 101636736 | A | 1/2010 |
| CN | 101673544 | A | 3/2010 |
| CN | 101751387 | A | 6/2010 |
| CN | 101847405 | A | 9/2010 |
| CN | 101894547 | A | 11/2010 |
| CN | 101939740 | A | 1/2011 |
| CN | 101951553 | A | 1/2011 |
| CN | 102137193 | A | 7/2011 |
| CN | 102160043 | A | 8/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102368256 | A | 3/2012 |
| CN | 102405463 | A | 4/2012 |
| CN | 102498457 | A | 6/2012 |
| CN | 102629246 | A | 8/2012 |
| CN | 102682771 | A | 9/2012 |
| CN | 102685295 | A | 9/2012 |
| CN | 102693725 | A | 9/2012 |
| CN | 102792320 | A | 11/2012 |
| CN | 102870065 | A | 1/2013 |
| CN | 102917004 | A | 2/2013 |
| CN | 103035240 | A | 4/2013 |
| CN | 103038728 | A | 4/2013 |
| CN | 103093334 | A | 5/2013 |
| CN | 104038621 | A | 9/2014 |
| CN | 104284257 | A | 1/2015 |
| CN | 104423625 | A | 3/2015 |
| CN | 104463552 | A | 3/2015 |
| CN | 104516522 | A | 4/2015 |
| CN | 104854583 | A | 8/2015 |
| CN | 104951077 | A | 9/2015 |
| CN | 105247511 | A | 1/2016 |
| CN | 105471705 | A | 4/2016 |
| CN | 107919123 | A | 4/2018 |
| DE | 102008024258 | A1 | 11/2009 |
| EP | 1892700 | A1 | 2/2008 |
| EP | 1912205 | A2 | 4/2008 |
| EP | 1939860 | A1 | 7/2008 |
| EP | 1944997 | A2 | 7/2008 |
| EP | 651543 | B1 | 9/2008 |
| EP | 1909263 | B1 | 1/2009 |
| EP | 1335620 | B1 | 3/2009 |
| EP | 2069895 | A1 | 6/2009 |
| EP | 2081185 | A1 | 7/2009 |
| EP | 2094032 | A1 | 8/2009 |
| EP | 2096840 | A1 | 9/2009 |
| EP | 2107553 | A1 | 10/2009 |
| EP | 2109295 | A1 | 10/2009 |
| EP | 1720375 | B1 | 7/2010 |
| EP | 2205010 | A1 | 7/2010 |
| EP | 2309491 | A1 | 4/2011 |
| EP | 2329348 | | 6/2011 |
| EP | 2400373 | A1 | 12/2011 |
| EP | 2431842 | A2 | 3/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2733598 | A2 | 5/2014 |
| EP | 2801890 | A1 | 11/2014 |
| EP | 2801972 | A1 | 11/2014 |
| EP | 2930715 | A1 | 10/2015 |
| EP | 2938022 | A1 | 10/2015 |
| EP | 2940556 | A1 | 11/2015 |
| EP | 3246916 | A1 | 11/2017 |
| EP | 3300074 | A1 | 3/2018 |
| FR | 2911201 | A1 | 7/2008 |
| GB | 2445436 | A | 7/2008 |
| GB | 2445667 | A | 7/2008 |
| JP | 2008-009120 | A | 1/2008 |
| JP | 2008-21002 | A | 1/2008 |
| JP | 2008-26381 | A | 2/2008 |
| JP | 2008-39928 | A | 2/2008 |
| JP | 2008-58813 | A | 3/2008 |

(56) References Cited

FOREIGN PATENT DOCUMENTS

| | | | |
|---|---|---|---|
| JP | 2008-064687 | A | 3/2008 |
| JP | 2008-90545 | A | 4/2008 |
| JP | 2008-97003 | A | 4/2008 |
| JP | 2008-134949 | A | 6/2008 |
| JP | 2008-158510 | A | 7/2008 |
| JP | 2008-526101 | A | 7/2008 |
| JP | 2008-185693 | A | 8/2008 |
| JP | 2008-198022 | A | 8/2008 |
| JP | 2008-217468 | A | 9/2008 |
| JP | 2008-228129 | A | 9/2008 |
| JP | 2008-233678 | A | 10/2008 |
| JP | 2008-236448 | A | 10/2008 |
| JP | 2008-252161 | A | 10/2008 |
| JP | 2008-268684 | A | 11/2008 |
| JP | 2008-269480 | A | 11/2008 |
| JP | 2008-271481 | A | 11/2008 |
| JP | 2008-275731 | A | 11/2008 |
| JP | 2008-299221 | A | 12/2008 |
| JP | 2009-2850 | A | 1/2009 |
| JP | 2009-503623 | A | 1/2009 |
| JP | 2009-36999 | A | 2/2009 |
| JP | 2009-505142 | A | 2/2009 |
| JP | 2009-47920 | A | 3/2009 |
| JP | 2009-069062 | A | 4/2009 |
| JP | 2009-98490 | A | 5/2009 |
| JP | 2009-110300 | A | 5/2009 |
| JP | 2009-134409 | A | 6/2009 |
| JP | 2009-140444 | A | 6/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-223840 | A | 10/2009 |
| JP | 2009-294913 | A | 12/2009 |
| JP | 2009-294946 | A | 12/2009 |
| JP | 2009-543166 | A | 12/2009 |
| JP | 2010-66519 | A | 3/2010 |
| JP | 2010-78979 | A | 4/2010 |
| JP | 2010-108378 | A | 5/2010 |
| JP | 2010-518475 | A | 5/2010 |
| JP | 2010-518526 | A | 5/2010 |
| JP | 2010-157207 | A | 7/2010 |
| JP | 2010-224236 | A | 10/2010 |
| JP | 4563106 | B2 | 10/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-238022 | A | 11/2011 |
| JP | 2011-250027 | A | 12/2011 |
| JP | 2012-014394 | A | 1/2012 |
| JP | 2012-508530 | A | 4/2012 |
| JP | 2012-089020 | A | 5/2012 |
| JP | 2012-116442 | A | 6/2012 |
| JP | 2012-142744 | A | 7/2012 |
| JP | 2012-147063 | A | 8/2012 |
| JP | 2012-518847 | A | 8/2012 |
| JP | 2013-37688 | A | 2/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-080476 | A | 5/2013 |
| JP | 2013-517566 | A | 5/2013 |
| JP | 2013-134430 | A | 7/2013 |
| JP | 2013-527947 | A | 7/2013 |
| JP | 2013-528012 | A | 7/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2014-10688 | A | 1/2014 |
| JP | 2014-026629 | A | 2/2014 |
| JP | 2014-60600 | A | 4/2014 |
| JP | 2014-72586 | A | 4/2014 |
| JP | 2014-077969 | A | 5/2014 |
| JP | 2014-124332 | A | 7/2014 |
| JP | 2014-145842 | A | 8/2014 |
| JP | 2014-150323 | A | 8/2014 |
| JP | 2014-222514 | A | 11/2014 |
| JP | 2015-8001 | A | 1/2015 |
| JP | 2015-501022 | A | 1/2015 |
| JP | 2015-41845 | A | 3/2015 |
| JP | 2015-94848 | A | 5/2015 |
| JP | 2015-519675 | A | 7/2015 |
| JP | 2015-524974 | A | 8/2015 |
| JP | 2015-526776 | A | 9/2015 |
| JP | 2015-528140 | A | 9/2015 |
| JP | 2015-528918 | A | 10/2015 |
| JP | 2016-119615 | A | 6/2016 |
| KR | 10-0801227 | B1 | 2/2008 |
| KR | 10-0810500 | B1 | 3/2008 |
| KR | 10-2008-0033070 | A | 4/2008 |
| KR | 10-0819928 | B1 | 4/2008 |
| KR | 10-2008-0049647 | A | 6/2008 |
| KR | 10-2008-0059332 | A | 6/2008 |
| KR | 10-2008-0109322 | A | 12/2008 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-1178310 | B1 | 8/2012 |
| KR | 10-2012-0120316 | A | 11/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0147557 | A | 12/2014 |
| KR | 10-2015-0043512 | A | 4/2015 |
| KR | 10-2016-0010523 | A | 1/2016 |
| RU | 2349970 | C2 | 3/2009 |
| RU | 2353068 | C2 | 4/2009 |
| RU | 2364917 | C2 | 8/2009 |
| TW | 200801988 | A | 1/2008 |
| TW | I301373 | B | 9/2008 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 2011-42823 | A1 | 12/2011 |
| TW | 201227715 | A1 | 7/2012 |
| TW | 201245989 | A1 | 11/2012 |
| TW | 201312548 | A1 | 3/2013 |
| WO | 2008/030970 | A2 | 3/2008 |

(56) References Cited

FOREIGN PATENT DOCUMENTS

WO 2008/071231 A1 6/2008
WO 2008/085742 A2 7/2008
WO 2008/098900 A2 8/2008
WO 2008/109835 A2 8/2008
WO 2008/120036 A1 10/2008
WO 2008/130095 A1 10/2008
WO 2008/140236 A1 11/2008
WO 2008/142472 A1 11/2008
WO 2008/153639 A1 12/2008
WO 2009/009240 A2 1/2009
WO 2009/016631 A2 2/2009
WO 2009/017280 A1 2/2009
WO 2009/075912 A1 6/2009
WO 2009/104126 A1 8/2009
WO 2009/156438 A1 12/2009
WO 2009/156978 A1 12/2009
WO 2010/054373 A2 5/2010
WO 2010/075623 A1 7/2010
WO 2010/100937 A1 9/2010
WO 2010/141802 A1 12/2010
WO 2011/057346 A1 5/2011
WO 2011/060106 A1 5/2011
WO 2011/088053 A2 7/2011
WO 2011/093025 A1 8/2011
WO 2011/116309 A1 9/2011
WO 2011/133543 A1 10/2011
WO 2011/150730 A1 12/2011
WO 2011/163350 A1 12/2011
WO 2011/088053 A3 1/2012
WO 2012/019637 A1 2/2012
WO 2012/129231 A1 9/2012
WO 2012/135157 A2 10/2012
WO 2012/154317 A1 11/2012
WO 2012/155079 A2 11/2012
WO 2012/167168 A2 12/2012
WO 2013/009578 A2 1/2013
WO 2013/022135 A1 2/2013
WO 2013/022223 A2 2/2013
WO 2013/048880 A1 4/2013
WO 2013/049358 A1 4/2013
WO 2013/163113 A1 10/2013
WO 2013/169842 A2 11/2013
WO 2013/173504 A1 11/2013
WO 2013/173511 A2 11/2013
WO 2013/176847 A1 11/2013
WO 2013/184953 A1 12/2013
WO 2013/184990 A1 12/2013
WO 2014/003138 A1 1/2014
WO 2014/021967 A1 2/2014
WO 2014/022148 A1 2/2014
WO 2014/028797 A1 2/2014
WO 2014/031505 A1 2/2014
WO 2014/066352 A1 5/2014
WO 2014/078965 A1 5/2014
WO 2014/096506 A1 6/2014
WO 2014/124332 A2 8/2014
WO 2014/137074 A1 9/2014
WO 2014/138604 A1 9/2014
WO 2014/143959 A2 9/2014
WO 2014/144579 A1 9/2014
WO 2014/159581 A1 10/2014
WO 2014/197336 A1 12/2014
WO 2014/200728 A1 12/2014
WO 2014/204659 A2 12/2014
WO 2015/018440 A1 2/2015
WO 2015/030796 A1 3/2015
WO 2015/041892 A1 3/2015
WO 2015/084659 A1 6/2015
WO 2015/092943 A1 6/2015
WO 2015/094169 A1 6/2015
WO 2015/094369 A1 6/2015
WO 2015/099939 A1 7/2015
WO 2015/116151 A1 8/2015
WO 2015/151133 A1 10/2015
WO 2015/157013 A1 10/2015
WO 2015/183401 A1 12/2015
WO 2015/183699 A1 12/2015
WO 2015/184186 A1 12/2015
WO 2015/200207 A1 12/2015
WO 2016/028946 A1 2/2016
WO 2016/033257 A1 3/2016
WO 2016/057268 A1 4/2016
WO 2016/075081 A1 5/2016
WO 2016/085775 A2 6/2016
WO 2016/100139 A1 6/2016
WO 2016/144982 A1 9/2016
WO 2016/209444 A1 12/2016
WO 2017/044260 A1 3/2017
WO 2017/044629 A1 3/2017
WO 2017/053311 A1 3/2017

OTHER PUBLICATIONS

Invitation to Pay Addition Fees received for PCT Patent Application No. PCT/US2019/024332, dated Jun. 13, 2019, 11 pages.

International Search Report and Written Opinion received for PCT Patent Application No. PCT/US2019/024332, dated Aug. 21, 2019, 20 pages.

Office Action and Search Report received for Danish Patent Application No. PA201870355, dated Feb. 3, 2020, 5 pages.

Office Action received for Danish Patent Application No. PA201870355, dated Jul. 16, 2019, 3 pages.

Office Action received for Danish Patent Application No. PA201870355, dated Jun. 24, 2020, 4 pages.

International Preliminary Report on Patentability received for PCT Patent Application No. PCT/US2019/024332, dated Dec. 10, 2020, 14 pages.

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.

"DIRECTV™ Voice", Now Part of the DIRECTTV Mobile App for Phones, Sep. 18, 2013, 5 pages.

Headset Button Controller v7.3 APK Full APP Download for Android, Blackberry, iPhone, Jan. 27, 2014, 11 pages.

Hear voice from Google translate, Available on URL:https://www.youtube.com/watch?v=18AvMhFqD28, Jan. 28, 2011, 1 page.

Interactive Voice, available at <http://www.helloivee.com/company/>, retrieved on Feb. 10, 2014, 2 pages.

Meet Ivee, Your Wi-Fi Voice Activated Assistant, available at <http://www.helloivee.com/>, retrieved on Feb. 10, 2014, 8 pages.

Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.

Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.

Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.

"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.

Speaker Recognition, Wikipedia, The Free Enclyclopedia, Nov. 2, 2010, 4 pages.

"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.

Adium, "AboutAdium—Adium X—Trac", available at <http://web.archive.org/web/20070819113247/http://trac.adiumx.com/wiki/AboutAdium>, retrieved on Nov. 25, 2011, 2 pages.

(56) References Cited

OTHER PUBLICATIONS

Alfred App, "Alfred", available at <http://www.alfredapp.com/>, retrieved on Feb. 8, 2012, 5 pages.
Anania, Peter, "Amazon Echo with Home Automation (Smartthings)", Available online at https://www.youtube.com/watch?v=LMW6aXmsWNE, Dec. 20, 2015, 1 page.
API.AI, "Android App Review—Speaktoit Assistant", Available at <https://www.youtube.com/watch?v=myE498nyfGw>, Mar. 30, 2011, 3 pages.
Apple Computer, "Knowledge Navigator", published by Apple Computer no later than 2008, as depicted in Exemplary Screenshots from video entitled 'Knowledge Navigator', 2008, 7 pages.
Apple, "VoiceOver", available at <http://www.apple.com/accessibility/voiceover/>, May 19, 2014, 3 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).
Berry et al., "PTIME: Personalized Assistance for Calendaring", ACM Transactions on Intelligent Systems and Technology, vol. 2, No. 4, Article 40, Jul. 2011, pp. 1-22.
Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Butcher, Mike, "EVI Arrives in Town to go Toe-to-Toe with Siri", TechCrunch, Jan. 23, 2012, 2 pages.
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—Vii Jomadas En Tecnologia Del Habla And Iii Iberiansl Tech Workshop, Nov. 21, 2012, pp. 1-10.
Castleos, "Whole House Voice Control Demonstration", available online at: https://www.youtube.com/watch?v=9SRCoxrZ_W4, Jun. 2, 2012, 26 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chen, Yi, "Multimedia Siri Finds and Plays Whatever You Ask For", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Deedeevuu, "Amazon Echo Alarm Feature", Available online at https://www.youtube.com/watch?v=fdjU8eRLk7c, Feb. 16, 2015, 1 page.
Elliott et al., "Annotation Suggestion and Search for Personal Multimedia Objects on the Web", CIVR, Jul. 7-9, 2008, pp. 75-84.
Erol et al., "Multimedia Clip Generation From Documents for Browsing on Mobile Devices", IEEE Transactions on Multimedia, vol. 10, No. 5, Aug. 2008, 13 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Filipowicz, Luke, "How to use the Quick Type Keyboard in iOS 8", available online at <https://www.imore.com/comment/568232>, Oct. 11, 2014, pp. 1-17.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.
Gannes, Liz, "Alfred App Gives Personalized Restaurant Recommendations", AllThingsD, Jul. 18, 2011, pp. 1-3.
Gomez et al., "Mouth Gesture and Voice Command Based Robot Command Interface", IEEE International Conference on Robotics and Automation, May 12-17, 2009, pp. 333-338.
Gruber, Thomas R., et al., U.S. Appl. No. 61/186,414, filed Jun. 12, 2009 titled "System and Method for Semantic Auto-Completion" 13 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
id3.org, "id3v2.4.0-Frames", available at <http://id3.org/id3v2.4.0-frames?action=print>, retrieved on Jan. 22, 2015, 41 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE,, 2012,, pp. 4821-4824.
Kane et al., "Slide Rule: Making Mobile Touch Screens Accessible to Blind People Using Multi-Touch Interaction Techniques", ASSETS, Oct. 13-15, 2008, pp. 73-80.
Karn, Ujjwal, "An Intuitive Explanation of Convolutional Neural Networks", The Data Science Blog, Aug. 11, 2016, 23 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Knownav, "Knowledge Navigator", YouTube Video available at <http://www.youtube.com/watch?v=QRH8eimU_20>, Apr. 29, 2008, 1 page.
Lewis, Cameron, "Task Ave for iPhone Review", Mac Life, Available at <http://www.maclife.com/article/reviews/task_ave_iphone_review>, Mar. 3, 2011, 5 pages.
Liou et al., "Autoencoder for Words", Neurocomputing, vol. 139, Sep. 2014, pp. 84-96.

(56) References Cited

OTHER PUBLICATIONS

Mactech, "Keystrokes 3.5 for Mac OS X Boosts Word Prediction", available at <http://www.mactech.com/news/?p=1007129>, retrieved on Jan. 7, 2008, 3 pages.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Manning et al., "Introduction to Information Retrieval", New York, Cambridge University Press, 2008, 504 pages.
Martins et al., "Extracting and Exploring the Geo-Temporal Semantics of Textual Resources", Semantic Computing, IEEE International Conference, 2008, pp. 1-9.
Mhatre et al., "Donna Interactive Chat-bot acting as a Personal Assistant", International Journal of Computer Applications (0975-8887), vol. 140, No. 10, Apr. 2016, 6 pages.
Microsoft, "Turn On and Use Magnifier", available at <http://www.microsoft.com/windowsxp/using/accessibility/magnifierturnon.mspx>, retrieved on Jun. 6, 2009.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Morrison, Jonathan, "iPhone 5 Siri Demo", Online Available at <https://www.youtube.com/watch?v=_wHWwG5lhWc>, Sep. 21, 2012, 3 pages.
Morton, Philip, "Checking If An Element Is Hidden", Stackoverflow, Available at <http://stackoverflow.com/questions/178325/checking-if-an-element-is-hidden>, Oct. 7, 2008, 12 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Nozawa, Naoki et al., "iPhone 4S Perfect Manual", vol. 1, First Edition, Nov. 11, 2011, 5 pages.
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a)(3)).
Osxdaily, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Oct. 25-29, 2014, pp. 1532-1543.
Phoenix Solutions, Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me . . . Show/Hide Performance", available at http://www.learningjquery.com/2010/05/now-you-see-me-showhide-performance, May 4, 2010, 3 pages.
Rios, Mafe, "New bar search for Facebook", Youtube, available at "https://www.youtube.com/watch?v=vwgN1WbvCas", 1 page.
Routines, "SmartThings Support", Available online at <https://web.archive.org/web/20151207165701/https://support.smartthings.com/hc/en-us/articles/205380034-Routines>, 2015, 2 pages.
Sarawagi, Sunita, "CRF Package Page", available at <http://crf.sourceforge.net/>, retrieved on Apr. 6, 2011, 2 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Simonite, Tom, "One Easy Way to Make Siri Smarter", Technology Review, Oct. 18, 2011, 2 pages.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", INTERSPEECH 2012, ISCA's 13 Annual Conference, Sep. 9-13, 2012, pp. 194-197.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
TextnDrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakTolt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Vlingo InCar, "Distracted Driving Solution with Vlingo InCar", YouTube Video, Available online at <http://www.youtube.com/watch?v=Vqs8XfXxgz4>, Oct. 2010, 2 pages.

(56) References Cited

OTHER PUBLICATIONS

Vlingo, "Vlingo Launches Voice Enablement Application on Apple App Store", Press Release, Dec. 3, 2008, 2 pages.
Vodafone Deutschland, "Samsung Galaxy S3 Tastatur Spracheingabe", Available online at—"https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=0tEU61nHHA4>, Jul. 30, 2009, 1 page.
VoiceontheGo, "Voice on the Go (BlackBerry)", YouTube Video, available online at <http://www.youtube.com/watch?v=pJqpWgQS98w>, Jul. 27, 2009, 1 page.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
X.Ai, "How it Works", May 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yan et al., "A Scalable Approach to Using DNN-Derived Features in GMM-HMM 3ased Acoustic Modeling for LVCSR", InInterspeech, 2013, pp. 104-108.
Young et al., "The Hidden Information State model: A practical framework for POMDP-based spoken dialogue management", Computer Speech & Language, vol. 24, Issue 2, 2010, pp. 150-174.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.

* cited by examiner

VIRTUAL ASSISTANT OPERATION IN MULTI-DEVICE ENVIRONMENTS

CROSS-REFERENCE TO RELATED APPLICATIONS

This application claims priority to U.S. Provisional Application Ser. No. 62/679,660, entitled "VIRTUAL ASSISTANT OPERATION IN MULTI-DEVICE ENVIRONMENTS," filed on Jun. 1, 2018, the content of which is incorporated by reference in its entirety for all purposes.

FIELD

The present disclosure relates generally to natural language processing and, more specifically, to operating one or more virtual assistants in a multi-device environment.

BACKGROUND

Digital assistants (or virtual assistants or intelligent automated assistants) can provide a beneficial human-machine interface. Such assistants can allow users to interact with devices or systems using natural language in spoken and/or text forms. For example, a user can provide a speech input containing a user request to a digital assistant operating on an electronic device. The virtual assistant can interpret the user's intent from the speech input and operationalize the user's intent into tasks. The tasks can then be performed by executing one or more services of the electronic device, and a relevant output responsive to the user request can be returned to the user.

A user may have one or more virtual-assistant capable electronic devices and may use an accessory device to communicate with the one or more virtual-assistant capable electronic devices. An accessory device can include a single piece or multiple pieces (e.g., a headphone that has two ear pieces for the left and right ears). When a user invokes a virtual assistant through an accessory device such as a headphone, there may be ambiguity as to which virtual-assistant capable electronic device the user is intended to use because the accessory device may be connected, or potentially connected, to multiple virtual-assistant capable electronic devices (e.g., a wearable device, a smartphone, tablet computer, etc.). Moreover, a particular virtual-assistant capable electronic device connected to the accessory device may not be able to perform the required task. As an example, an accessory device may be communicatively connected to a smartphone, but not a wearable device (e.g., a smartwatch). The user may request to start a workout, which is a request to start a workout on the wearable device, but not the smartphone. It would be desirable to determine the user intent and route the request to the wearable device to carry out the task without further user input to connect to the wearable device. Therefore, techniques that disambiguate the user's speech input received at an accessory device to determine which virtual-assistant capable electronic device the user intended to use, and techniques that intelligently routing the user request to a device that is capable of performing the requested task, are desired.

BRIEF SUMMARY

Existing techniques for invoking a virtual assistant operating on an electronic device through an accessory device typically requires the user's manual and explicit input to select the specific electronic device. For example, an accessory device may be connected to a virtual-assistant capable electronic device, but the particular virtual-assistant capable electronic device may not be able to perform the task the user requests (e.g., the particular virtual-assistant capable electronic device does not have a required sensor or application to perform the task). As a result, the user may be required to explicitly or manually select a virtual-assistant capable electronic device and then invoke the virtual assistant operating on that particular electronic device to perform the task. This is cumbersome and sometimes impractical or impossible (e.g., when the user is driving, performing sports activities, or otherwise incapable of or inconvenienced by having to manually invoke a virtual assistant at a desired electronic device).

Using the techniques described in this application, the user's speech input (or a representation thereof) to invoke a virtual assistant and to perform certain tasks can be received for intelligently and automatically selecting a particular electronic device among multiple devices for performing the task. Based on the selection, a command can be generated and intelligently and effectively routed to a particular electronic device that is capable or suitable to perform the requested tasks. The intelligent routing can be performed even if the particular electronic device is not communicatively coupled to the accessory device directly. The techniques described in this application thus provide an improved and more efficient human-machine interface by reducing or eliminating the burden for a user to manually or explicitly select a device for performing a task. The techniques thus improve the efficiency and the user-experience of a human-machine interface, and enhance the operability of the devices. This in turn reduces power usage and improves battery life of the accessory device and the electronic devices by enabling the user to use the devices more quickly and efficiently.

Systems and processes for providing a virtual assistant service are provided. In accordance with one or more examples, a method is performed at a first electronic device with one or more processors and memory and includes receiving, from an accessory device communicatively coupled to the first electronic device, a representation of a speech input representing a user request. The method further includes detecting a second electronic device and transmitting, from the first electronic device, a representation of the user request and data associated with the detected second electronic device to a third electronic device. The method further includes receiving, from the third electronic device, a determination of whether a task is to be performed by the second electronic device in accordance with the user request; and in accordance with a determination that a task is to be performed by the second electronic device, requesting the second electronic device to performed the task in accordance with the user request.

Systems and processes for disambiguating a speech input are provided. In accordance with one or more examples, a method is performed at an accessory device communicatively coupled to at least one of a first electronic device and a second electronic device and includes receiving a speech input representing a user request. The method further includes in response to receiving the speech input, determining whether the speech input includes a trigger phrase; and in accordance with a determination that the speech input includes a trigger phrase, obtaining a determination of whether a representation of the speech input is to be transmitted to the first electronic device or the second electronic device. The method further includes in accordance with a determination that the representation of the speech input is to be transmitted to the first electronic device but not the second electronic device, transmitting the representation of the speech input to the first electronic device; receiving audio data corresponding to performing a task in accordance with the user request; and outputting the received audio data.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
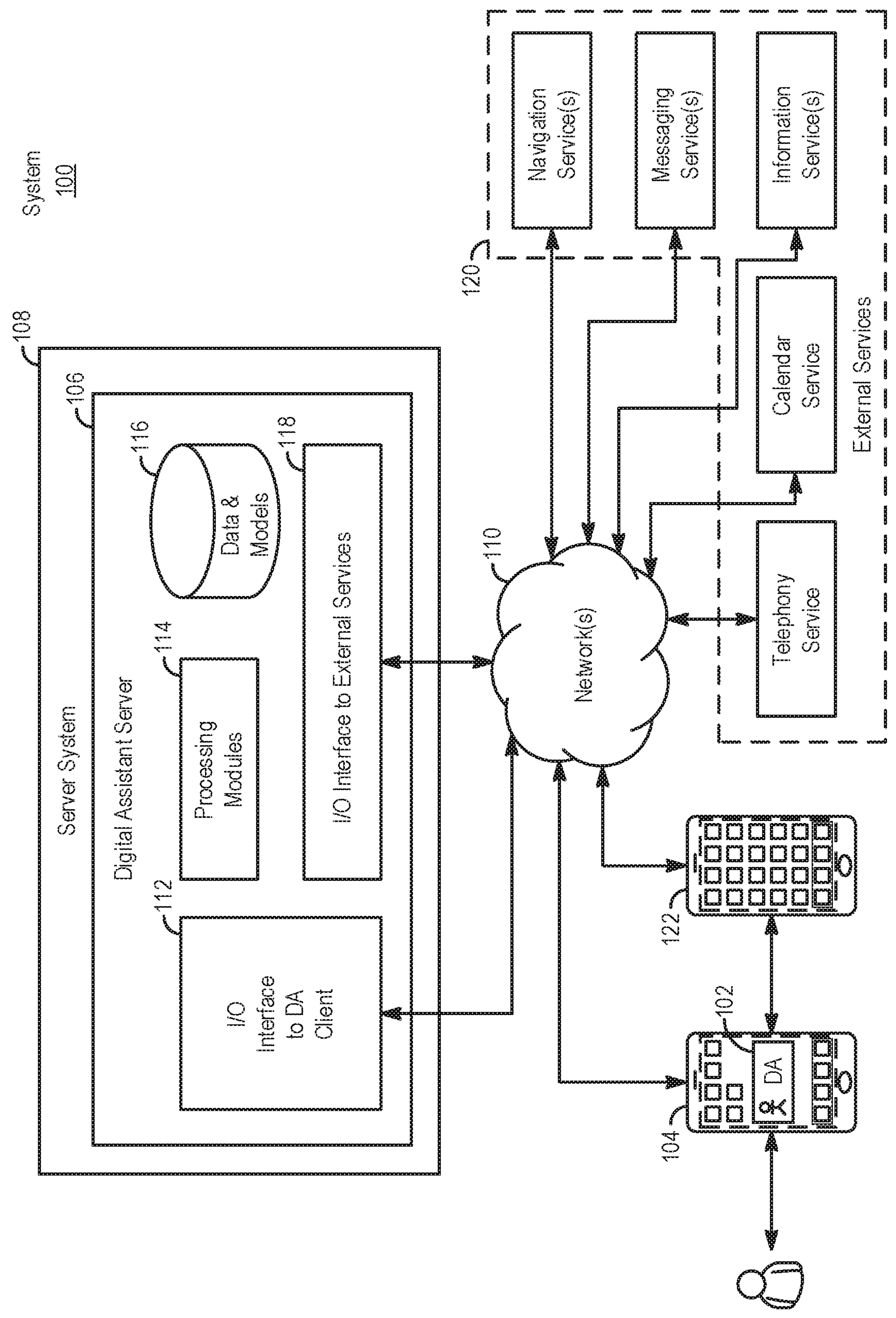
FIG. 1 is a block diagram illustrating a system and environment for implementing a digital assistant according to various examples.

In the following description of the disclosure and embodiments, reference is made to the accompanying drawings, in which it is shown by way of illustration, of specific embodiments that can be practiced. It is to be understood that other embodiments and examples can be practiced, and changes can be made without departing from the scope of the disclosure.

Techniques for invoking a virtual assistant operating on an electronic device based on speech input from an accessory device are desirable. As described herein, the user's speech input (or a representation thereof) to invoke a virtual assistant to perform certain tasks can be received from an accessory device for intelligently and automatically selecting a particular electronic device among multiple devices for performing the task. Based on the selection, a command can be generated and intelligently and effectively routed to a particular electronic device that is capable or suitable to perform the requested tasks. The intelligent routing can be performed even if the particular electronic device is not communicatively coupled to the accessory device directly. The techniques described in this application thus reduce or eliminate the burden for a user to manually or explicitly select a device for performing a task, improve the efficiency and user-experience of a human-machine interface, and enhance the operability of the devices. This in turn reduces power usage and improves battery life of the accessory device and the electronic devices by enabling the user to use the devices more quickly and efficiently.

Although the following description uses the terms "first," "second," etc., to describe various elements, these elements should not be limited by the terms. These terms are only used to distinguish one element from another. For example, a first electronic device could be termed a second electronic device and, similarly, a second electronic device could be termed a first electronic device, without departing from the scope of the various described examples. The first electronic device and the second electronic device can both be electronic devices and, in some cases, can be separate and different electronic devices.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term “if” may be construed to mean “when” or “upon” or “in response to determining” or “in response to detecting,” depending on the context. Similarly, the phrase “if it is determined” or “if [a stated condition or event] is detected” may be construed to mean “upon determining” or “in response to determining” or “upon detecting [the stated condition or event]” or “in response to detecting [the stated condition or event],” depending on the context.

1. System and Environment

FIG. 1 illustrates a block diagram of system 100 according to various examples. In some examples, system 100 implements a digital assistant. The terms “digital assistant,” “virtual assistant,” “intelligent automated assistant,” or “automatic digital assistant” refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as “Where am I right now?” Based on the user’s current location, the digital assistant answers, “You are in Central Park near the west gate.” The user also requests the performance of a task, for example, “Please invite my friends to my girlfriend’s birthday party next week.” in response, the digital assistant can acknowledge the request by saying “Yes, right away,” and then send a suitable calendar invite on behalf of the user to each of the user’s friends listed in the user’s electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter “DA client 102”) executed on user device 104 and server-side portion 106 (hereafter “DA server 106”) executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user’s intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
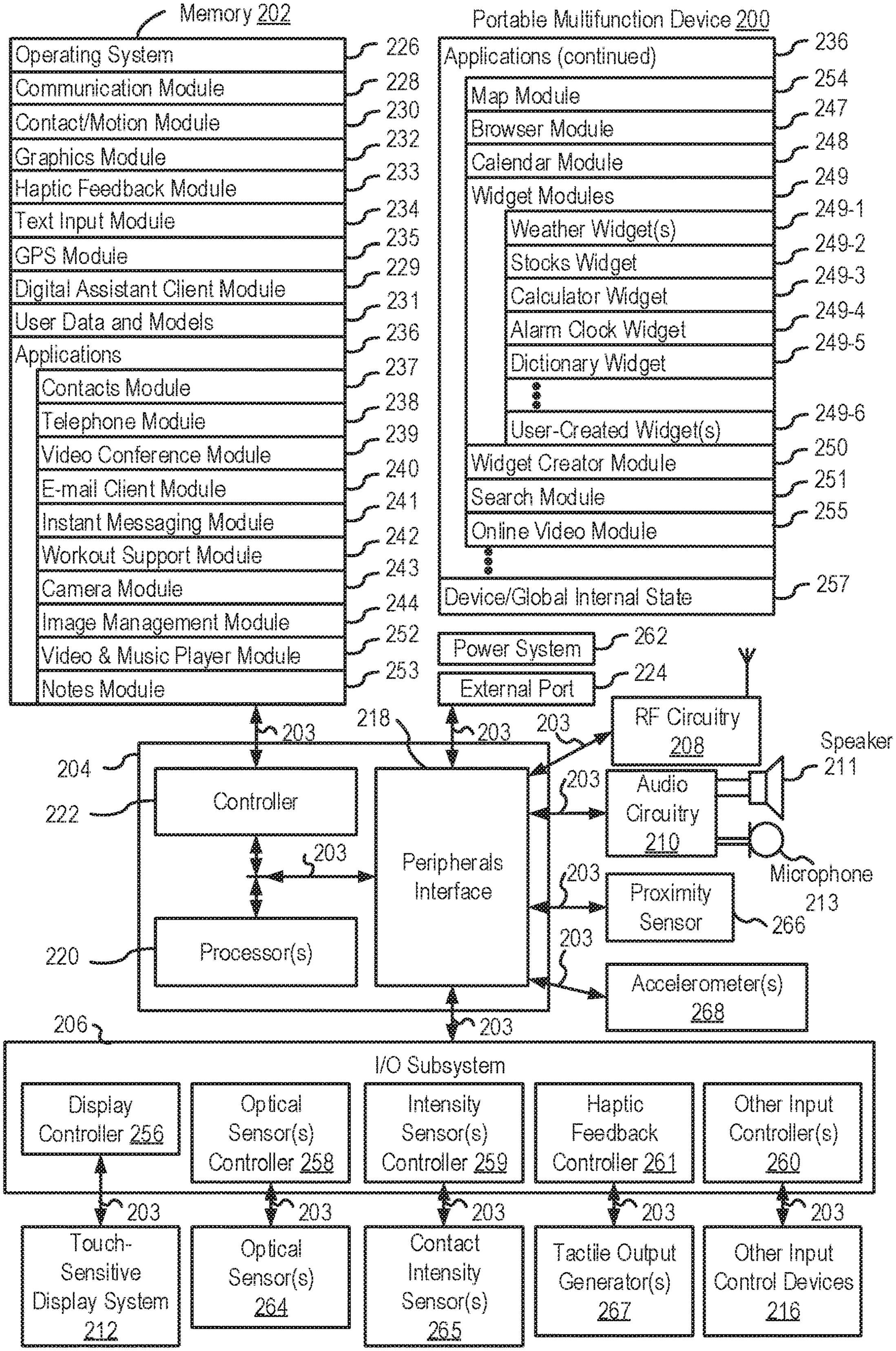
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202, is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RE circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RE circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NEC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BILE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211, Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932. (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed. May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed. Sep. 16, 2005; (8) U.S. patent application Ser. No. 11/228,737 "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or (GLONASS or other global navigation system) receiver (not shown) for obtaining information concerning the location and orientation (e.g., portrait or landscape) of device 200.

Figure 4:
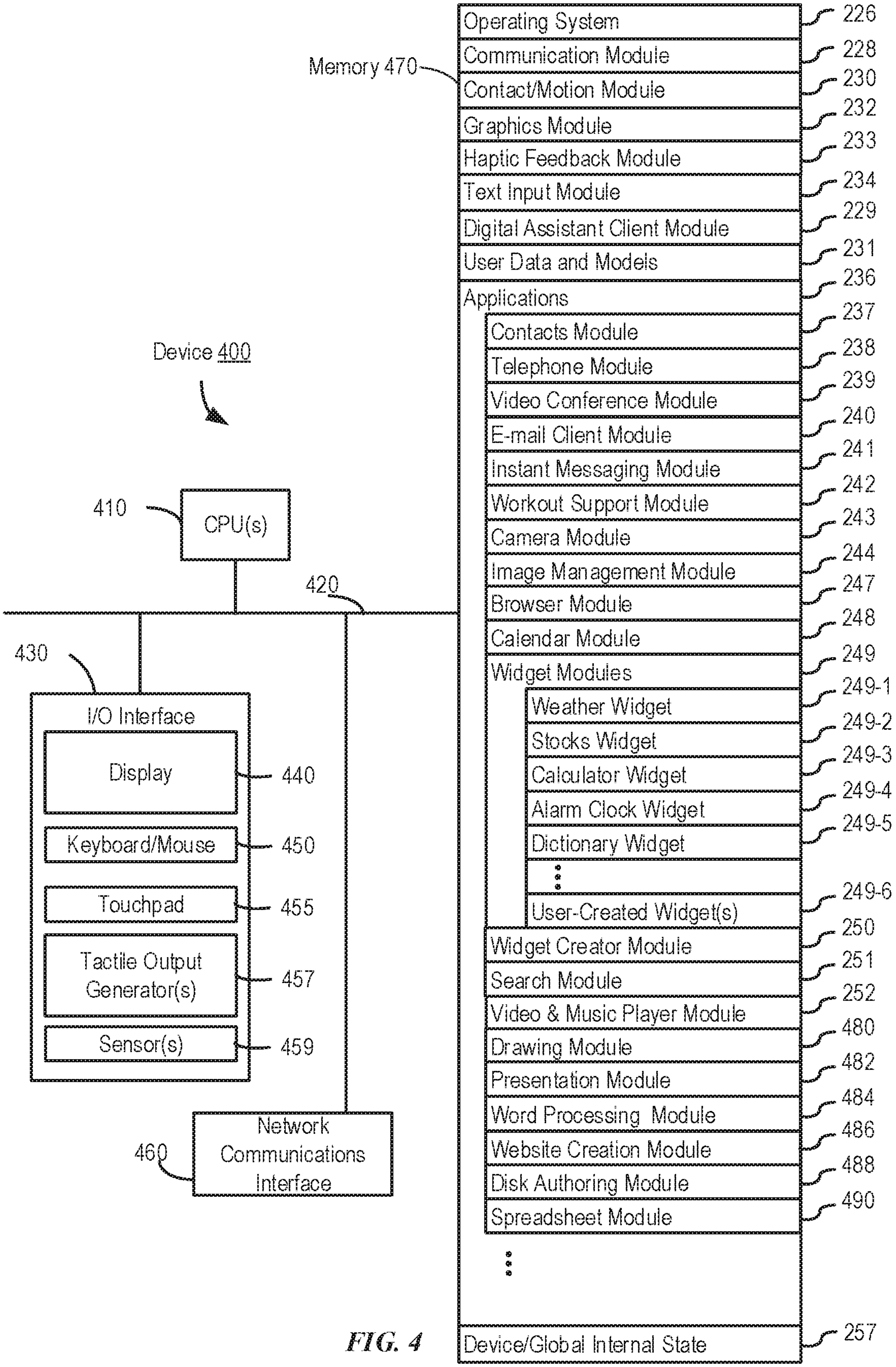
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241,
- Workout support module 242;
- Camera module 243 for still and/or video images;
- Image management module 244;
- Video player module;
- Music player module;
- Browser module 247:
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SLMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RE circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, (IPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and. Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
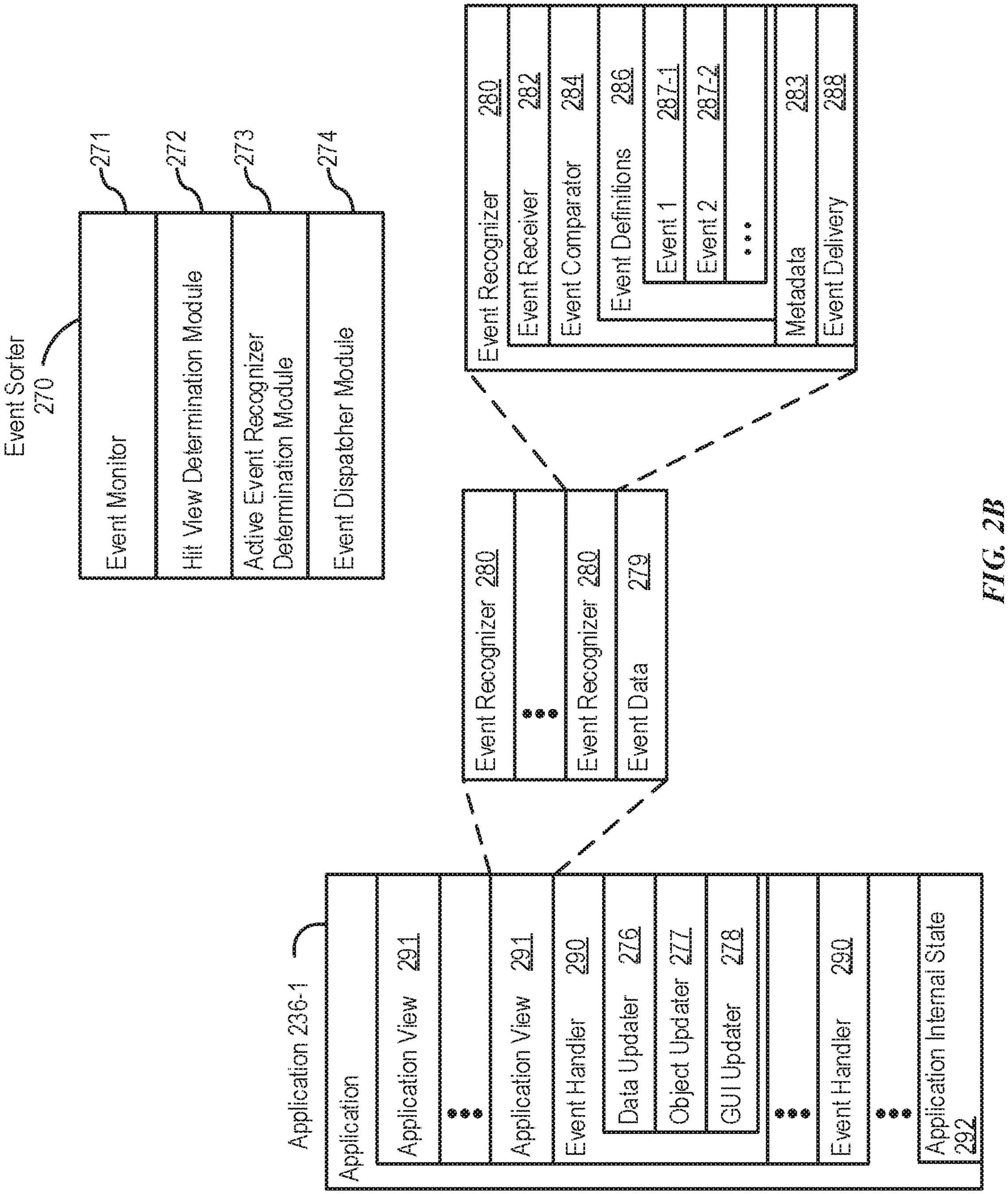
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view's) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of:

resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identities a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizes 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (87-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
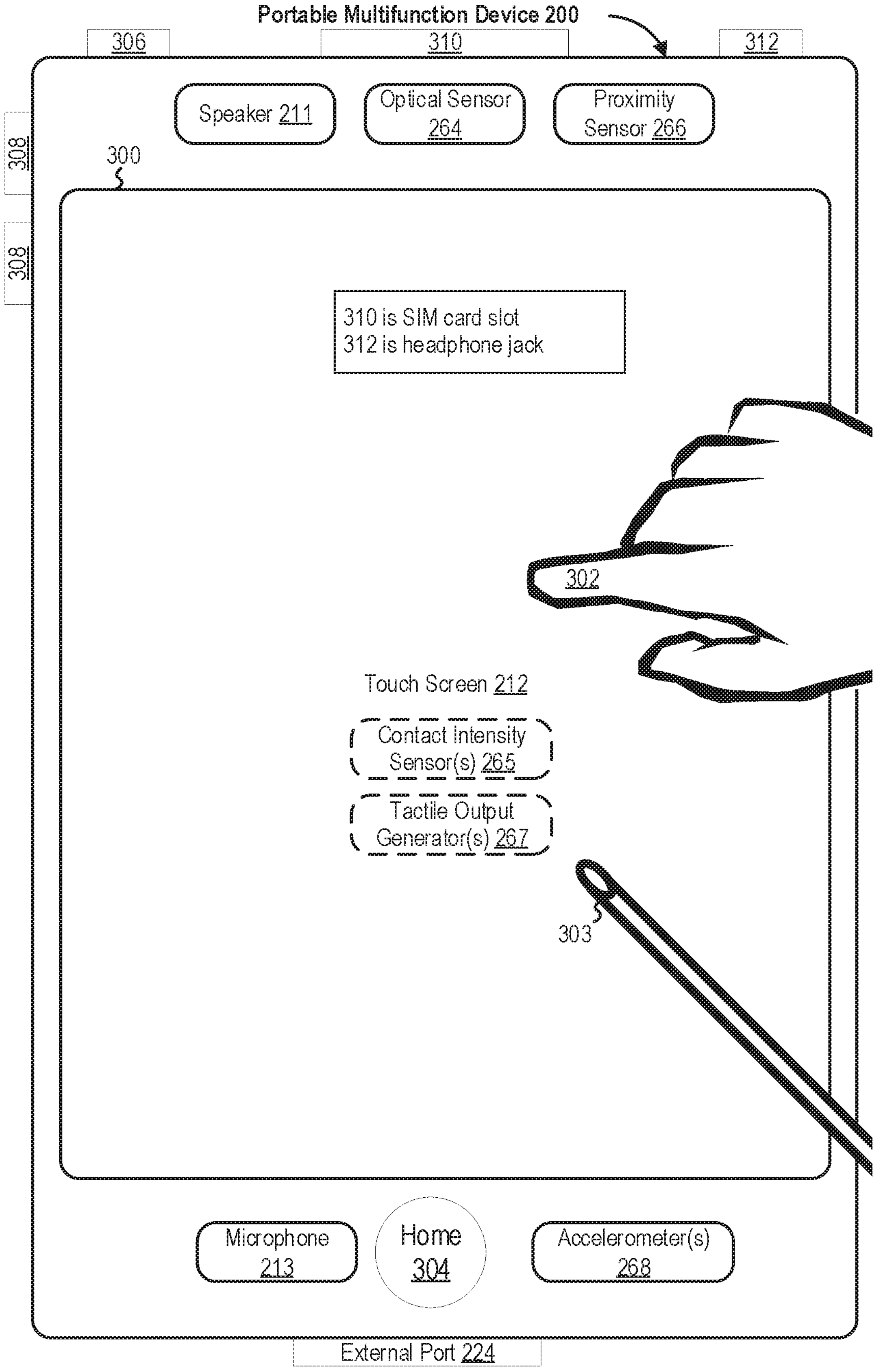
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200.

Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 24 or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
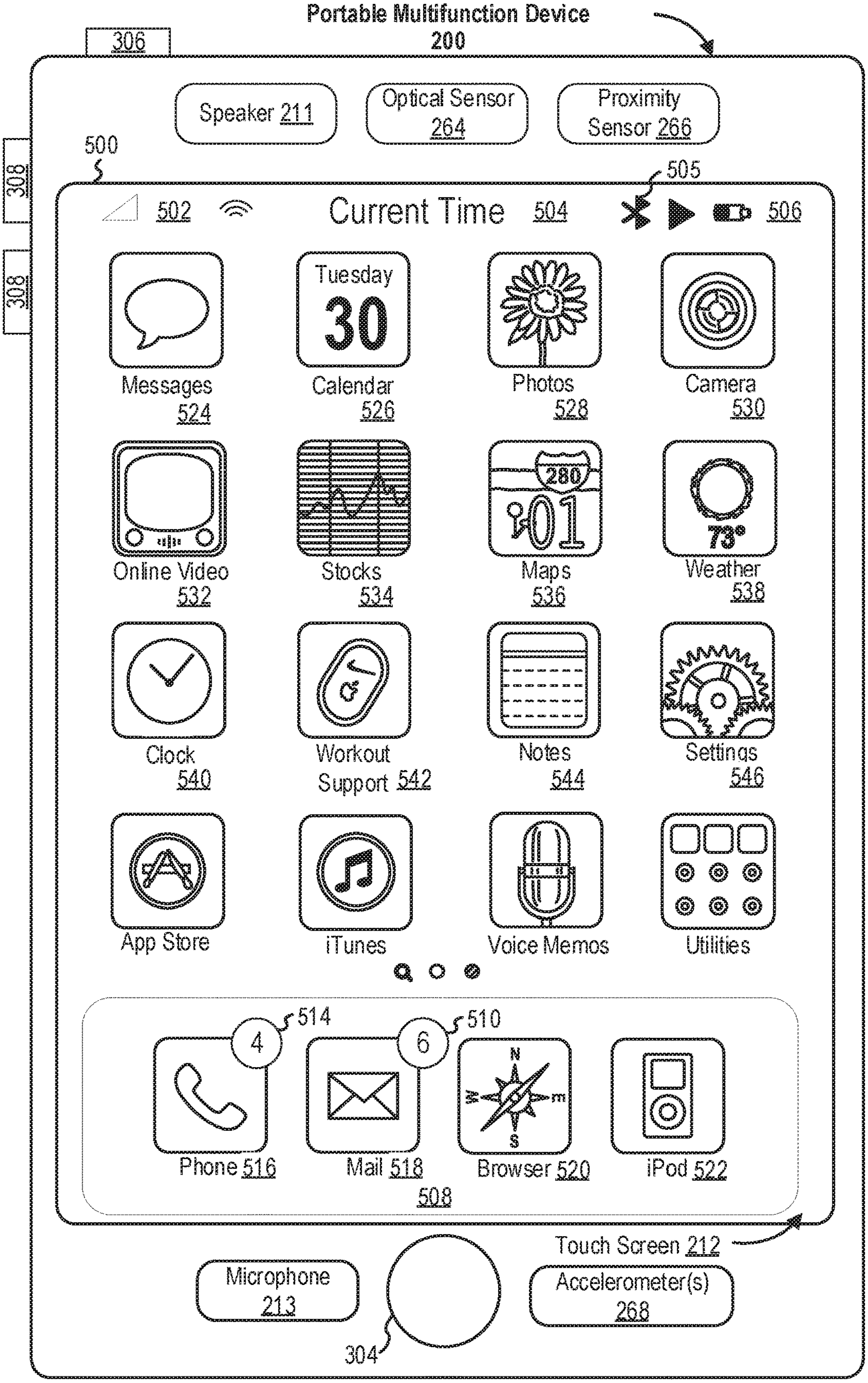
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser," and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar,"
  - Icon 528 for image management module 244, labeled "Photos;"
  - icon 530 for camera module 243, labeled "Camera;"
  - Icon 532 for online video module 255, labeled "Online Video;"
  - Icon 534 for stocks widget 249-2, labeled "Stocks,"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes," and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
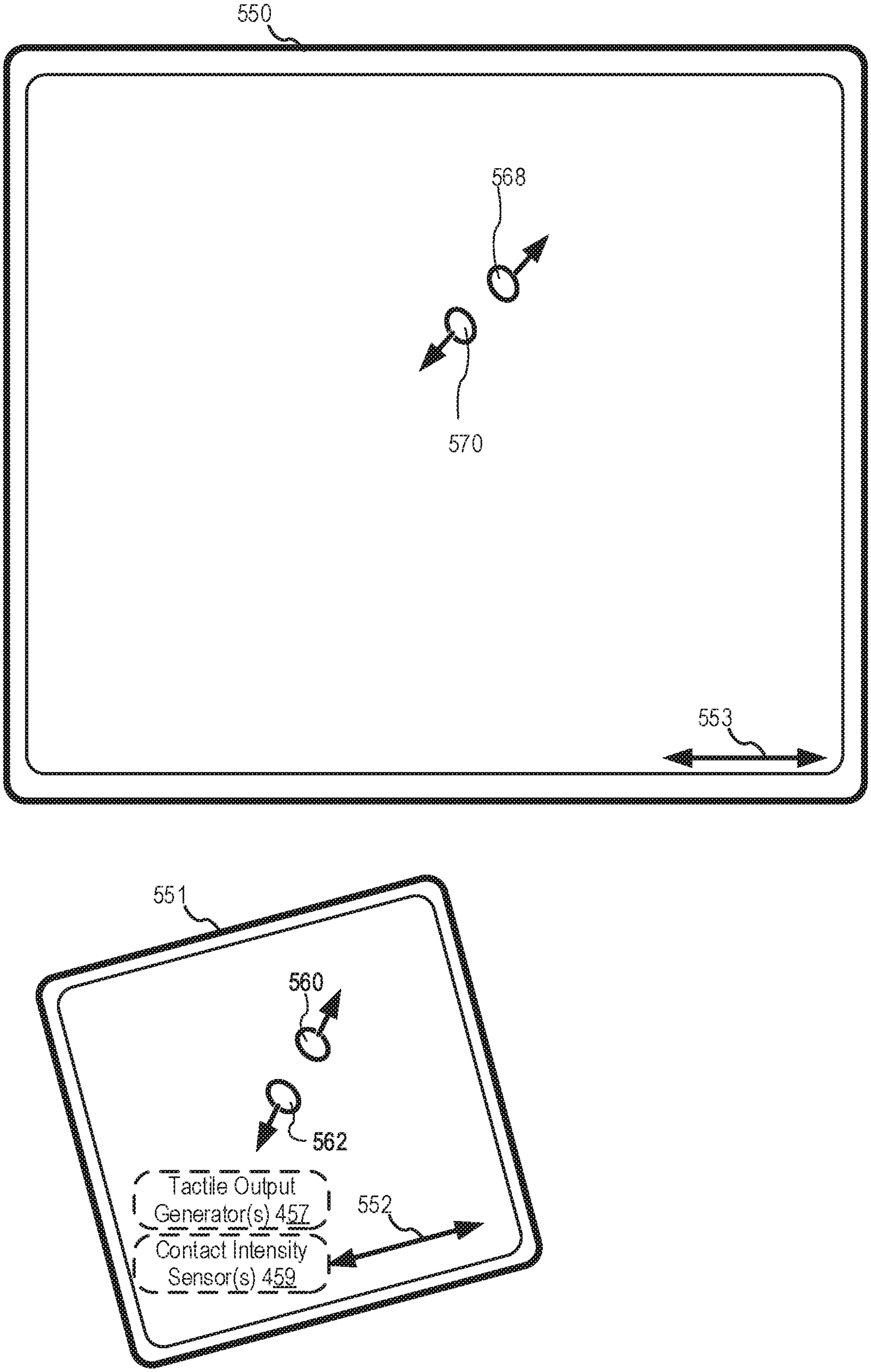
FIG. 5B illustrates an exemplary user interface for a multifunction device with a touch-sensitive surface that is separate from the display according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact) As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
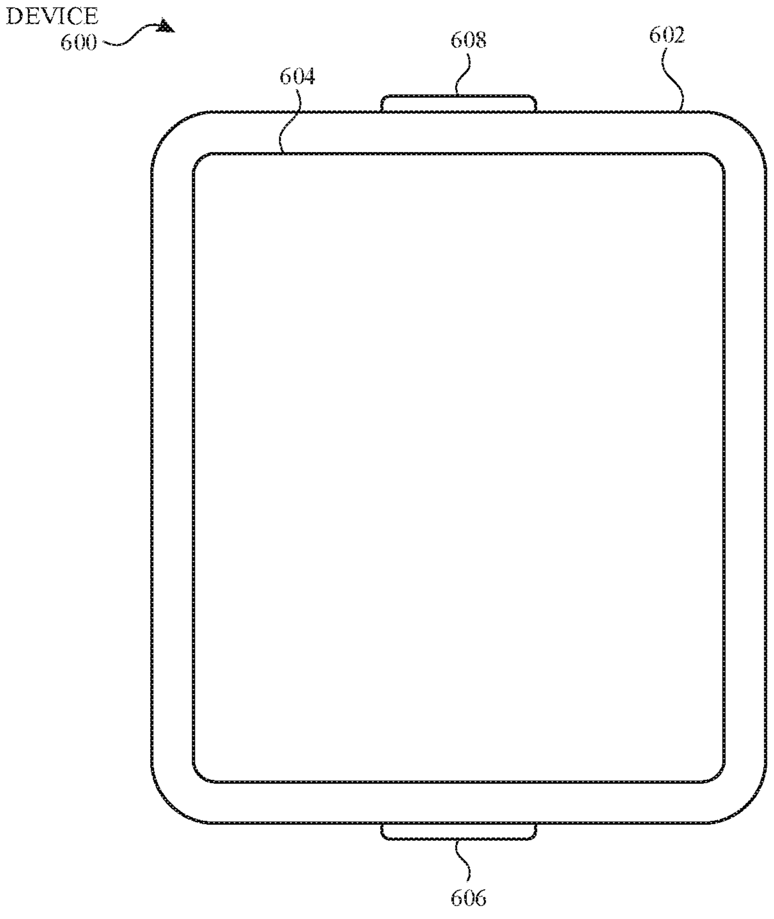
FIG. 6A illustrates a personal electronic device according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and international Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
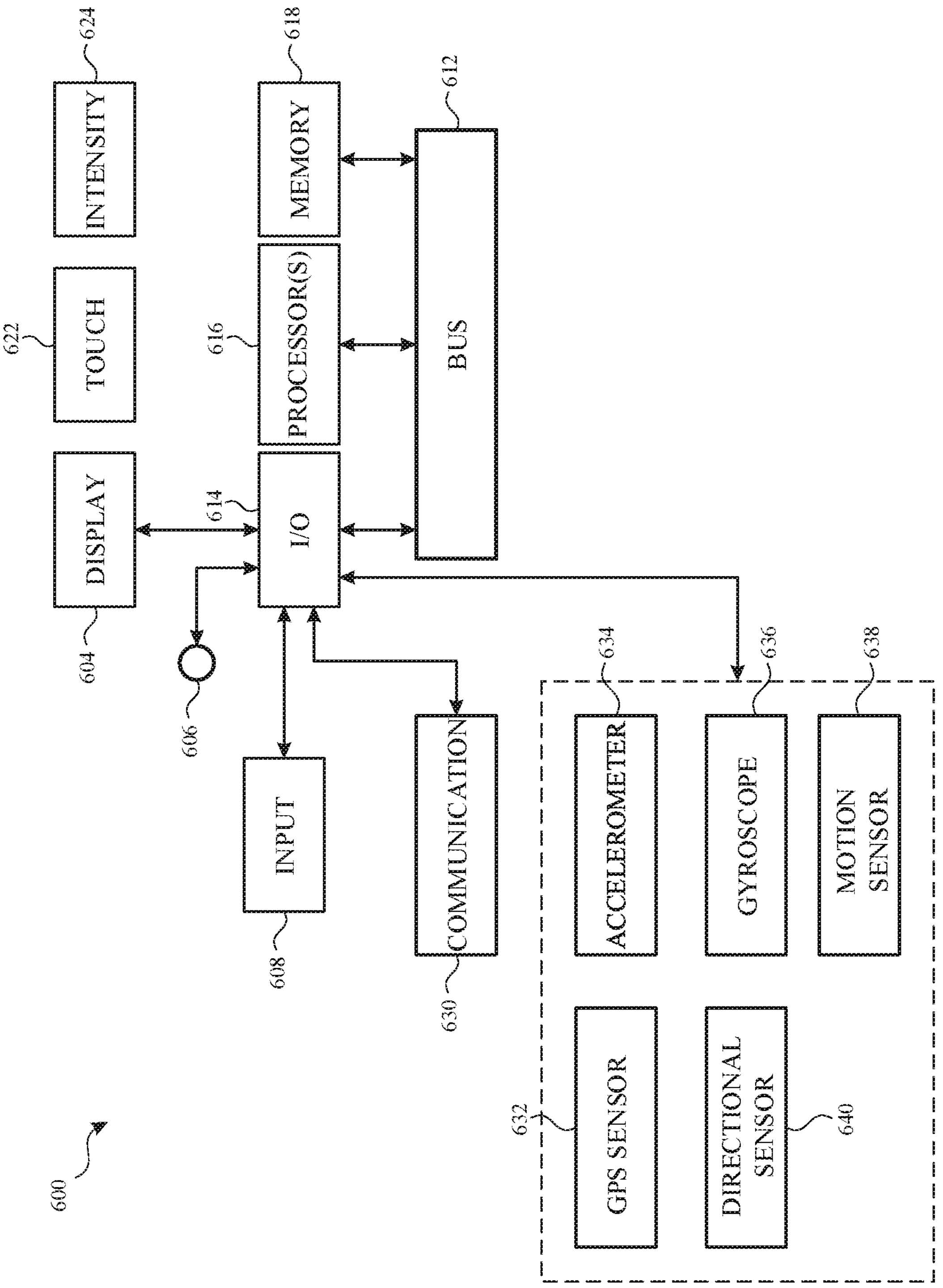
FIG. 6B is a block diagram illustrating a personal electronic device according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, 800, 830, 860, and/or 870 (FIGS. 2A, 4, 6A-B, 8A-8C, 9A-9C, 10A-10B, 11, and 12). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button), in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
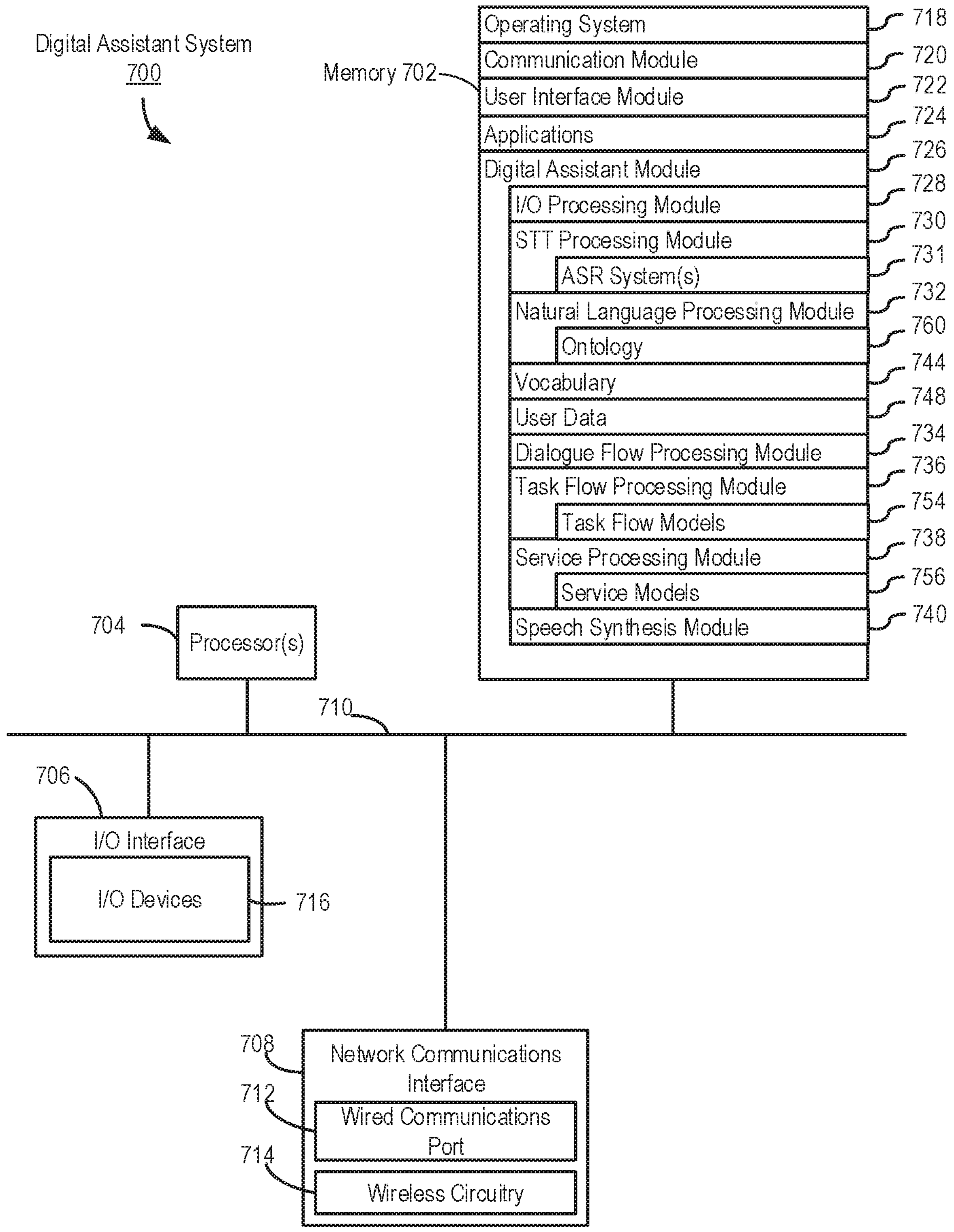
FIG. 7A is a block diagram illustrating a digital assistant system or a server portion thereof according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 800, 830, 860, or 870) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 600, 800, 830, 860, or 870 in FIGS. 2A, 4, 6A-B, 8A-8C, 9A-9C, 10A-10B, 11, and 12 respectively. In some examples, digital assistant system 700 represents the server portion of a digital assistant implementation, and can interact with the user through a client-side portion residing on a user device (e.g., devices 104, 200, 400, 600, 800, 830, 860, or 870).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RE circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touchpads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
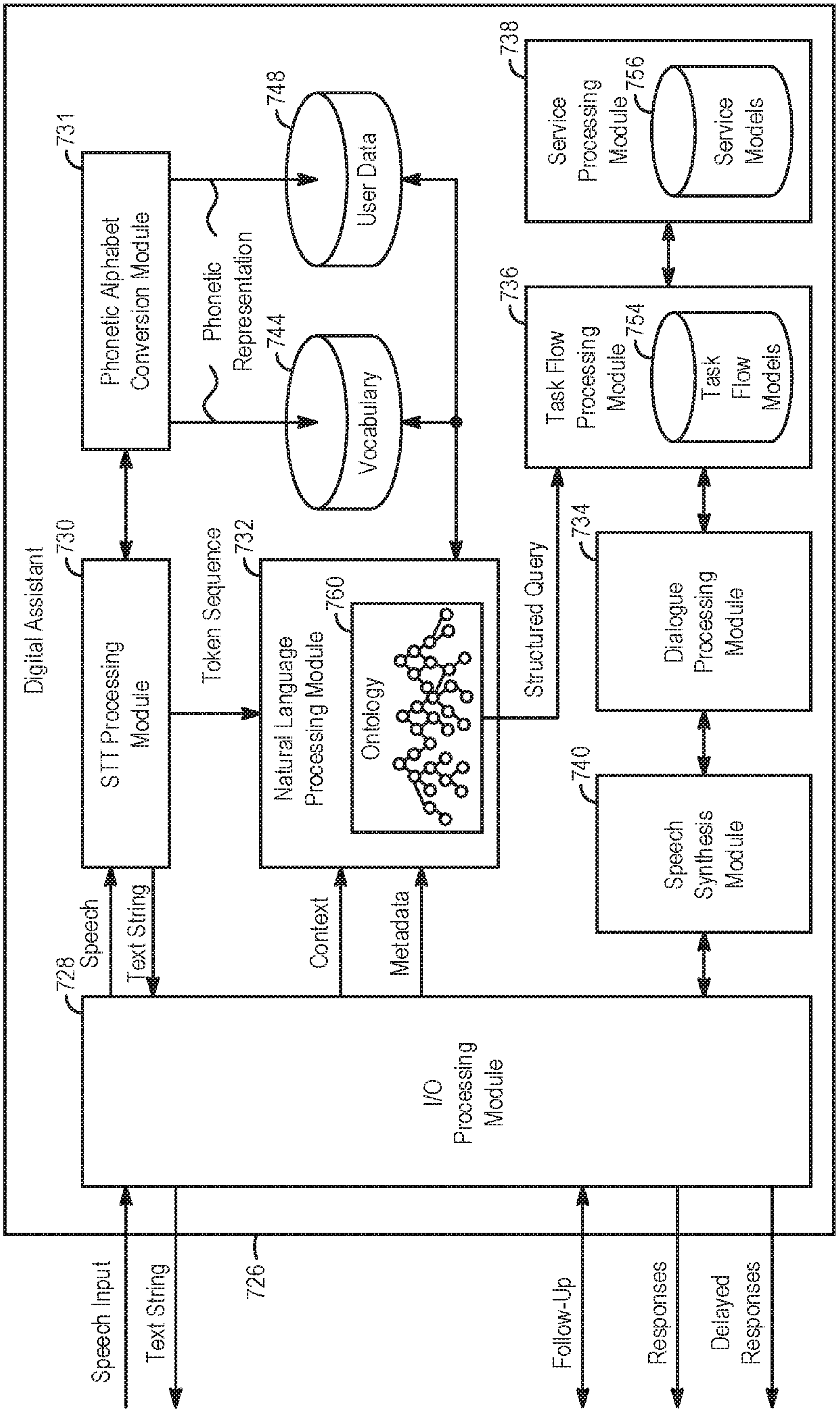
FIG. 7B illustrates the functions of the digital assistant shown in FIG. 7A according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receives answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WEST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪɾoʊ/ and and /tə'meɪɾoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪɾoʊ/ is ranked higher than /tə'meɪɾoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪɾoʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪɾoʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪɾoʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754, The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
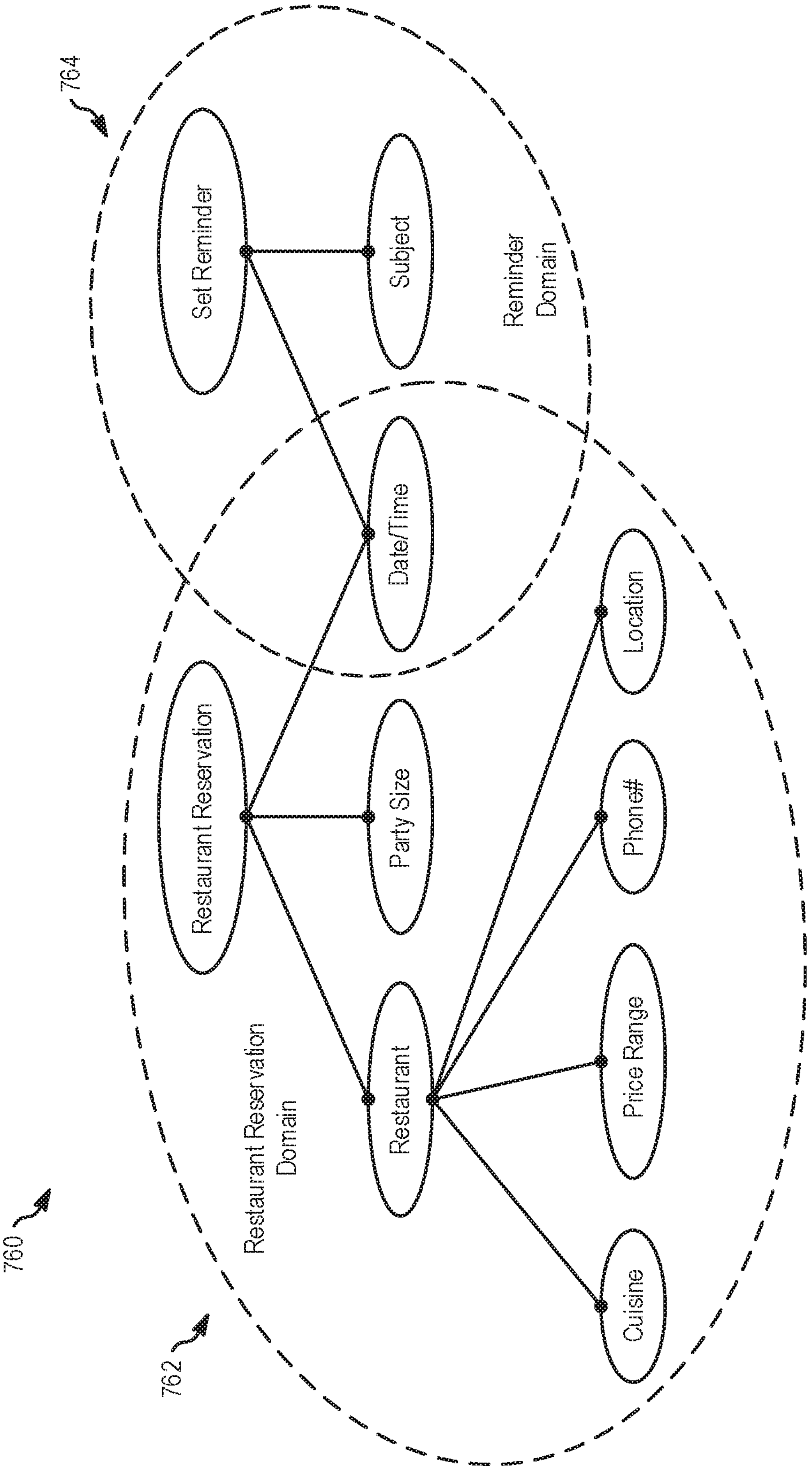
FIG. 7C illustrates a portion of an ontology according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on, A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, di phone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated. Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Figure 8A:
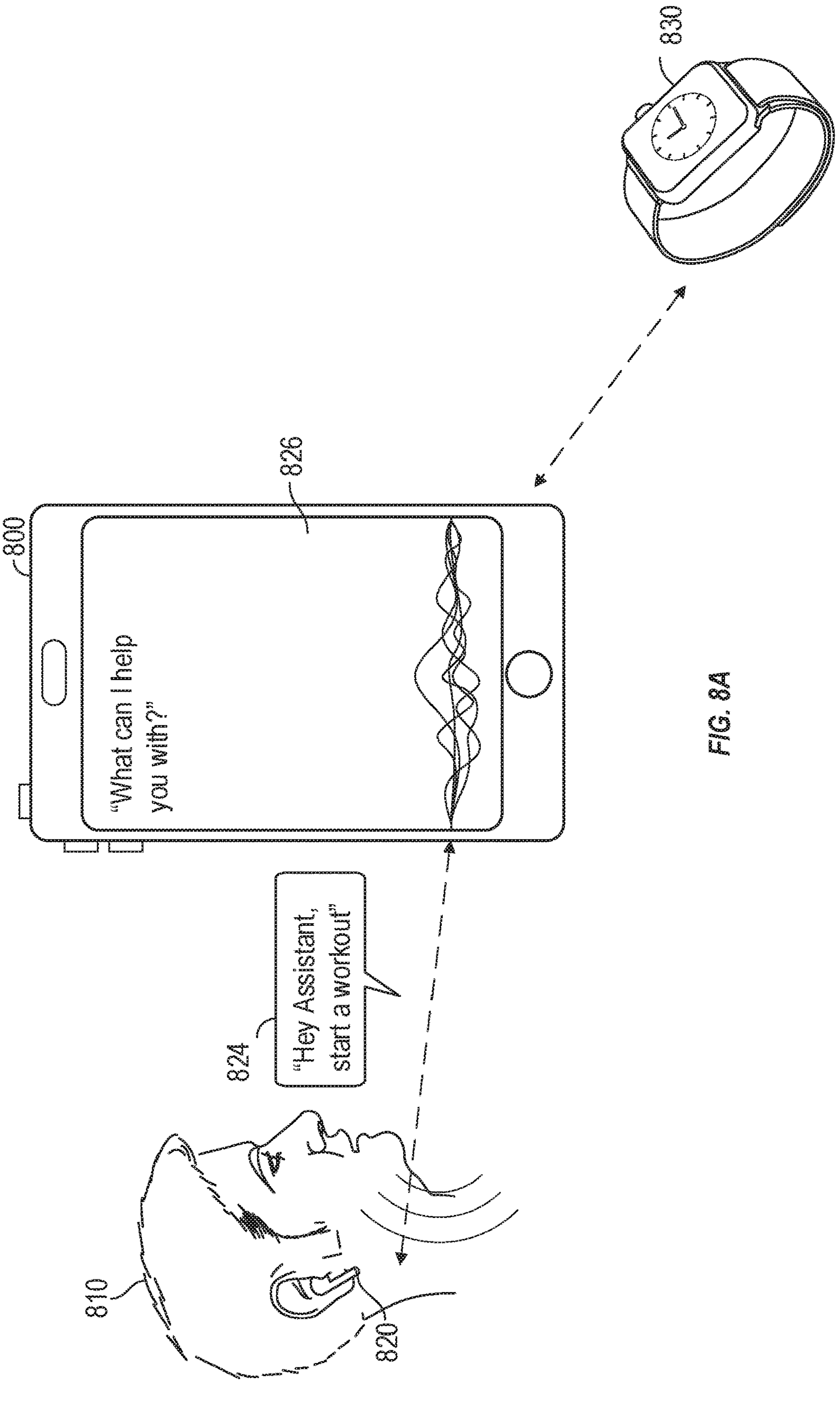
FIGS. 8A-8C illustrate functionalities of providing virtual assistant services in response to a speech input received at an accessory device, according to various examples.
Figure 8B:
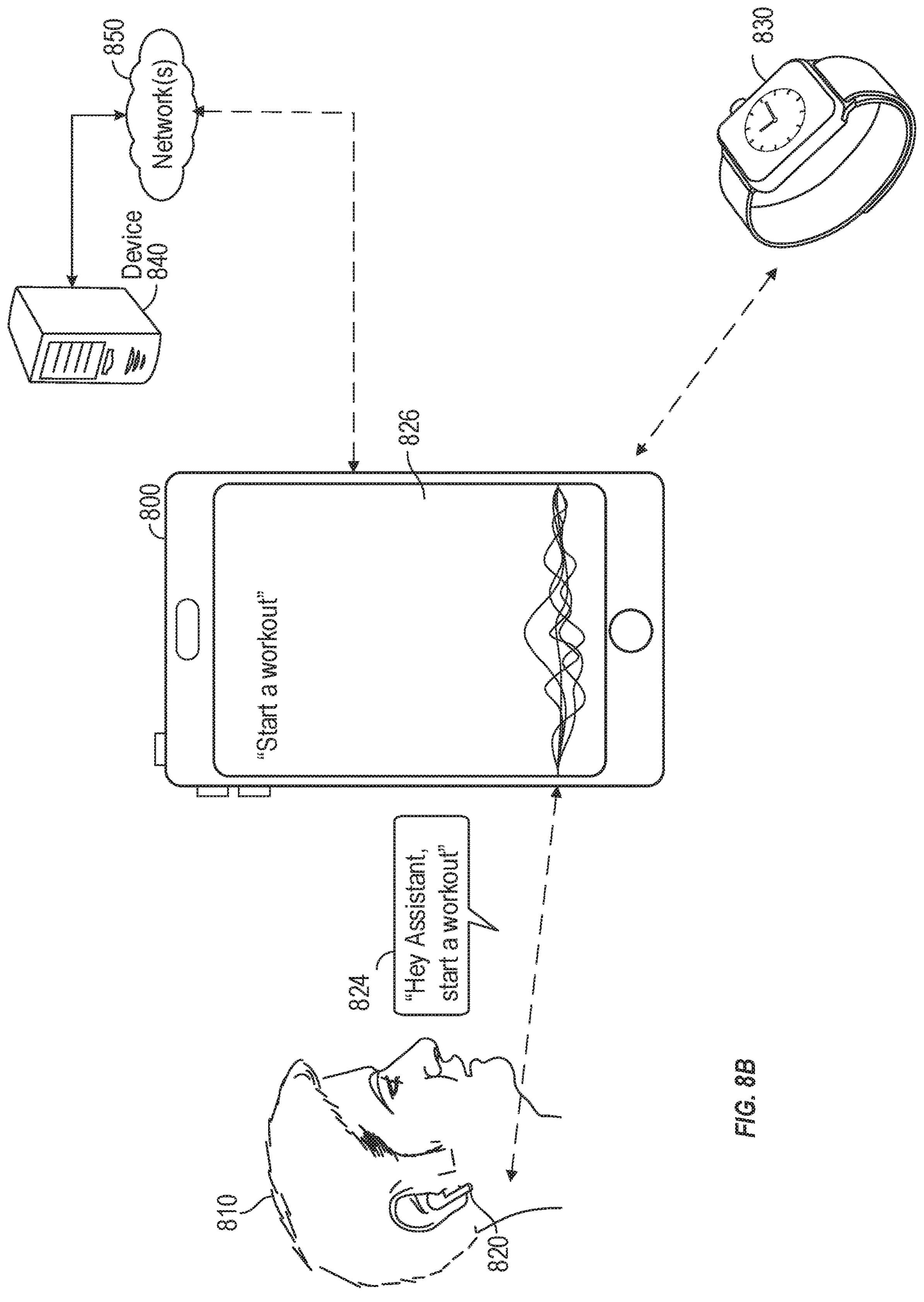
Figure 8C:
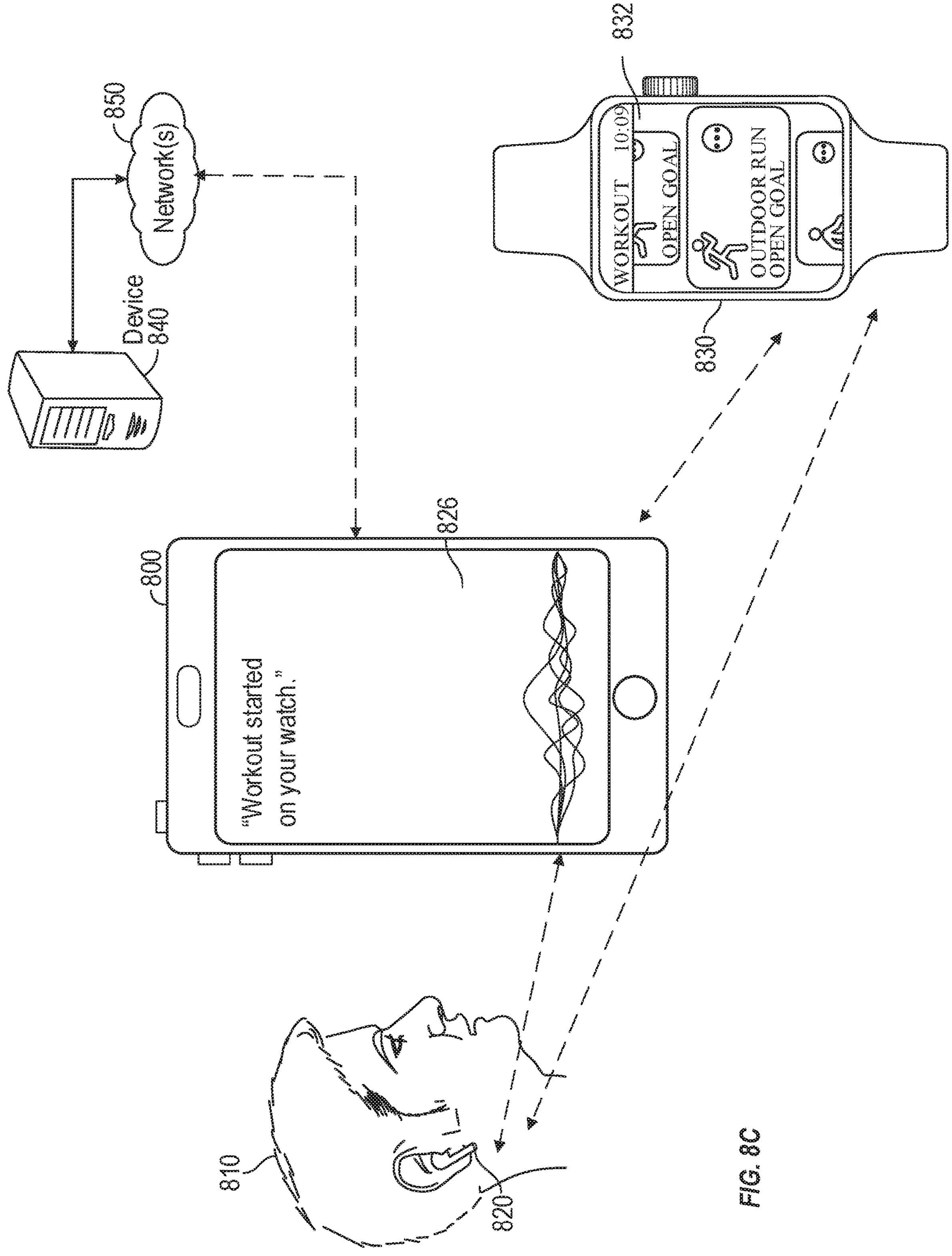

4. Exemplary Functions of an Electronic Device for Providing Virtual Assistant Services Based on Speech Inputs Received from an Accessory Device FIGS. 8A-8C illustrate functionalities of providing virtual assistant services at one or more virtual-assistant capable electronic devices 800 and 830 in response to a speech input received at an accessory device 820, according to various examples. In some embodiments, electronic devices 800 and 830 can be implemented using devices 200, 400, or 600 as described above. As illustrated in FIG. 8A, in some embodiments, one or more virtual assistants can operate on electronic devices 800 and 830. In some examples, the virtual assistant operating on first electronic device 800 (or the server portion of a virtual assistant) and similarly the virtual assistant operating on second electronic device 830 (or the client portion of a virtual assistant) are implemented using digital assistant module 726. The virtual assistants operating on electronic devices 800 and/or 830 include one or more modules, models, applications, vocabularies, and user data similar to those of digital assistant module 726. For example, the virtual assistants operating on electronic devices 800 and/or 830 include the following sub-modules, or a subset or superset thereof: an input/output processing module, an STT processing module, a natural language processing module, a task flow processing module, and a speech synthesis module. These modules can also be implemented similarly to that of the corresponding modules as illustrated in FIG. 7B, and therefore are not shown and not repeatedly described. In some embodiments, the virtual assistants operating on electronic devices 800 and 830 are portions of a same virtual assistant.

With reference to FIG. 8A, an accessory device (e.g., accessory device 820) can be a peripheral or an ancillary device that communicates data with one or more electronic devices (e.g., electronic devices 800 and 830). For example, accessory device 820 can receive speech inputs from a user 810 and transmit representations of the speech inputs (e.g., compressed digital audio data or text conversion of the audio data) to one or more electronic devices 800 and 830 via wireless connections (e.g., via Bluetooth connections). Accessory device 820 can be implemented using one or more components or modules of devices 200, 400, or 600 as described above. For example, accessory device 820 can include one or more controllers (e.g., controller 222) or processors (e.g., processor 220 such as a digital signal processor, an application-specific (ASIC) processor, or the like), memories (e.g., memory 202), a microphone (e.g., microphone 213), one or more audio output components (e.g., one or more earbuds or ear pieces), and communication modules and interfaces (e.g., wireless circuitry 714 of network communications interface 708). In some examples, the controller(s) or processor(s) of accessary device 820 has fewer functionalities than a processor included in electronic devices 800 or 830. For example, the components and/or modules (e.g., controller(s) or processor(s)) of accessary device 820 may facilitate the performance of limited functionalities including audio signal processing, battery management, trigger phrase detection, and wireless communications management. In some examples, accessory device 820 is a headphone capable of performing near-field communication (e.g., Bluetooth communication).

In some examples, accessary device 820 does not have the capability or has limited capabilities of operating a virtual assistant. For example, accessory device 820 may be configured to detect a trigger phase (e.g., "Hey Assistant") and transmit representations of user's speech input to one or more electronic devices 800 and 830 for further processing. But accessory device 820 may not be configured to perform natural language processing tasks including, for example, user intent determination, task flow processing, domain recognition, or the like. In some examples, accessory device 820 (e.g., a headphone) may not include a graphical user interface to display information and may include only an audio user interface to facilitate interacting with the user.

With reference to FIG. 8A, in some embodiments, accessory device 820 is communicatively coupled to at least one of first electronic device 800 and second electronic device 830. In the example shown in FIG. 8A, accessory device 820 is wirelessly coupled to first electronic device 800 but not second electronic device 830. Thus, accessory device 820 directly communicates with first electronic device 800. Accessory device 820 may not communicate directly with second electronic device 830 for any number of reasons. For example, the two devices are not paired via Bluetooth; a communication interface was not enabled on second electronic device 830 (e.g., device 830 is placed in airplane mode); battery power has been depleted on second electronic device 830, or the like. In another example shown in FIG. 9B, accessory device 820 is wirelessly coupled to both first electronic device 800 and second electronic device 830. In another example shown in FIG. 11, accessory device 820 is wirelessly coupled to second electronic device 830 but not first electronic device 800, and thus communicates directly with second electronic device 830. These examples are described in more detail below.

With reference back to FIG. 8A, in some embodiments, accessory device 820 receives a speech input 824 from user 810. In response to receiving speech input 824, accessory device 820 determines whether speech input 824 includes a trigger phrase. A trigger phrase is a phrase that represents a user request to invoke a virtual assistant. A trigger phrase can be, for example, "Hey Assistant;" "Assistant," "Wake-up Assistant;" "OK Assistant;" or the like. In the example shown in FIG. 8A, accessory device 820 determines that speech input 824 includes a trigger phrase "Hey Assistant." In accordance with such a determination, accessory device 820 can obtain a determination of whether a representation of speech input 824 is to be transmitted to a first electronic device 800 (e.g., a smartphone device) or a second electronic device 830 (e.g., a wearable device). As described above, in some examples, first electronic device 800 and second electronic device 830 can be both capable of operating virtual assistants (or at least a portion thereof). The virtual assistants operating on first electronic device 800 and second electronic device 830 are both capable of processing speech inputs (e.g., speech input 824) and performing natural language processing tasks based on the speech inputs. Thus, there is an ambiguity regarding to which device accessory device 820 is to transmit speech input 824.

With reference to FIG. 8A, in some embodiments, at least one of accessory device 820 and an electronic device wirelessly coupled to accessory device 820 (e.g., first electronic device 800) can determine whether the representation of speech input 824 should be transmitted to first electronic device 800 or second electronic device 830. Such a determination can be performed based on, for example, whether accessory device 820 is wirelessly coupled to first electronic device 800 or second electronic device 830. FIG. 8A illustrates an example where accessory device 820 is wirelessly coupled to first electronic device 800 but not second electronic device 830. Thus, in accordance with a determination that accessory device 820 is wirelessly coupled to the first electronic device 800 but not the second electronic device 830, accessory device 820 and/or first electronic device 800 can determine that the representation of speech input 824 is to be transmitted to the first electronic device 800 but not the second electronic device 830. In another example (e.g., example shown in FIG. 11), if accessory device 820 is not wirelessly coupled to the first electronic device 800, it can be determined that the representation of the speech input 824 is not to be transmitted to the first electronic device 800, but to be transmitted to second electronic device 830.

While FIG. 8A illustrates a determination of whether the representation of speech input 824 should be transmitted to first electronic device 800 or second electronic device 830 can be based on which electronic device is wirelessly coupled to accessory device 820, the determination can also be based on other criteria or conditions (e.g., default configurations, last audio communications, statuses of the devices, etc.), which are described in more detail below.

With reference to FIG. 8A, in accordance with a determination that the representation of the speech input 824 is to be transmitted to first electronic device 800 but not the second electronic device 830, accessory device 820 transmits the representation of speech input 824 to first electronic device 800. The representation can be audio data representing speech input 824, compressed audio data, and/or text converted from audio data representing speech input 824. First electronic device 800 receives the representation of speech input 824. Speech input 824, as illustrated in FIG. 8A, can include a trigger phrase (e.g., "Hey Assistant"). In some examples, in response to detecting the trigger phrase included in the representation of speech input 824, first electronic device 800 displays a graphical user interface 826 indicating the receiving of the representation of speech input 824. As shown in FIG. 8A, for example, on graphical user interface 826, first electronic device 800 displays an animation or image indicating the virtual assistant operating on device 800 is invoked and/or displays a message such as "What can I help you with?" In the example shown in FIG. 8A, accessory device 820 transmits the representation of speech input 824 to first electronic device 800, but not to second electronic device 830. As a result, the virtual assistant operating on second electronic device 830 may not be invoked, and thus second electronic device 830 does not display a graphical user interface indicating receiving a representation of a user's speech input.

In some examples, a graphical user interface providing a confirmation to the user is displayed at the electronic device (e.g., first electronic device 800) that receives the representation of the user's speech input from accessory device 820, regardless of whether the task is to be performed by this electronic device or another electronic device (e.g., second electronic device 830) in accordance with the user's speech input. Thus, the user can receive a confirmation of his or her request from a single electronic device rather than from multiple electronic devices, which may be redundant and may likely cause confusion. The user is thus not required to look at or otherwise direct his or her attention to another electronic device or multiple electronic devices. This enhances the human-machine interface and the overall operating efficiency of the devices.

With reference to FIG. 8A, in some embodiments, first electronic device 800 can detect one or more other electronic devices including, for example, second electronic device 830. For example, first electronic device 800 is communicatively coupled to second electronic device via near-field communication (e.g., paired via Bluetooth communication). Based on the communicative coupling, first electronic device 800 can detect the presence of second electronic device 830. In the example shown in FIG. 8A, second electronic device 830 is illustrated as a wearable device such as watch (e.g., a smart watch). It is appreciated, as described above, that second electronic device 830 can be any type of electronic device such as a smartphone, a wearable device, an intelligent speaker, an intelligent TV set-top device, or the like.

In some embodiments, after detecting second electronic device 830, first electronic device 800 can obtain data associated with detected second electronic device 830. For example, first electronic device 800 can obtain metadata, capability data, and/or user-specific data associated with second electronic device 830. Metadata associated with second electronic device 830 can include, for example, the type of second electronic device 830 (e.g., a smart watch, a smartphone, an intelligent TV set-top device, or the like), the device's language information (e.g., English, Chinese, French, or the like), the identification of the virtual assistant operating on the device, the version information of the virtual assistant and/or the device OS software, other device settings, or the like.

Capability data of second electronic device 830 can include, for example, device capabilities, application capabilities, and/or informational capabilities. Device capabilities can include data associated with, for example, the types of sensors installed on the device (e.g., optical sensor, microphone, heart rate sensor, force tough sensor, etc.), the size of a display, audio processing capabilities, the number of speakers, or the like. Application capabilities can include data associated with the applications installed on or accessible to the device (e.g., a workout application, an activity monitoring application, a heart rate measuring application, or the like). Informational capabilities can include data that indicate the availability of certain information at the device. As an example, certain user-specific data may be only available at one device but not at other devices. For instance, the most updated user activity data may only be available at second electronic device 830 (e.g., the user's wearable device) but not first electronic device 800. Thus, such data are obtained from second electronic device 830.

In some examples, user-specific data associated with second electronic device 830 can include, for example, the user's activity data (e.g., past and/or current activity data), the user's heart-rate data, the user's location data, user's contacts, calendar, etc.). It is appreciated that other than metadata, capability data, and/or user-specific data, other data associated with second electronic device 830 can also be obtained or made available to first electronic device 800. Such data may include, for example, non-user specific data (e.g., news, stocks, etc.) that are stored on or accessible to second electronic device 830.

With reference to FIG. 8B, in some embodiments, first electronic device 800 can obtain data (e.g., metadata, capability data, and/or user-specific data) associated with second electronic device 830 regardless of whether a representation of speech input is received at first electronic device 800. For example, first electronic device 800 can obtain the data associated with second electronic device 830 after it is communicatively coupled to second electronic device 830, even if it does not receive representation of any speech input from accessory device 820. The obtaining of the data can be performed periodically or according to a preconfigured schedule. Thus, at the time first electronic device 800 receives the representation of speech input 824, it may already have at least a portion of data associated with second electronic device 830. As a result, first electronic device 800 can transmit the data associated with second electronic device 830 to a third electronic device 840 for natural language processing at a faster rate or improved performance.

In some embodiments, first electronic device 800 can obtain data (e.g., metadata, capability data, and/or user-specific data) associated with second electronic device 830 after receiving representation of speech input 824. For example, to preserve battery power, periodical synchronization of data between first electronic device 800 and second electronic device 830 may not be desirable and therefore, data transmitting between the devices may occur only as required.

With reference to FIG. 8B, in some embodiments, after obtaining data from second electronic device 830, first electronic device 800 transmits a representation of a user request and data associated with second electronic device 830 to a third electronic device 840 (e.g., a server such as a natural language processing server). As described above, first electronic device 800 displays graphical user interface 826, which may provide a text message corresponding to the user's speech input (e.g., "Start a workout"). First electronic device 800 transmits the representation of the user request (e.g., the text message "Start a workout") and data associated with second electronic device 830 to third electronic device 840 for natural language processing. In some embodiments, first electronic device 800 can also transmit data associated with itself to third electronic device 840. Similar to those described above, these data can include metadata, capability data, and/or user-specific data associated with first electronic device 800.

In some embodiments, after receiving the representation of the user request (e.g., the user request to start a workout) and data associated with one or both of first electronic device 800 and second electronic device 830 (e.g., metadata, capability data, and/or user-specific data of one or both devices 800 and 830), third electronic device 840 (e.g., a natural language processing server as described above) determines whether a task is to be performed by first electronic device 800 or second electronic device 830 in accordance with the user request represented by speech input 824 (e.g., a user request to start a workout). Third electronic device 840 can make such a determination based on one or more of intent derived from the representation of the user request, capability data associated with at least one of the first electronic device and the second electronic device, and user-specific data.

In some examples, based on intent derived from the representation of the user request, third electronic device 840 determines whether a task is to be performed by first electronic device 800 or second electronic device 830 in accordance with the user request. For example, a speech input accessory device 820 received may include an explicit reference to the device that the user intends to use (e.g., "Hey Assistant, start a workout on my watch."). As a result, intent can be derived based on such an explicit reference. The derivation of user intent is described in detail above and thus not repeatedly described. In this example, based on the derived user intent to use the watch to perform the task, third electronic device 840 (e.g., a natural language processing server) determines that the task of starting a workout application is to be performed by second electronic device 830, not first electronic device 800.

In some examples, based on capability data associated with one or both of first electronic device 800 and second electronic device 830, third electronic device 840 determines whether a task is to be performed by first electronic device 800 or second electronic device 830 in accordance with the user request. As described above, capability data may include device capability, application capability, and/or informational capability. For example, based on the capability data of second electronic device 830, third electronic device 840 determines that second electronic device 830 is a wearable device, which has a workout application and sensors for the workout application (e.g., a distance sensor such as a GPS, a heart-rate sensor, an accelerometer, a gyroscope, etc.). Similarly, based on the capability data of first electronic device 800, third electronic device 840 determines that first electronic device 800 may not have a workout application installed or may not have at least some of the sensors such as a heart-rate sensor. Accordingly, third electronic device 840 determines that the task of starting a workout application is to be performed by second electronic device 830, not by first electronic device 800. This determination can be made regardless of whether it is first electronic device 800 or second electronic device 830 that receives the user request represented by speech input 824 from accessory device 820.

As described above, in some examples, based on capability data of the electronic devices, third electronic device 840 may determine that certain applications (e.g., an activity monitoring application, a heart-rate measuring application, a workout application, a meditation application, etc.) are only available on one electronic device, but not other devices. As a result, third electronic device 840 determines that the task user requested is to be performed by the device that has the proper application for performing the task. In some examples, based on capability data of the devices, third electronic device 840 may determine that certain applications and/or sensors are available at two or more devices. For example, a workout application may be available both on first electronic device 800 (e.g., a smartphone) and third electronic device 830 (e.g., a wearable device). In this example, whether a task is to be performed at first electronic device 800 or third electronic device 830 can be determined based on other data, such as user-specific data.

In some examples, based on user-specific data, third electronic device 840 determines whether a task is to be performed by first electronic device 800 or second electronic device 830 in accordance with the user request. Continuing with the above example, first electronic device 800 and second electronic device 830 may both have a workout application installed. Thus, the user can either carry first electronic device 800 (e.g., a smartphone) or second electronic device 830 (e.g., a wearable device) for his workout. Based on user-specific data, third electronic device 840 may determine that the particular user has been using second electronic device 830 for most of the past workouts and thus infer that the user prefers to use second electronic device 830 for workouts. As a result, third electronic device 830 determines that the task of starting a workout application is to be performed by second electronic device 830, not first electronic device 800. This determination can be made regardless of whether first electronic device 800 or second electronic device 830 receives the user request represented by speech input 824 from accessory device 820.

By using the data associated with one or both of first electronic device 800 and second electronic device 830 (e.g., capability data and/or user-specific data), the determination of which device is to be selected to respond to the user request or perform a task according to the user request can be intelligently made. For example, if the electronic device that receives the user request from the accessory device does not have the proper application or sensor to perform a task based on the user request, a determination can be made to invoke another electronic device to perform the required task. As described in more detail below, audio data corresponding to the performance of the task can also be routed back to accessory device 820. As a result, the user is not required to manually select an electronic device to perform a task and/or not required to establish a direct connection between the accessory device and the electronic device that performs the task. This enhances the human-machine interface and the overall operating efficiency of the devices.

With reference to FIG. 8C, after third electronic device 840 determines whether a task is to be performed by first electronic device 800 or second electronic device 830, it transmits the determination (e.g., via network 850) to first electronic device 800. In some embodiments, the determination includes an identification of a device (e.g., a device ID as part of metadata of electronic devices 800 and/or 830 provided to third electronic device 840) and a command for the identified device to perform the task in accordance with the user request. Continuing with the above example, third electronic device 840 identifies second electronic device 830 for performing the task of starting a workout application and generates a command for second electronic device 830 to perform the task (e.g., a command to initiate the workout application). As a result, first electronic device 800 receives the device ID of second electronic device 830 and the command from third electronic device 840.

Based on the device ID, first electronic device 800 determines that second electronic device 830 is to perform the required task, and therefore requests second electronic device 830 to perform the task in accordance with the user request. Continuing with the above example shown in FIG. 8C, based on the device ID received from third electronic device 840, first electronic device 800 transmits the received command for initiating the workout application to second electronic device 830. Thus, the command can be automatically and intelligently routed to a particular device (in this example, second electronic device 830) that has the capability or is a preferred/optimal device to perform the task through another device (e.g., first electronic device 800 that receives the user request).

Accordingly, the user is not required to manually identify and invoke a particular electronic device to perform a task. Rather, the user can simply provide a speech input to the accessory device that is directly coupled to at least one electronic device (e.g., as shown in FIG. 8B, accessory device 820 may be only wirelessly coupled to first electronic device 800). Further, establishing a direct coupling between the accessory device and the electronic device that performs the task is not required. The user request can be received (e.g., routed to third electronic device 840 through first electronic device 800) for determining which device should perform the task and for obtaining a command. The command can subsequently be routed to a particular electronic device (e.g., routed to second electronic device 830 through first electronic device 800) to perform the task according to the user request. This significantly reduces or eliminates the user's burden of manually determining and selecting an electronic device for performing the desired task, logging into the device, identifying the proper application, and initiating the application. The user simply needs to provide a speech input to the accessary device and the desired task can be performed by an electronic device that is capable and/or suitable for performing the task. Thus, the techniques described in this disclosure enhance the human-machine interface and the overall operating efficiency of the devices.

With reference to FIG. 8C, continuing with the above example, first electronic device 800 transmits the command for performing a task of initiating a workout application to second electronic device 830. Second electronic device 830 initiates the workout application and displays a corresponding graphical user interface 832. In some examples, audio data corresponding to the performing of the task by second electronic device 830 can be transmitted to the accessory device 820. With reference to FIG. 8C, the audio data can include representations of speech outputs such as "outdoor run starting in 3, 2, 1 . . . " and "you have completed 2 miles, goal achieved." In some examples, if accessory device 820 is directly coupled to second electronic device 830, the audio data corresponding to the performing of the task in accordance with the user request can be transmitted directly from the second electronic device 830 to the accessory device 820. In some examples, if accessory device 820 is not directly coupled to second electronic device 830, the audio data corresponding to the performing of the task in accordance with the user request can be transmitted from second electronic device 830 to accessory device 820 through first electronic device 800 (e.g., routed through first electronic device 800).

With reference to FIG. 8C, in some embodiments, after second electronic device 830 starts to perform the task in accordance with the user request, it can communicate with first electronic device 800 to indicate that the performance of the task has been initiated. Based on the communication from second electronic device 830, first electronic device 830 can display a visual response to the user request and transmit audio data corresponding to the visual response to accessory device 820. Continuing with the above example, after second electronic device 830 initiates the workout application, it may transmit an application status indicator to first electronic device 800. Based on the application status indicator, first electronic device 800 displays a message such as "Workout started on your watch," and transmits audio data corresponding to the message to accessory device 820. Accessory device 820 can then output a corresponding speech such as "Workout started on your watch" to user 810.

Figure 8D:
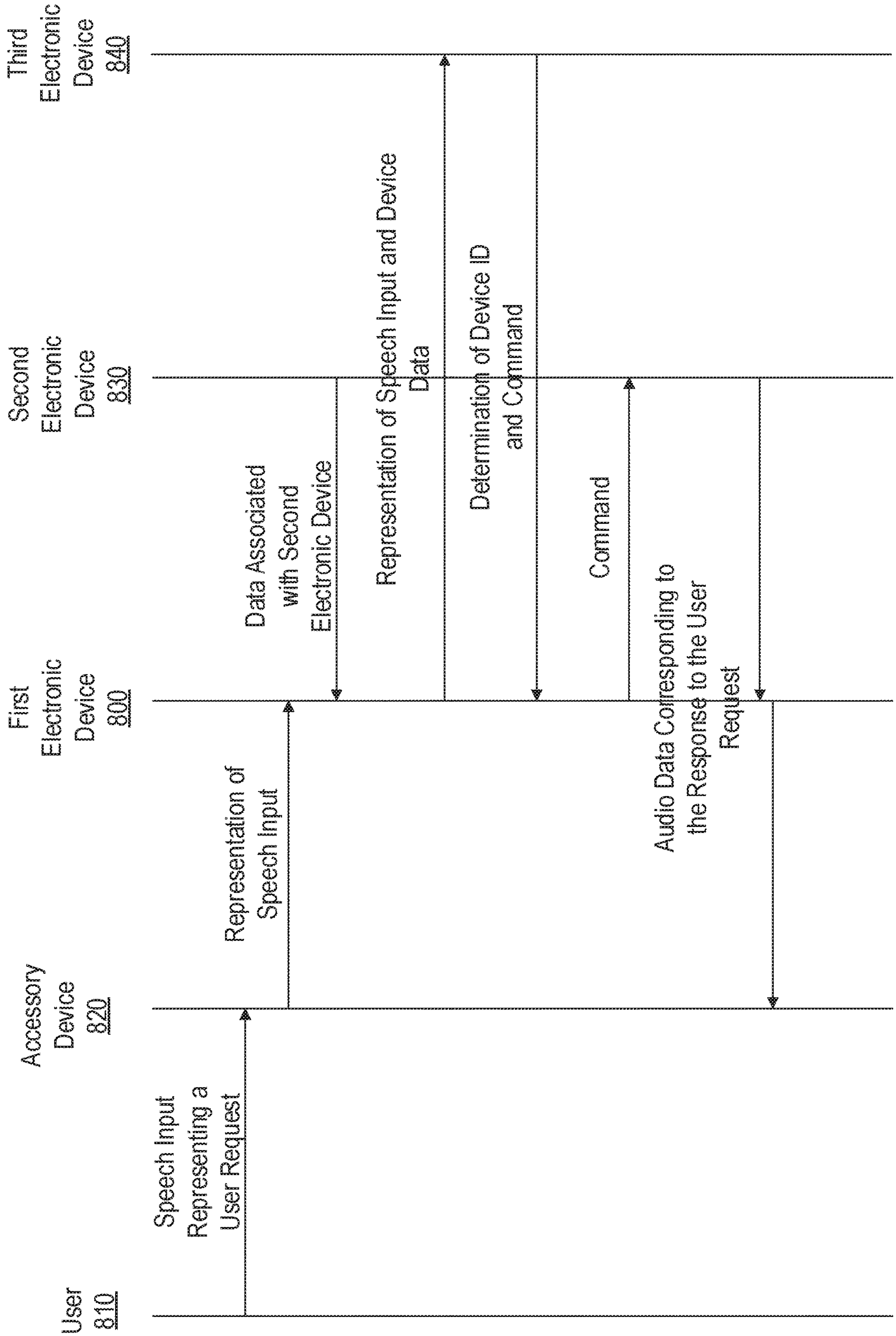
FIG. 8D illustrates an exemplary data flow between devices for providing virtual assistant services.

FIG. 8D illustrates an exemplary data flow between devices for providing virtual assistant services, corresponding to the description above with respect to FIGS. 8A-8C. As shown in FIG. 8D, in some embodiments, accessory device 820 (e.g., a headphone) receives a speech input representing a user request (e.g., "Hey Assistant, start a workout."). In response to receiving the speech input representing a user request, accessory device 820 determines whether the speech input includes a trigger phrase (e.g., "Hey Assistant"). In accordance with a determination that the speech input includes a trigger phrase, accessory device 820 obtains a determination of whether a representation of the speech input is to be transmitted to first electronic device 800 or second electronic device 830. Such a determination can be performed based on one or more criteria or conditions as described above. In accordance with a determination that the representation of the speech input is to be transmitted to the first electronic device 800 but not the second electronic device 830, accessory device 820 transmits the representation of the speech input to first electronic device 800.

As illustrated in FIG. 81), in addition to receiving the representation of the speech input, first electronic device 800 also receives data associated with second electronic device 830 (e.g., metadata, capability data, user-specific data). First electronic device 800 can transmit the representation of the speech input and device data to third electronic device 840 (e.g., a NLP server) for determining whether a task is to be performed by the first electronic device 800 or second electronic device 830 in accordance with the user request. In some embodiments, the device data transmitted by first electronic device 800 include data associated with at least one of second electronic device 830 (e.g., metadata, capability data, user-specific data) and data associated with first electronic device 800 (e.g., metadata, capability data, user-specific data).

With reference to FIG. 8D, third electronic device 840 determines whether a task is to be performed by first electronic device 800 or second electronic device 830 in accordance with the user request. As described above, such a determination can be made based on one or more of intent derived from the representation of the user request; capability data associated with at least one of first electronic device 800 and second electronic device 830; and user-specific data. Third electronic device 840 transmits the determination of which device is to perform the task to first electronic device 800. In some embodiments, the determination includes a device ID and a command. In the examples illustrated in FIGS. 8A-8C, third electronic device 840 determines that second electronic device 830 is to perform the task, e.g., of initiating a workout application.

As shown in FIG. 8D, first electronic device 800 receives the determination including, for example, the device ID of second electronic device 830 and the command for initiating the workout application. Subsequently, first electronic device 800 uses the device ID to identify second electronic device 830 for performing the task of initial a workout application, and transmits the command to second electronic device 830. The command causes the second electronic device 830 to perform the task in accordance with the user request (e.g., initiate the workout application). In some embodiments, audio data corresponding to the performing of the task by second electronic device 830 are transmitted to accessory device 820. FIG. 8D illustrates that the audio data are transmitted from second electronic device 830 to accessory device 820 through first electronic device 800. In other embodiments, the audio data can be transmitted directly from second electronic device 830 to accessory device 820.

As described above with respect to FIG. 8A, a determination of whether the representation of speech input 824 should be transmitted to first electronic device 800 or second electronic device 830 can be based on which electronic device is wirelessly coupled to accessory device 820. In some embodiments, the determination of whether the representation of a speech input received by accessory device 820 should be transmitted to first electronic device 800 or second electronic device 830 can be based on other criteria or conditions, as described below in FIGS. 9A-9C.

Figure 9A:
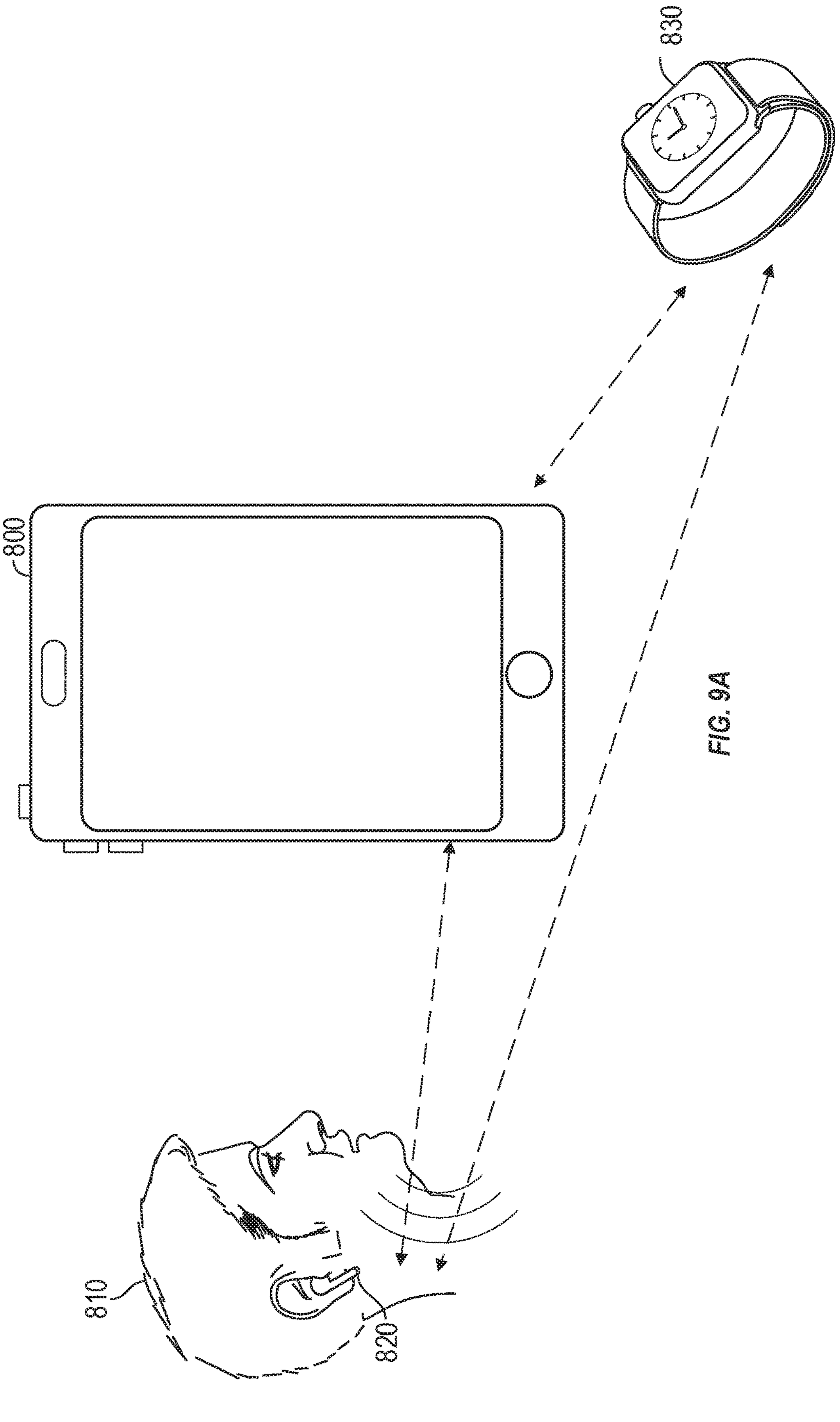
FIGS. 9A-9C illustrate examples of invoking a virtual assistant at one of multiple virtual-assistant capable electronic devices based on a speech input received at an accessory device, according to various examples.
Figure 9B:
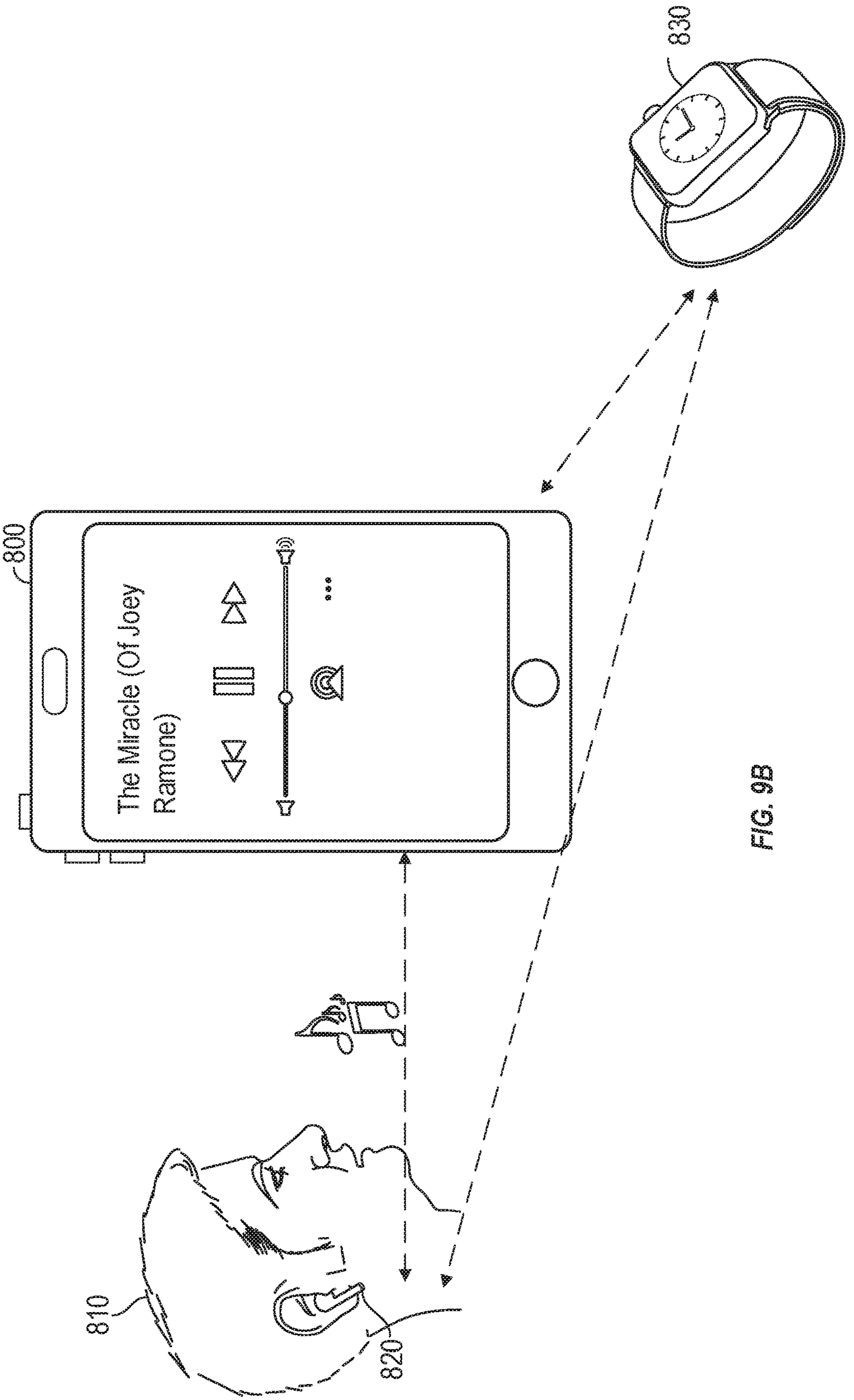
Figure 9C:
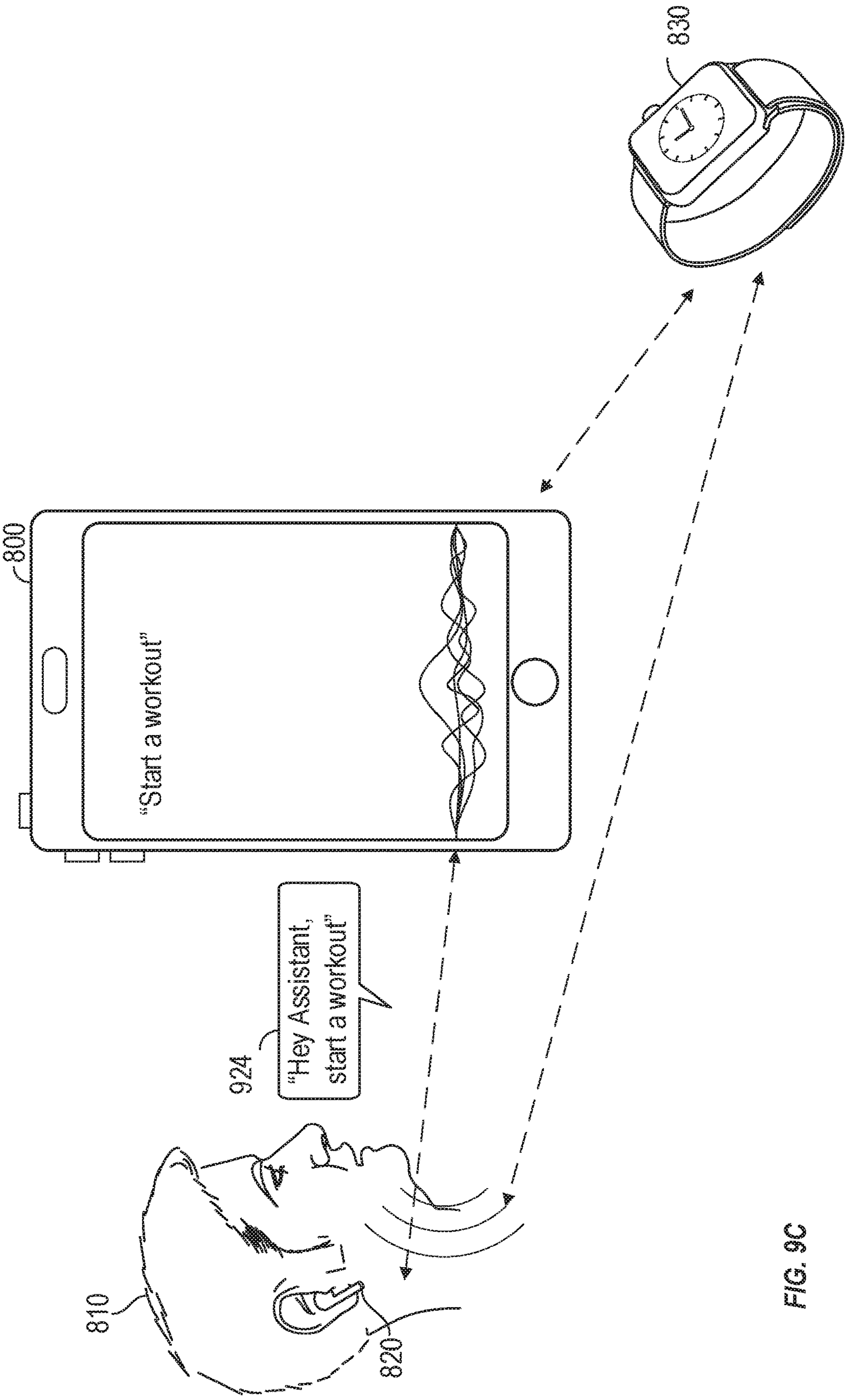

FIGS. 9A-9C illustrate examples of determining whether the representation of a speech input should be transmitted to first electronic device 800 or second electronic device 830 based on the last audio communication. With reference to FIG. 9A, similar to FIG. 8A, accessory device 820 is wirelessly coupled to first electronic device 800, which is wirelessly coupled to second electronic device 830. In some embodiments as shown in FIG. 9A, accessory device 820 is also wirelessly coupled to second electronic device 830 (e.g., via Bluetooth connection). As described above, first electronic device 800 and second electronic device 830 are both virtual-assistant capable devices that can process speech inputs. Thus, if accessory device 820 receives a speech input, the representation of the speech input may be transmitted to either first electronic device 800 or second electronic device 830, because the two devices are both wirelessly coupled to accessory device 820.

With reference to FIG. 9B, in some embodiments, before accessory device 820 receives a speech input, first electronic device 800, but not second electronic device 830, may be in audio communication with accessory device 820 (e.g., streaming music from first electronic device 800 to accessory device 820). It is appreciated that in other embodiments, before accessory device 820 receives a speech input, second electronic device 830, but not first electronic device 800, may be in audio communication with accessory device 820.

With reference to FIG. 9C, accessory device 820 receives a speech input 924 (e.g., "Hey Assistant, start a workout."). Similar to those described above, in response to receiving speech input 924, accessory device 820 determines whether speech input 924 includes a trigger phrase (e.g., "Hey Assistant"). In accordance with a determination that speech input 924 includes a trigger phrase, accessory device 820 obtains a determination of whether a representation of speech input 924 is to be transmitted to first electronic device 800 or second electronic device 830. In some examples, such a determination can be based on which electronic device was last in audio communication with accessory device 820. In the example illustrated in FIG. 9C, the determination can be made by one or more of accessory device 820, first electronic device 800, or second electronic device 830.

In the example shown in FIG. 9C, at least one of the accessory device 820 and the first electronic device 800 determines that the last audio communication before receiving speech input 924 was between accessory device 820 and first electronic device 800, but not second electronic device 830. As shown in FIG. 9B, in accordance with a determination that the accessory device 820 is in audio communication with the first electronic device 800 before receiving the speech input 924, the representation of the speech input 924 is determined to be transmitted to first electronic device 800 but not the second electronic device 830. According to such a determination, accessory device 820 transmits the representation of speech input 924 to first electronic device 800. Conversely, in accordance with a determination that the accessory device 820 is in audio communication with second electronic device 800 before receiving the speech input 924, the representation of the speech input 924 is determined to be transmitted to second electronic device 830 but not first electronic device 800.

With reference to FIG. 9C, in some embodiments, accessory device 820 can be determined to be in audio communication with first electronic device 800 if the two devices are communicating within a pre-determined time window (e.g., an 8-minute window) before receiving speech input 924. For example, first electronic device 800 may have stopped streaming audio to accessory device 820 a few minutes 5 minutes) before speech input 924 is received at accessory device 820, and thus the two devices are not in audio communication with each other immediately before receiving speech input 924. In some examples, at least one of accessory device 820 and first electronic device 800 can determine the time lapse (e.g., 5 minutes) since the most recent audio communication between the two devices, compare the time lapse to a pre-determined time window an 8-minute window) to determine whether the time lapse is less than or equal to the pre-determined time window, and determine whether the two devices are in audio communication within the pre-determined time window. For example, if the time lapse since the most recent audio communication between the two devices is 5 minutes, and the pre-determined time window is 8 minutes, at least one of accessory device 820 and first electronic device 800 determines that the two devices are in audio communication with each other before receiving speech input 924. As a result, it is determined that the representation of speech input 924 is to be transmitted from accessory device 820 to first electronic device 800.

If an accessory device has been in audio communication with a particular electronic device before the user's speech input is received, it can be more efficient to transmit the representation of the speech input from the accessory device to the particular electronic device, rather than searching and establishing a connection with another electronic device. The particular electronic device can then intelligently and effectively route the user request represented by the speech input and/or command to another electronic device if required (e.g., as described above with respect to FIGS. 8A-8C). This enhances the overall operation efficiency of the devices and improves the human-machine interface.

Figure 10A:
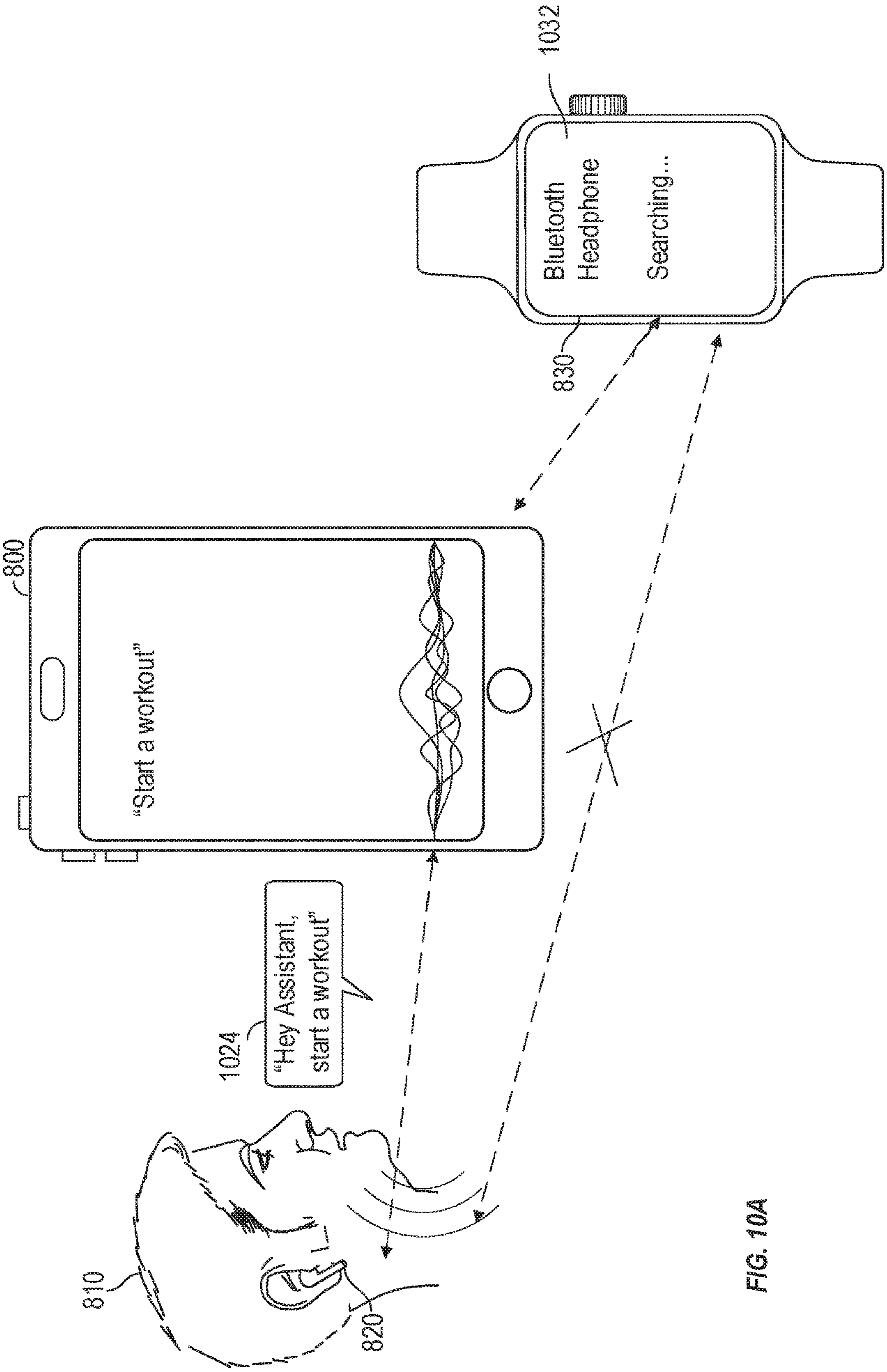
FIGS. 10A-10B illustrate functionalities of providing virtual assistant services based on one or more statuses of electronic devices, according to various examples.
Figure 10B:
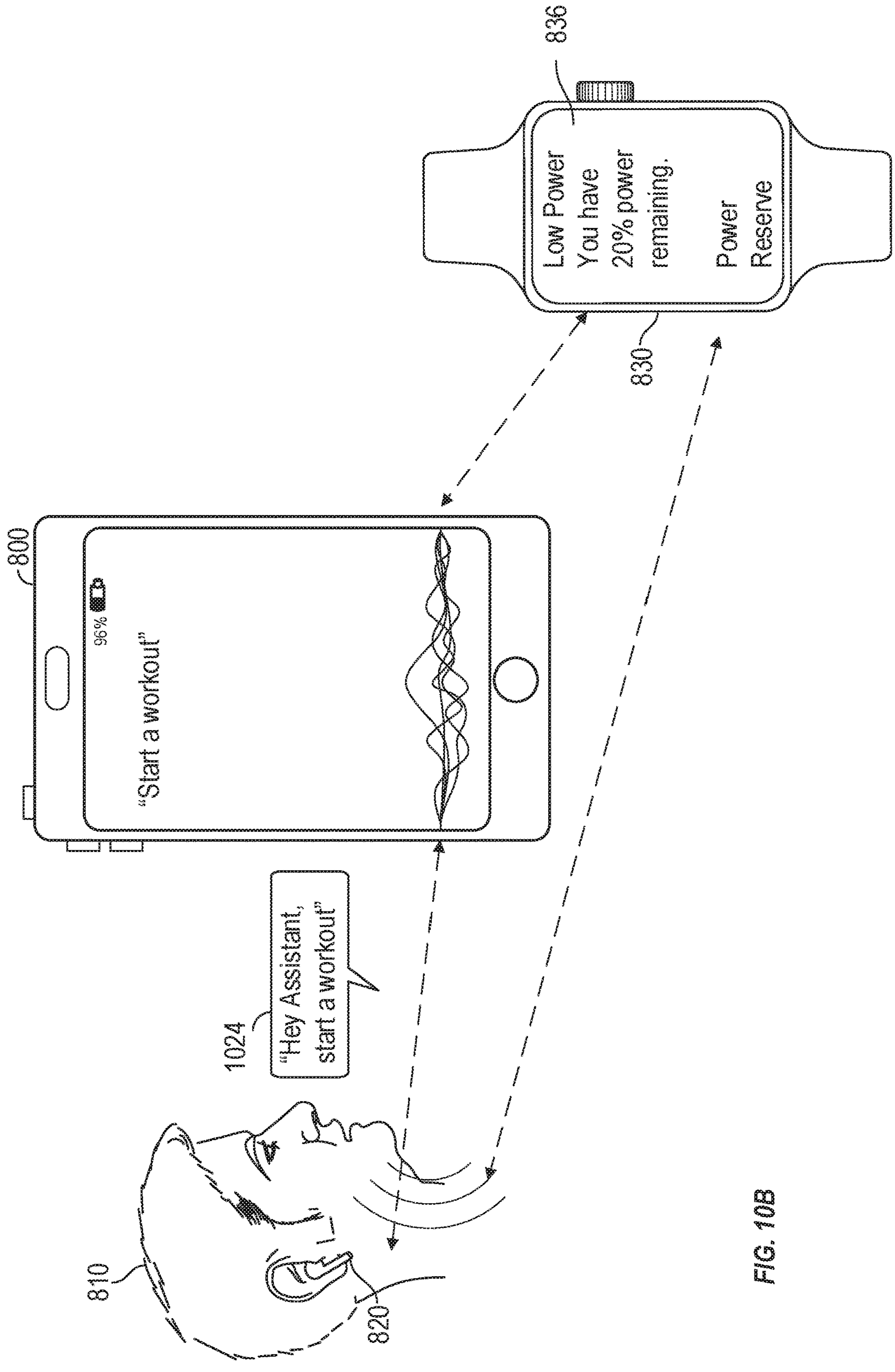

FIGS. 10A-10B illustrate functionalities of providing virtual assistant services based on one or more statuses of the devices, according to various examples. With reference to FIG. 10A, similar to those described above, accessory device 820 receives speech input 1024 and determines that speech input 1024 (e.g., "Hey Assistant, start a workout.") includes a trigger phase (e.g., "Hey Assistant"). Accordingly, accessory device 820 obtains a determination of whether a representation of speech input 1024 is to be transmitted to first electronic device 800 or second electronic device 830. In some embodiments, the determination can be performed based on one or more statuses of the devices.

As shown in FIG. 10A, in some embodiments, the determination of whether a representation of speech input 1024 is to be transmitted to first electronic device 800 or second electronic device 830 can be based on one or more coupling statuses between the devices. For example, accessory device 820 can determine whether it is wirelessly coupled (e.g., via Bluetooth pairing) to first electronic device 800 or second electronic device 830. In the example shown in FIG. 10A, accessory device 820 is paired with first electronic device 800, but not second electronic device 830 (e.g., FIG. 10A shows that second electronic device 830 is searching for Bluetooth headphone, but not paired, as indicated by graphical user interface 1032). Thus, accessory device 820 determines that it is wirelessly coupled to first electronic device 800 but not second electronic device 830. As a result, at least one of accessory device 820 and first electronic device 800 determines that the representation of speech input 1024 is to be transmitted to first electronic device 800 but not second electronic device 830. Conversely, if accessory device 820 determines that it is not wirelessly coupled to first electronic device 800, the representation of speech input 1024 is then determined not to be transmitted to first electronic device 800.

With reference to FIG. 10B, in some embodiments, the determination of whether a representation of speech input 1024 is to be transmitted to first electronic device 800 or second electronic device 830 can be based on one or more statuses other than communication coupling statuses. For example, as shown in FIG. 10B, accessory device 820 may be wirelessly coupled to both first electronic device 800 and second electronic device 830. In some embodiments, other device statuses (e.g., battery level, signal strength, whether one device is currently in use for performing other tasks, etc.) can be used to determine which electronic device is to receive the representation of speech input 1024. For example, as illustrated in FIG. 10B, second electronic device 830 (e.g., a wearable device) may determine that it is low on battery power (e.g., second electronic device 830 displays a graphical user interface 836 indicating that the device has about 20% power remaining), while first electronic device 800 may determine that it has almost full battery power (e.g., 96% of power remaining). Based on the statuses of the battery power of the devices, at least one of accessory device 820, first electronic device 800, and second electronic device 830 can thus determine that representation of speech input 1024 is not to be transmitted to second electronic device 830, but rather be transmitted to first electronic device 800.

In some embodiments, if a particular electronic device has more battery power and/or signal strength than another electronic device, it can be more efficient to transmit the user request from the accessory device to the particular electronic device, rather than communicating with another electronic device that has less battery power and/or weaker signal strength. The particular electronic device can then intelligently and effectively route the user request to another device if required. This enhances the overall operation efficiency of the devices and improves the human-machine interface.

In some embodiments, the determination of whether a representation of speech input 1024 is to be transmitted to first electronic device 800 or second electronic device 830 can be based on a pre-determined configuration. For example, if the communication coupling status and the battery power/signal strength status of both devices do not significantly weight one device more than another device, the determination of to which device the representation of speech input 1024 is to be transmitted can be based on a default configuration (e.g., first electronic device 800 can be the default device to which the representations of speech inputs should be transmitted).

Figure 11:
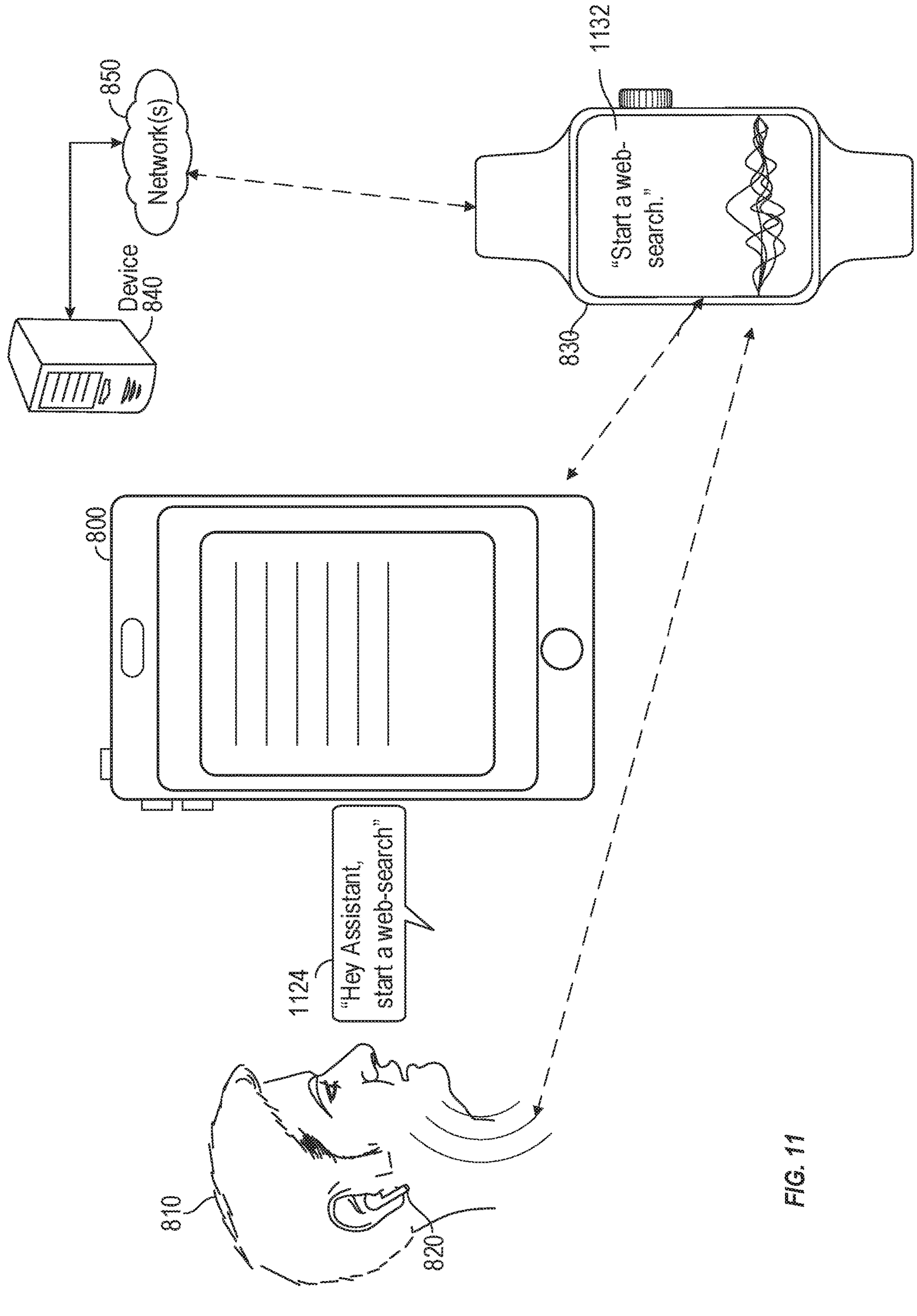
FIG. 11 illustrates functionalities of providing virtual assistant services in response to a speech input received at an accessory device, according to various examples.

FIG. 11 illustrates another example of providing virtual assistant services in response to a speech input received at accessory device 820. Similar to those described above, accessory device 820 receives a speech input 1124 (e.g., "Hey Assistant, start a web-search."). Accessory device 820 determines that speech input 1124 includes a trigger phrase (e.g., "Hey Assistant"). Accordingly, accessory device 820 obtains a determination of whether the representation of speech input 1124 is to be transmitted to first electronic device 800 or second electronic device 830. In some examples, as illustrated in FIG. 11, first electronic device 800 may not be wirelessly coupled to accessory device 820; and/or accessory device 820 may have been in audio communication with second electronic device 830 (e.g., before receiving speech input 1124, accessory device 820 may have been receiving audio data corresponding to a workout application operating on second electronic device 830). Accordingly, accessory device 820 obtains a determination that the representation of speech input 1124 is to be transmitted to second electronic device 830, but not first electronic device 800.

Similar to those described above, second electronic device 830 can be communicatively coupled to first electronic device 800 (e.g., via. Bluetooth pairing). Thus, second electronic device 830 can obtain data (e.g., metadata, capability data, and/or user-specific data) associated with first electronic device 800. After obtaining data from first electronic device 830, second electronic device 830 transmits a representation of a user request and data associated with first electronic device 800 to third electronic device 840 (e.g., a server such as a natural language processing server) via network 850. In some embodiments, second electronic device 830 displays graphical user interface 1132, which may provide a text message corresponding to the user's speech input 1124 (e.g., "Start a web-search"). The text message may represent the user request included in speech input 1124. Second electronic device 830 transmits the representation of the user request (e.g., the text representation of the speech input "Start a web-search") and data associated with first electronic device 800 to third electronic device 840 via network 850. In some embodiments, second electronic device 830 can also transmit data associated with itself to third electronic device 840.

In some embodiments, after receiving the representation of the user request (e.g., the user request to "start a web-search") and data associated with one or both of first electronic device 800 and second electronic device 830 (e.g., metadata, capability data, and/or user-specific data of one or both devices 800 and 830), third electronic device 840 (e.g., a natural language processing server as described above) determines whether a task is to be performed by first electronic device 800 or second electronic device 830 in accordance with the user request represented by speech input 1124 (e.g., a user request to start a web-search). Similar to those described above, third electronic device 840 can make such a determination based on one or more of intent derived from the representation of the user request, capability data associated with at least one of the first electronic device and the second electronic device, and user-specific data.

In the example shown in FIG. 11, based on the capability data, third electronic device 840 may determine that second electronic device 830 (e.g., a wearable device) does not have or has limited capability for performing a task of web-searching. For example, third electronic device 840 determines that second electronic device 830 does not have a web browsing application, but first electronic device 800 has a web browsing application. Accordingly, third electronic device 840 determines that the task of performing a web-search is to be performed by first electronic device 800 but not second electronic device 830, despite that second electronic device 830 receives the user request represented by speech input 1124.

Figure 12:
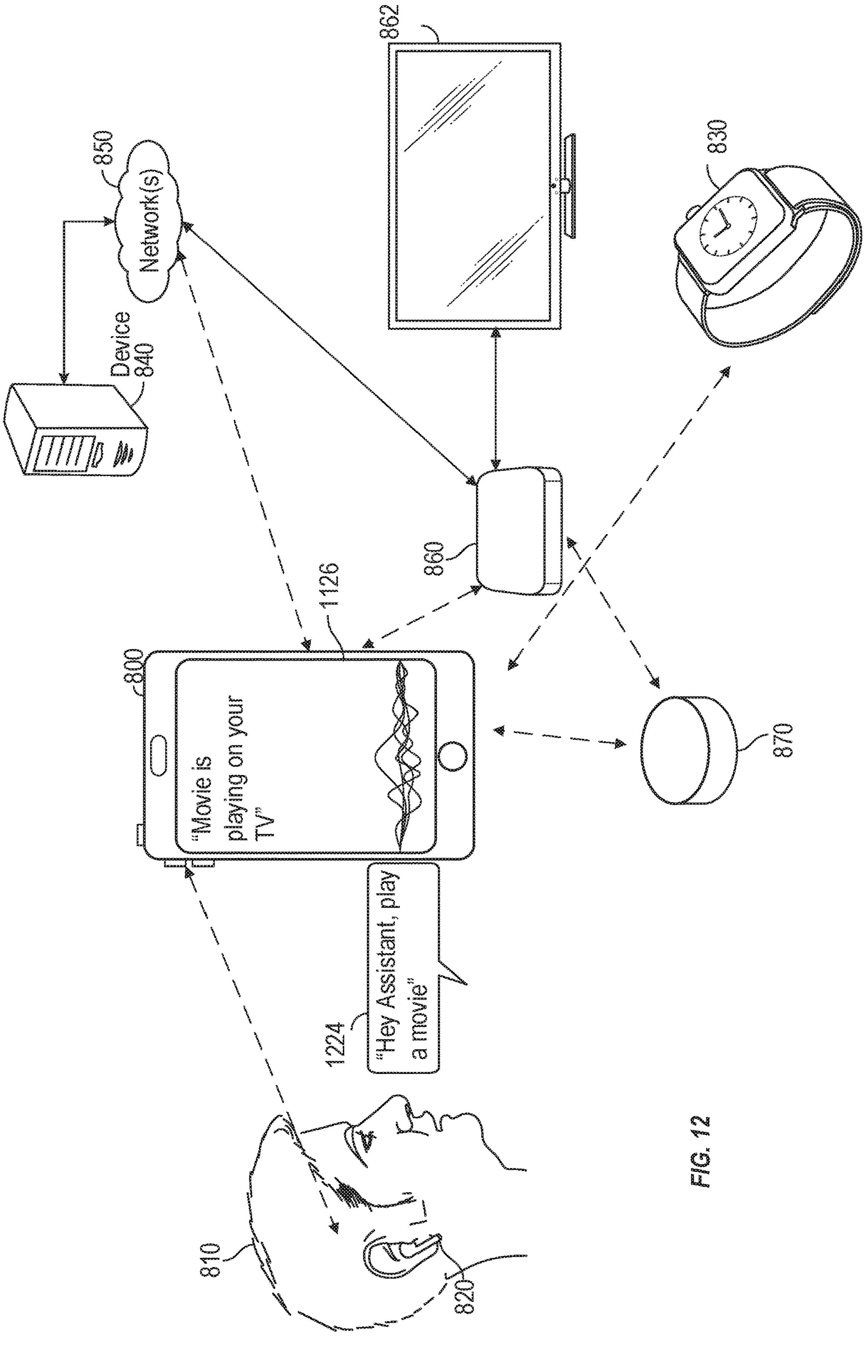
FIG. 12 illustrates functionalities of providing virtual assistant services at one of multiple electronic devices in response to a speech input received at an accessory device, according to various examples.

FIGS. 8A-11 illustrate examples of providing virtual assistant services using a single accessory device 820 and two electronic devices (e.g., first electronic device 800 and second electronic device 830). It is appreciated that additional electronic devices can be included for performing a task the user requests through accessory device 820. FIG. 12 illustrates functionalities of providing virtual assistant services at one or more additional electronic devices (e.g., fourth electronic device 860 and fifth electronic device 870) in response to a user request received at accessory device 820, according to various examples.

As illustrated in FIG. 12, in some embodiments, accessory device 820 can be wirelessly coupled to first electronic device 800. First electronic device 800 can be communicatively coupled to one or more of second electronic device 830 (e.g., a wearable device), a fourth electronic device 860 (e.g., an intelligent TV set-top box), and a fifth electronic device 870 (e.g., an intelligent speaker). Similar to those described above, accessory device 820 receives a speech input 1224 (e.g., "Hey Assistant, play a movie.") from user 810. Accessory device 820 determines that the speech input 1224 includes a trigger phrase (e.g., "Hey Assistant") and thus obtains a determination of to which device (e.g., devices 800, 830, 860, or 870) the representation of speech input 1224 is to be transmitted. As described above, this determination can be performed based on, for example, the communication coupling statuses of the devices, the battery power statuses of the devices, the signal strength statuses of the devices, any other device statuses, and/or a pre-determined configuration.

In the example shown in FIG. 12, accessory device 820 obtains a determination that the representation of speech input 1224 is to be transmitted to first electronic device 800 (e.g., because only first electronic device 800 is paired with accessory device 820). Accessory device 820 thus transmits the representation of speech input 1224 to first electronic device 800.

Similar to those described above, first electronic device 800 detects electronic devices 830, 860, and 870, which may be all communicatively coupled to first electronic device 800. First electronic device 800 obtains data associated with devices 830, 860, and 870 (e.g., capability data and user-specific data associated with the devices); and transmits representation of speech input 1224 and data associated with the detected electronic devices 830, 860, and 870 to the third electronic device 840 (e.g., a natural language processing server). Based on the representation of speech input 1224 and data associated with the detected electronic devices 830, 860, and 870, third electronic device 840 can determine which device is to perform the task in accordance with the user request. For example, as shown in FIG. 12, third electronic device 840 may determine that fourth electronic device 860 (e.g., an intelligent TV set-top box) has the capability of streaming a movie and is associated with a TV device. As a result, device 860 is the optimal device to perform the task of playing a movie as the user requested.

Third electronic device 840 can thus transmit the determination to first electronic device 800. Similar to those described above, the determination may include a device ID for identifying the device to perform the task and a command. First electronic device 800 receives the determination from third electronic device 840 and in accordance with the received determination, requests fourth electronic device 860 to perform the task of playing a move. For example, first electronic device 800 can transmit the command received from third electronic device 840 to fourth electronic device 860 to cause the movie to be played on a TV device 862. Accordingly, fourth electronic device 860 starts a movie application and begins streaming the movie to TV device 862. In some embodiments, first electronic device 800 displays a graphical user interface 1126 providing a message indicating that the task is being performed (e.g., "movie is playing on your TV.").

Similar to those described above, in some embodiments, after fourth electronic device 860 starts to perform the task the user requested, audio data corresponding to performing the task can be transmitted to the accessory device 820. For example, the audio portion of a movie can be transmitted from fourth electronic device 860 to accessory device 820 (e.g., either directly or through first electronic device 800).

While the above examples illustrate that a user request received at an accessory device (e.g., device 820) is routed through a single electronic device (e.g., first electronic device 800) to a proper device (e.g., third electronic device 840) for determining which device is to perform a task in accordance with the user request, it is appreciated that the user request can be routed through any number of devices. For example, in FIG. 12, if first electronic device 800 receives the representation of speech input 1224 but cannot directly communicate with third electronic device 840 (e.g., an NLP server), first electronic device 800 can transmit the representation of speech input 1224 to another device (e.g., fifth electronic device 870), which can then transmit the representation of speech input 1224 to third electronic device 840 for determining which device is to perform a task in accordance with the user request.

Similarly, the determination of which device is to perform a task in accordance with the user request (e.g., the device ID and the command) can be received at one device (e.g., device 870) and routed to a proper device (e.g. device 860 for performing the task) directly or through any number of other devices (e.g., routed through device 800). And the audio data associated with the performing of the task can also be routed from the device that performs the task (e.g., device 860) to accessory device 820 directly or through any number of devices (e.g., through device 800).

Figure 13A:
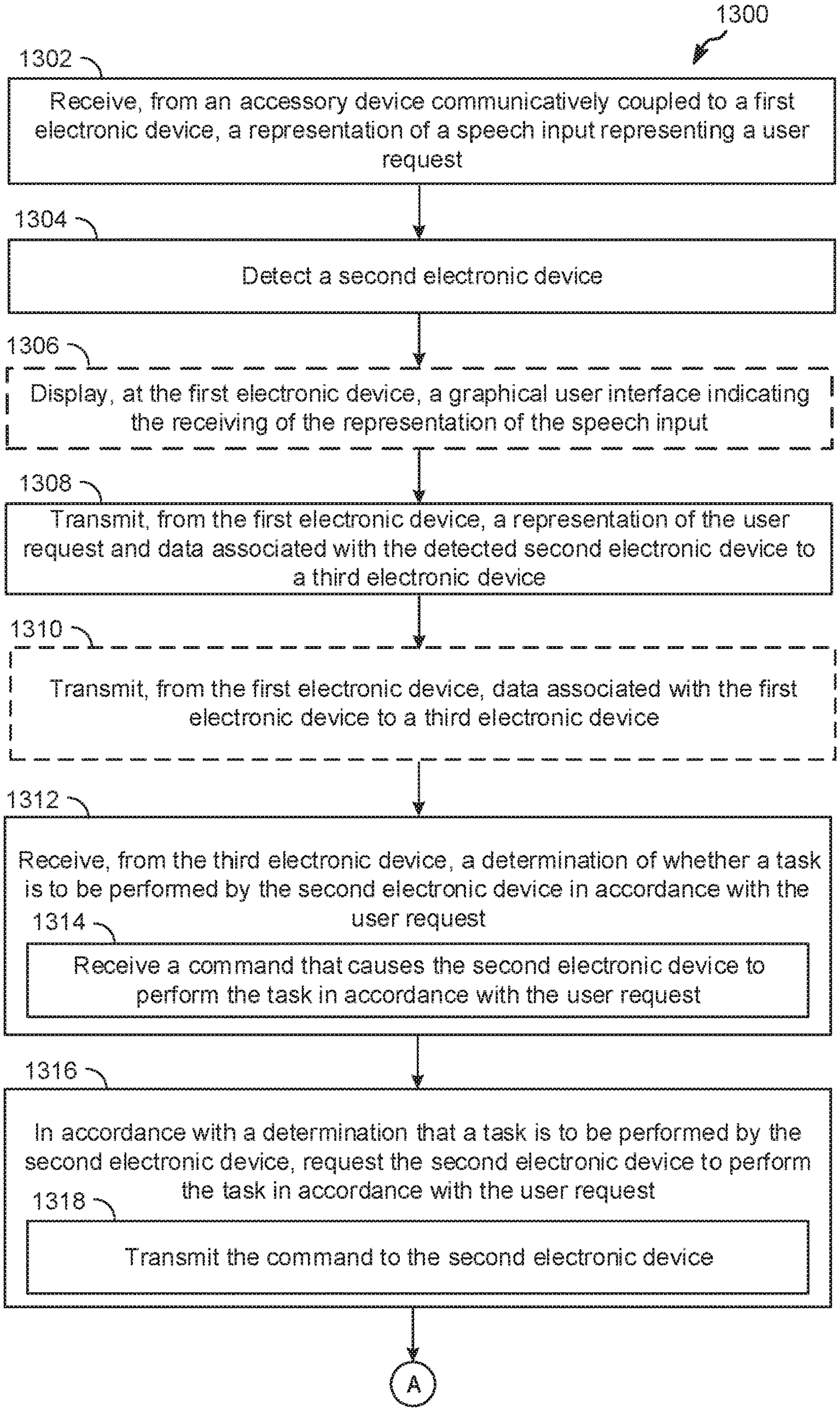
FIGS. 13A-13B illustrate a flow diagram of an exemplary process for providing virtual assistant services according to various examples.
Figure 13B:
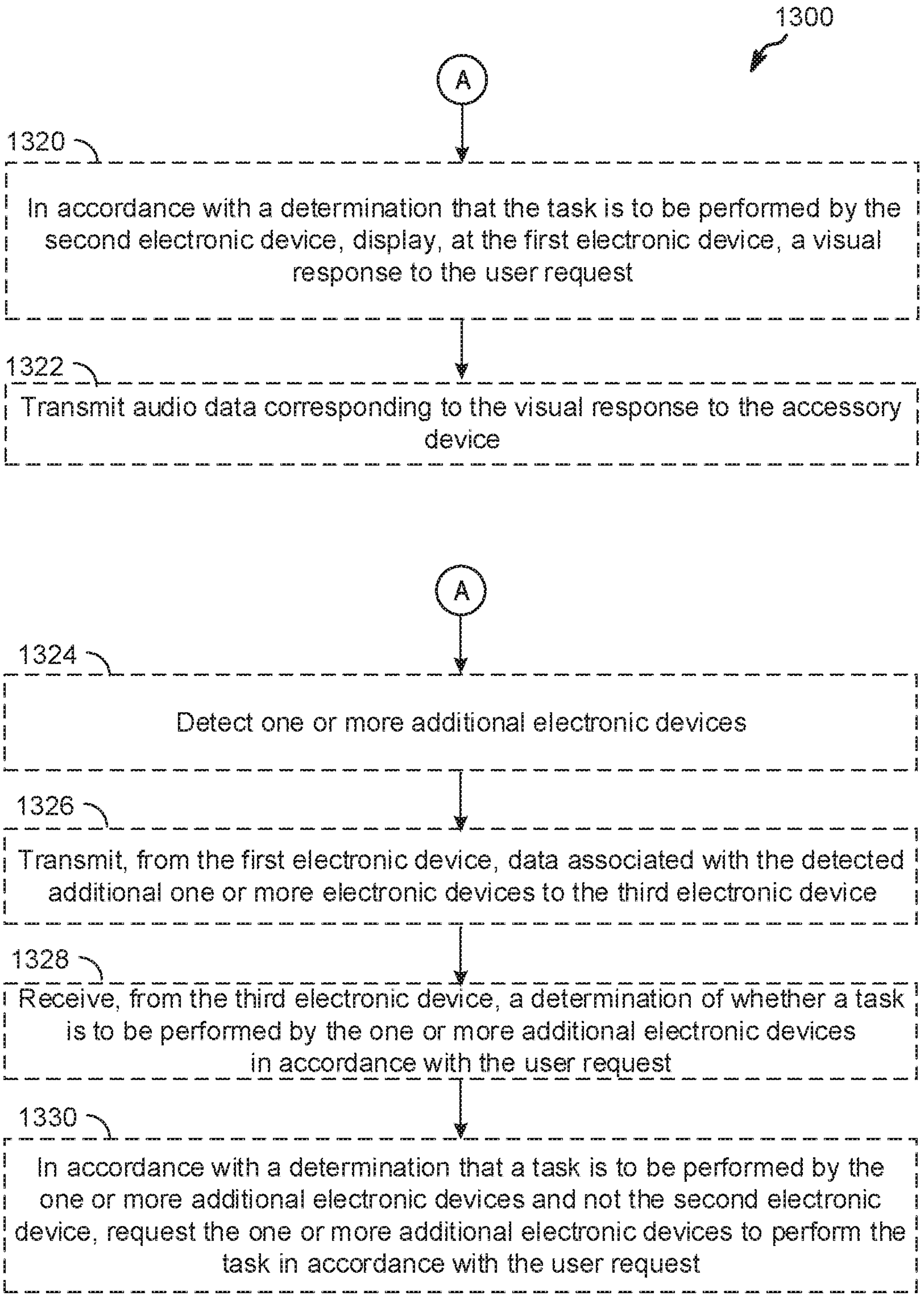

5. Processes for Providing Virtual Assistant Services and for Disambiguating a Speech Input FIGS. 13A-13B illustrate a flow diagram of an exemplary process 1300 for providing virtual assistant services in accordance with some embodiments. Process 1300 is performed, for example, using one or more electronic devices implementing one or more virtual assistants. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

As described above, processes described in this application include invoking a virtual assistant operating on an electronic device based on a speech input from an accessory device. As described herein, the user's speech input (or a representation thereof) to invoke a virtual assistant and to perform certain tasks can be received for intelligently and automatically selecting a particular electronic device among multiple devices for performing the task. Based on the selection, a command can be generated and intelligently and effectively routed to a particular electronic device that is capable or suitable to perform the requested tasks. The intelligent routing can be performed even if the particular electronic device is not communicatively coupled to the accessory device directly. The techniques described in this application thus provide an improved and more efficient human-machine interface by reducing or eliminating the burden for a user to manually or explicitly select a device for performing a task. The techniques thus improve the efficiency and the user-experience of a human-machine interface, and enhance the operability of the devices. This in turn reduces power usage and improves battery life of the accessory device and the electronic devices by enabling the user to use the devices more quickly and efficiently.

With reference to FIG. 13A, at block 1302, a representation of a speech input representing a user request is received from an accessory device (e.g., accessory device 820 shown in FIG. 8A) communicatively coupled to a first electronic device (e.g., device 800 such as a smartphone shown in FIG. 8A). At block 1304, a second electronic device (e.g., device 830 such as a wearable device shown in FIG. 8A) is detected. In some examples, the accessory device is a headphone capable of performing near-field communication. In some examples, the accessory device is wirelessly coupled to both the first electronic device and the second electronic device. In other examples, the accessory device is wirelessly coupled to the first electronic device, but not the second electronic device. Further, the first electronic device and the second electronic device are both capable of operating virtual assistants to process speech inputs. In some examples, the first electronic device is communicatively coupled to the second electronic device via near-field communication.

At block 1306, a graphical user interface indicating the receiving of the representation of the speech input is displayed at the first electronic device. As one example shown in FIG. 8A and described above, a message such as "What can I help you with?" is displayed on graphical user interface 826. At block 1308, a representation of the user request (e.g., a request to start a workout application as illustrated by FIG. 8B) and data associated with the detected second electronic device are transmitted from the first electronic device to a third electronic device (e.g., device 840 such as an NLP server shown in FIG. 8B). In some examples, the data associated with the detected second electronic device include one or more of: metadata of the detected second electronic device; capability data associated with the detected second electronic device; and user-specific data stored in the detected second electronic device. In some examples, the capability data associated with the first electronic device or the second comprises one or more of: device capability; application capability; and informational capability. The details of the capability data are described above and not repeatedly described here.

At block 1310, data associated with the first electronic device are transmitted from the first electronic device to a third electronic device. In some examples, the data associated with the first electronic device include one or more of: metadata of the first electronic device; capability data associated with the first electronic device; and user-specific data stored in first electronic device.

At block 1312, a determination of whether a task is to be performed by the second electronic device in accordance with the user request is received from the third electronic device. As an example described above with respect to FIG. 8C, device 840 (e.g., an NLP server) determines whether the task is to be performed by device 800 (e.g., a smartphone) or device 830 (e.g., a wearable device). In some examples, the determination of whether a task is to be performed by the second electronic device in accordance with the user request is performed at the third electronic device based on one or more of intent derived from the representation of the user request; capability data associated with at least one of the first electronic device and the second electronic device; and user-specific data. At block 1314, a command that causes the second electronic device to perform the task in accordance with the user request is received as at least a portion of the determination of whether a task is to be performed by second electronic device. Continuing with the example described above with respect to FIG. 8C, device 800 receives a determination from device 840 (e.g., an NLP server). The determination includes an identification of device 830 and a command that causes device 830 to perform the task of starting a workout application.

At block 1316, in accordance with a determination that a task is to be performed by the second electronic device, the second electronic device is requested to perform the task in accordance with the user request. At block 1318, requesting the second electronic device to perform the task includes transmitting the command to the second electronic device.

In the example illustrated in FIG. 8C, first electronic device 800 transmits the command for starting a workout application to second electronic device 830. In some examples, audio data corresponding to the performing of the task by the second electronic device are transmitted to the accessory device. For example, the audio data corresponding to the performing of the task in accordance with the user request can be transmitted directly from the second electronic device to the accessory device. As another example, the audio data corresponding to the performing of the task in accordance with the user request can be transmitted from the second electronic device to the accessory device through the first electronic device.

With reference to FIG. 13B, at block 1320, in accordance with a determination that the task is to be performed by the second electronic device, a visual response to the user request is displayed (e.g., a message such as "Workout started on your watch" as shown in FIG. 8C). At block 1322, audio data corresponding to the visual response are transmitted to the accessory device.

At block 1324, one or more additional electronic devices are detected. At block 1326, data associated with the detected additional one or more electronic devices are transmitted from the first electronic device to the third electronic device. At block 1328, a determination of whether a task is to be performed by the one or more additional electronic devices in accordance with the user request is received from the third electronic device. At block 1330, in accordance with a determination that a task is to be performed by the one or more additional electronic devices and not the second electronic device, the one or more additional electronic devices are requested to perform the task in accordance with the user request. In some examples, audio data corresponding to performing of the task by the one or more additional electronic device are transmitted to the accessory device. As described above, FIG. 12 illustrates an example of providing virtual assistant services at one of multiple electronic devices (e.g., devices 800, 830, 860, and 870) in response to a speech input received at an accessory device (e.g., device 820).

Figure 14A:
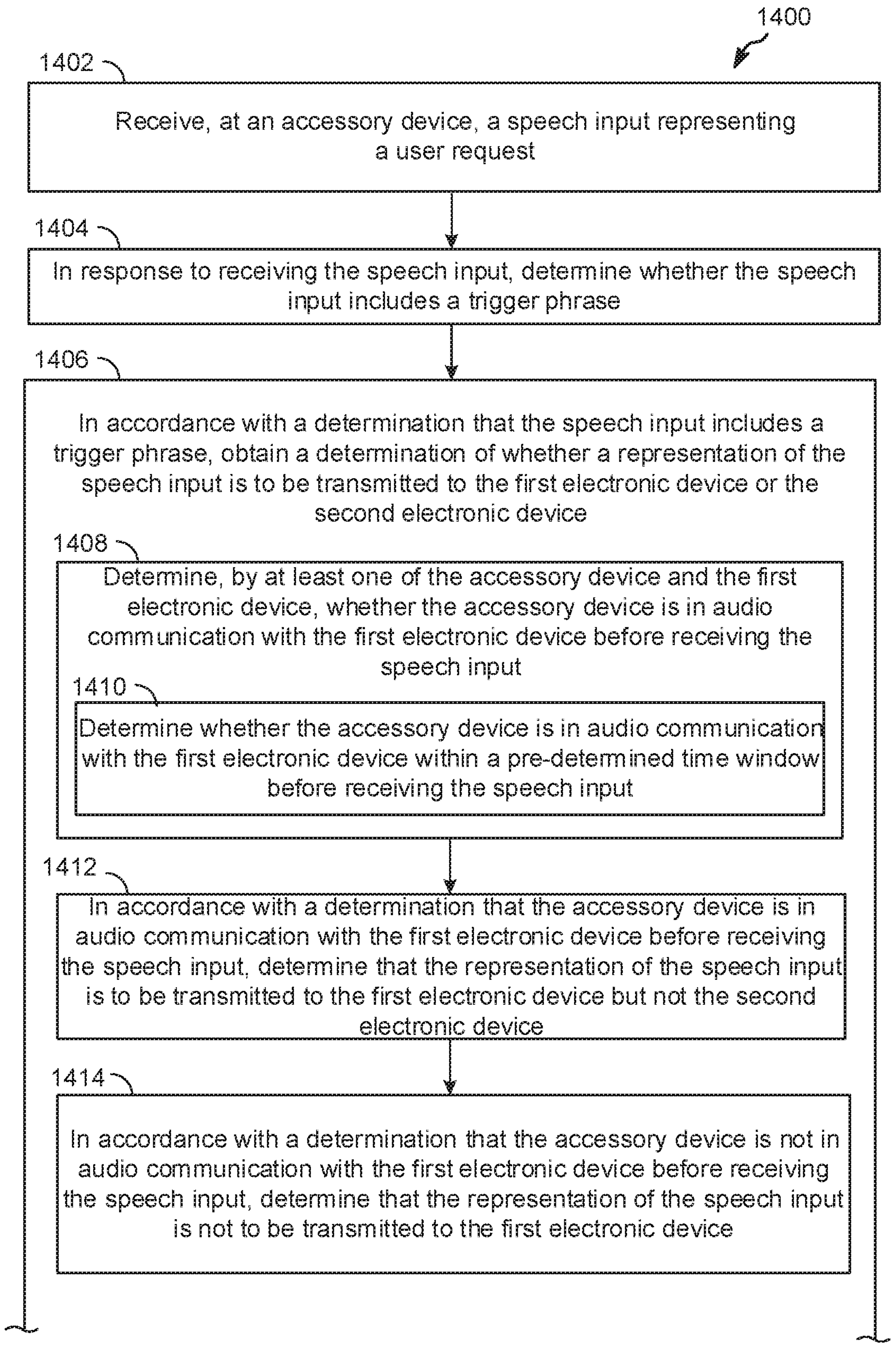
FIGS. 14A-14C illustrate a flow diagram of an exemplary process for disambiguating a speech input according to various examples.
Figure 14B:
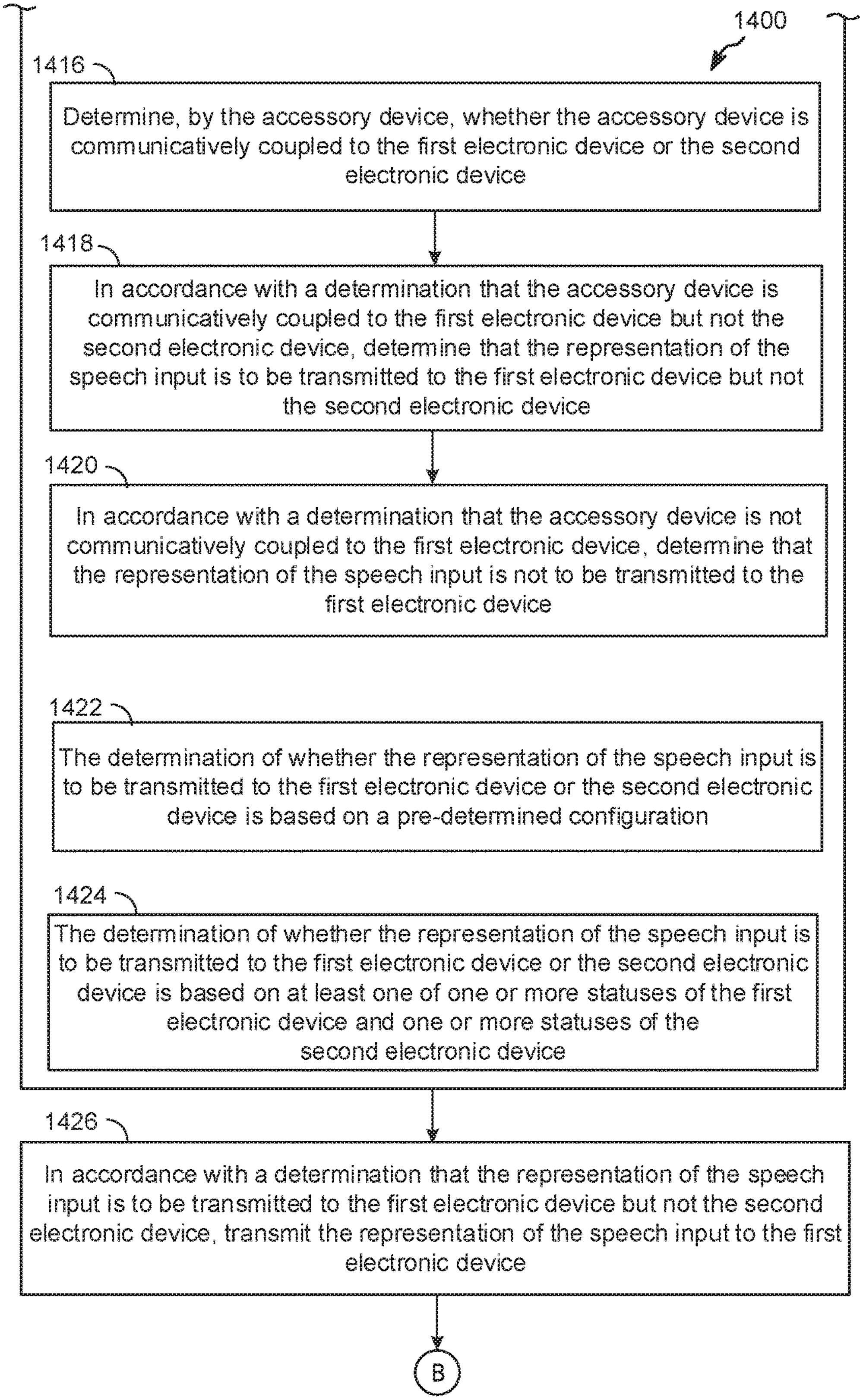

FIGS. 14A-14B illustrate a flow diagram of an exemplary process 1400 for disambiguating a speech input in accordance with some embodiments. Process 1400 is performed, for example, using one or more electronic devices implementing one or more virtual assistants. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

With reference to FIG. 14A, at block 1402, a speech input representing a user request is received at an accessory device (e.g., device 820 as shown in FIGS. 8A-8C, 9A-9C, 10A-10B, 11, and 12) communicatively coupled to at least one of a first electronic device (e.g., device 800 as shown in FIGS. 8A-8C, 9A-9C, 10A-10B, 11, and 12) and a second electronic device device 830 as shown in FIGS. 8A-8C, 9A-9C, 10A-10B, 11, and 12). In some examples, the accessory device is a headphone capable of performing near-field communication. In some examples, the accessory device is wirelessly coupled to both the first electronic device and the second electronic device. In other examples, the accessory device is wirelessly coupled to the first electronic device, but not the second electronic device. Further, the first electronic device and the second electronic device are both capable of operating virtual assistants to process speech inputs. In some examples, the first electronic device is communicatively coupled to the second electronic device via near-field communication.

At block 1404, in response to receiving the speech input, whether the speech input includes a trigger phrase is determined. For example, accessory device 820 as described above can determine whether a trigger phrase (e.g., "Hey Assistant") is included in the received speech input. At block 1406, in accordance with a determination that the speech input includes a trigger phrase, a determination of whether a representation of the speech input is to be transmitted to the first electronic device or the second electronic device is obtained. In some examples, to make such a determination, at block 1408, whether the accessory device is in audio communication with the first electronic device before receiving the speech input is determined by at least one of the accessory device and the first electronic device. At block 1410, whether the accessory device is in audio communication with the first electronic device within a pre-determined time window before receiving the speech input is determined. At block 1412, in accordance with a determination that the accessory device is in audio communication with the first electronic device before receiving the speech input, the representation of the speech input is determined to be transmitted to the first electronic device but not the second electronic device. At block 1414, in accordance with a determination that the accessory device is not in audio communication with the first electronic device before receiving the speech input, the representation of the speech input is determined not to be transmitted to the first electronic device. An example of the determination of whether a representation of the speech input is to be transmitted to the first electronic device or the second electronic device based on the last audio communication is described in detail above with respect to FIGS. 9A-9C.

With reference to FIG. 14B, in some examples, to determine whether a representation of the speech input is to be transmitted to the first electronic device or the second electronic device, at block 1416, whether the accessory device is wirelessly coupled to the first electronic device or the second electronic device is determined by the accessory device. At block 1418, in accordance with a determination that the accessory device is wirelessly coupled to the first electronic device but not the second electronic device, the representation of the speech input is determined to be transmitted to the first electronic device but not the second electronic device. At block 1420, in accordance with a determination that the accessory device is not wirelessly coupled to the first electronic device, the representation of the speech input is determined not to be transmitted to the first electronic device. An example of the determination of whether a representation of the speech input is to be transmitted to the first electronic device or the second electronic device based on the coupling status of the devices is described in detail above with respect to FIG. 10A.

At block 1422, the determination of whether the representation of the speech input is to be transmitted to the first electronic device or the second electronic device is based on a pre-determined configuration (e.g., a configuration that first electronic device 800 is the default device for receiving the representation of a speech input). At block 1424, the determination of whether the representation of the speech input is to be transmitted to the first electronic device or the second electronic device is based on at least one of one or more statuses of the first electronic device and one or more statuses of the second electronic device. An example of the determination of whether a representation of the speech input is to be transmitted to the first electronic device or the second electronic device based on the one or more statuses of the devices is described in detail above with respect to FIG. 10B.

At block 1426, in accordance with a determination that the representation of the speech input is to be transmitted to the first electronic device but not the second electronic device, the representation of the speech input is to be transmitted to the first electronic device.

Figure 14C:
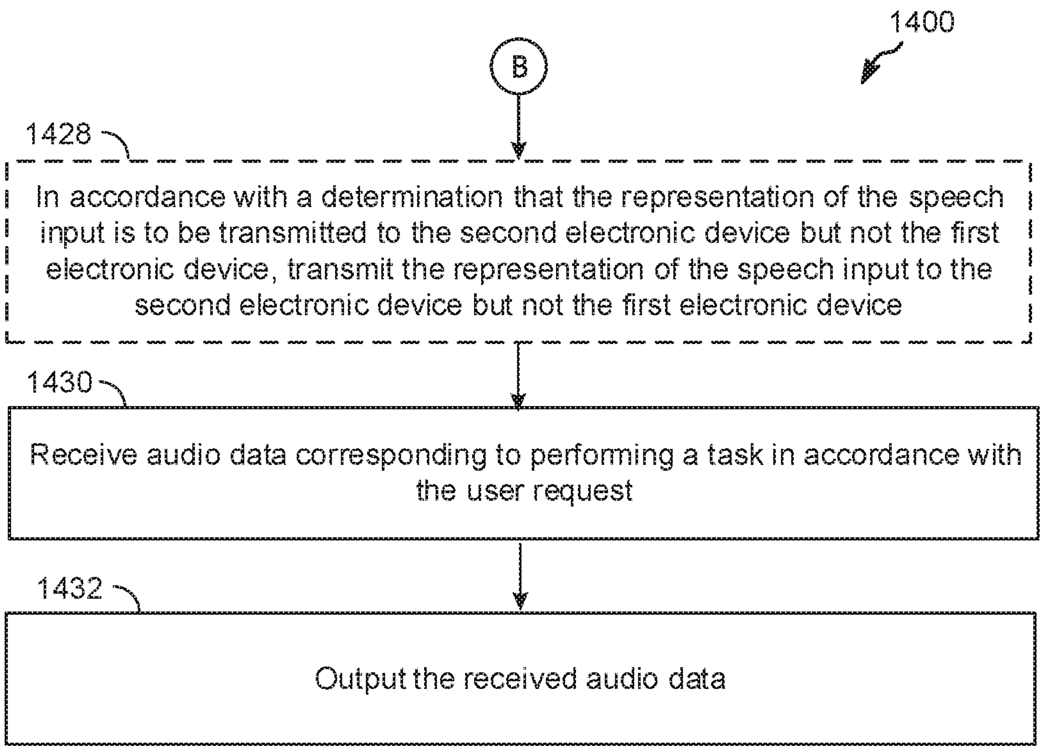

With reference to FIG. 14C, at block 1428, in accordance with a determination that the representation of the speech input is to be transmitted to the second electronic device but not the first electronic device, the representation of the speech input is transmitted to the second electronic device but not the first electronic device. One example of transmitting the representation of the speech input to the second electronic device is described in detail above with respect to FIG. 11.

At block 1430, audio data corresponding to performing a task in accordance with the user request are received at the accessory device. At block 1432, the received audio data are outputted. In some embodiments, a third electronic device determines whether the task is to be performed by the first electronic device or the second electronic device. The determination of whether the task is to be performed by the first electronic device or the second electronic device is based on one or more of: intent derived from the representation of the user request; capability data associated with at least one of the first electronic device and the second electronic device; and user-specific data. The capability data comprises one or more of: device capability; application capability; and informational capability. In some examples, the first electronic device is communicatively coupled to one or more additional electronic devices. Audio data corresponding to performing the task in accordance with the user request are received at the accessory device. A third electronic device determines whether the task is to be performed by one of the additional electronic device.

The operations described above with reference to FIGS. 13A-13B and 14A-14C are optionally implemented by components depicted in FIGS. 1-4, 6A-B, and 7A-C. For example, the operations of processes 1300 and/or 1400 may be implemented by digital assistant module 726. It would be clear to a person having ordinary skill in the art how other processes are implemented based on the components depicted in FIGS. 1-4, 6A-B, and 7A-C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to determine which electronic device is to perform the task user requested through an accessory device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine which electronic device is to perform the task user requested. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gathering user-specific data, the present technology can be configured to allow users to select to "opt in" or "opt out" of participation in the collection of personal information data during registration for services or anytime thereafter. In another example, users can select not to include any personal data in the user-specific data. In yet another example, users can select to limit the length of time personal data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user-specific data can be gathered based on non-personal information data or a bare minimum amount of personal information data, such as the content being requested by the device associated with a user, other non-personal information available to the electronic device gathering the user-specific data, or publicly available information.

What is claimed is:

1. A first electronic device, comprising:
- one or more processors;
- a microphone; and
- memory storing one or more programs configured to be executed by the one or more processors, the one or more programs including instructions for:
  - receiving, from an accessory device directly communicatively coupled to both the first electronic device and a second electronic device via near-field communication, a representation of a speech input representing a user request;
  - detecting the second electronic device;
  - transmitting, from the first electronic device, a representation of the user request and data associated with the detected second electronic device to a third electronic device;
  - receiving, from the third electronic device, a determination of whether a task is to be performed by the second electronic device in accordance with the user request; and
  - in accordance with a determination that a task is to be performed by the second electronic device, requesting the second electronic device to perform the task in accordance with the user request.

2. The first electronic device of claim 1, wherein the accessory device is a headphone.

3. The first electronic device of claim 1, wherein the first electronic device and the second electronic device are both capable of operating virtual assistants to process speech inputs.

4. The first electronic device of claim 1, wherein the first electronic device is communicatively coupled to the second electronic device via near-field communication.

5. The first electronic device of claim 1, wherein the one or more programs comprise further instructions for, prior to transmitting the representation of the user request and data associated with the detected second electronic device:
- displaying, at the first electronic device, a graphical user interface indicating the receiving of the representation of the speech input.

6. The first electronic device of claim 1, wherein the data associated with the detected second electronic device comprise one or more of:
- metadata of the detected second electronic device;
- capability data associated with the detected second electronic device; and
- user-specific data stored in the detected second electronic device.

7. The first electronic device of claim 6, wherein the capability data associated with the first electronic device or the second electronic device comprises one or more of:
- device capability;
- application capability; and
- informational capability.

8. The first electronic device of claim 6, wherein the one or more programs comprise further instructions for:
- transmitting, from the first electronic device, data associated with the first electronic device to the third electronic device, wherein the data associated with the first electronic device comprise one or more of:
- metadata of the first electronic device;
- capability data associated with the first electronic device; and
- user-specific data stored in the first electronic device.

9. The first electronic device of claim 1, wherein the determination of whether a task is to be performed by the second electronic device in accordance with the user request is performed at the third electronic device based on one or more of:

intent derived from the representation of the user request;

capability data associated with at least one of the first electronic device and the second electronic device; and user-specific data.

10. The first electronic device of claim 1, wherein receiving the determination of whether a task is to be performed by the second electronic device comprises:

receiving a command that causes the second electronic device to perform the task in accordance with the user request.

11. The first electronic device of claim 10, wherein requesting the second electronic device to perform the task in accordance with the user request comprises:

transmitting the command to the second electronic device.

12. The first electronic device of claim 1, wherein audio data corresponding to the performing of the task by the second electronic device are transmitted to the accessory device.

13. The first electronic device of claim 12, further comprising: in accordance with the determination that the task is to be performed by the second electronic device, the audio data corresponding to the performing of the task in accordance with the user request are transmitted directly from the second electronic device to the accessory device.

14. The first electronic device of claim 12, wherein the audio data corresponding to the performing of the task in accordance with the user request are transmitted from the second electronic device to the accessory device through the first electronic device.

15. The first electronic device of claim 1, wherein the one or more program comprise further instructions for: in accordance with a determination that the task is to be performed by the second electronic device:

displaying, at the first electronic device, a visual response to the user request; and transmitting audio data corresponding to the visual response directly to the accessory device from the second electronic device.

16. The first electronic device of claim 1, wherein the one or more program comprise further instructions for:

detecting one or more additional electronic devices;

transmitting, from the first electronic device, data associated with the detected additional one or more electronic devices to the third electronic device;

receiving, from the third electronic device, a determination of whether a task is to be performed by the detected one or more additional electronic devices in accordance with the user request; and in accordance with a determination that a task is to be performed by the detected one or more additional electronic devices and not the second electronic device, requesting the detected one or more additional electronic devices to perform the task in accordance with the user request.

17. The first electronic device of claim 16, wherein audio data corresponding to performing of the task by the detected one or more additional electronic devices are transmitted to the accessory device.

18. A non-transitory computer-readable storage medium storing one or more programs configured to be executed by one or more processors of a first electronic device, the one or more programs including instructions for:

receiving, from an accessory device directly communicatively coupled to both the first electronic device and a second electronic device via near-field communication, a representation of a speech input representing a user request;

detecting the second electronic device;

transmitting, from the first electronic device, a representation of the user request and data associated with the detected second electronic device to a third electronic device;

receiving, from the third electronic device, a determination of whether a task is to be performed by the second electronic device in accordance with the user request; and in accordance with a determination that a task is to be performed by the second electronic device, requesting the second electronic device to performed the task in accordance with the user request.

19. The computer-readable storage medium of claim 18, wherein the accessory device is a headphone.

20. The computer-readable storage medium of claim 18, wherein the data associated with the detected second electronic device comprise one or more of:

metadata of the detected second electronic device;

capability data associated with the detected second electronic device; and user-specific data stored in the detected second electronic device.

21. The computer-readable storage medium of claim 20, wherein the capability data associated with the first electronic device or the second electronic device comprises one or more of:

device capability;

application capability; and informational capability.

22. The computer-readable storage medium of claim 20, where in the one or more programs comprise further instructions for:

transmitting, from the first electronic device, data associated with the first electronic device to the third electronic device, wherein the data associated with the first electronic device comprise one or more of:

metadata of the first electronic device;

capability data associated with the first electronic device; and user-specific data stored in the first electronic device.

23. The computer-readable storage medium of claim 18, wherein the determination of whether a task is to be performed by the second electronic device in accordance with the user request is performed at the third electronic device based on one or more of:

intent derived from the representation of the user request;

capability data associated with at least one of the first electronic device and the second electronic device; and user-specific data.

24. The computer-readable storage medium of claim 18, wherein receiving the determination of whether a task is to be performed by the second electronic device comprises: receiving a command that causes the second electronic device to perform the task in accordance with the user request.

25. The computer-readable storage medium of claim 24, wherein requesting the second electronic device to perform the task in accordance with the user request comprises:

transmitting the command to the second electronic device.

26. The computer-readable storage medium of claim 18, wherein audio data corresponding to the performing of the task by the second electronic device are transmitted to the accessory device.

27. The computer-readable storage medium of claim 26, further comprising:

in accordance with the determination that the task is to be performed by the second electronic device, the audio data corresponding to the performing of the task in accordance with the user request device are transmitted directly from the second electronic device to the accessory device.

28. The computer-readable storage medium of claim 18, wherein the one or more programs comprise further instructions for: in accordance with a determination that the task is to be performed by the second electronic device:

displaying, at the first electronic device, a visual response to the user request; and transmitting audio data corresponding to the visual response directly to the accessory device from the second electronic device.

29. The computer-readable storage medium of claim 18, wherein the one or more programs comprise further instructions for:

detecting one or more additional electronic devices;

transmitting, from the first electronic device, data associated with the detected additional one or more electronic devices to the third electronic device;

receiving, from the third electronic device, a determination of whether a task is to be performed by the detected one or more additional electronic devices in accordance with the user request; and in accordance with a determination that a task is to be performed by the detected one or more additional electronic devices and not the second electronic device, requesting the detected one or more additional electronic devices to perform the task in accordance with the user request.

30. The computer-readable storage medium of claim 29, wherein audio data corresponding to performing of the task by the detected one or more additional electronic devices are transmitted to the accessory device.

31. A method for providing a virtual assistant service, comprising:

at a first electronic device with one or more processors and memory:

receiving, from an accessory device directly communicatively coupled to both the first electronic device and a second electronic device via near-field communication, a representation of a speech input representing a user request;

detecting the second electronic device;

transmitting, from the first electronic device, a representation of the user request and data associated with the detected second electronic device to a third electronic device;

receiving, from the third electronic device, a determination of whether a task is to be performed by the second electronic device in accordance with the user request; and in accordance with a determination that a task is to be performed by the second electronic device, requesting the second electronic device to performed the task in accordance with the user request.

32. The method of claim 31, wherein the accessory device is a headphone.

33. The method of claim 31, wherein the data associated with the detected second electronic device comprise one or more of:

metadata of the detected second electronic device;

capability data associated with the detected second electronic device; and user-specific data stored in the detected second electronic device.

34. The method of claim 33, wherein the capability data associated with the first electronic device or the second electronic device comprises one or more of:

device capability;

application capability; and informational capability.

35. The method of claim 33, further comprising:

transmitting, from the first electronic device, data associated with the first electronic device to the third electronic device, wherein the data associated with the first electronic device comprise one or more of:

metadata of the first electronic device;

capability data associated with the first electronic device; and user-specific data stored in the first electronic device.

36. The method of claim 31, wherein the determination of whether a task is to be performed by the second electronic device in accordance with the user request is performed at the third electronic device based on one or more of:

intent derived from the representation of the user request;

capability data associated with at least one of the first electronic device and the second electronic device; and user-specific data.

37. The method of claim 31, wherein receiving the determination of whether a task is to be performed by the second electronic device comprises:

receiving a command that causes the second electronic device to perform the task in accordance with the user request.

38. The method of claim 37, wherein requesting the second electronic device to perform the task in accordance with the user request comprises:

transmitting the command to the second electronic device.

39. The method of claim 31, wherein audio data corresponding to the performing of the task by the second electronic device are transmitted to the accessory device.

40. The method of claim 39, further comprising:

in accordance with the determination that the task is to be performed by the second electronic device, the audio data corresponding to the performing of the task in accordance with the user request device are transmitted directly from the second electronic device to the accessory device.

41. The method of claim 31, further comprising: in accordance with a determination that the task is to be performed by the second electronic device:

displaying, at the first electronic device, a visual response to the user request; and transmitting audio data corresponding to the visual response directly to the accessory device from the second electronic device.

42. The method of claim 31, further comprising:

detecting one or more additional electronic devices;

transmitting, from the first electronic device, data associated with the detected additional one or more electronic devices to the third electronic device;

receiving, from the third electronic device, a determination of whether a task is to be performed by the detected one or more additional electronic devices in accordance with the user request; and in accordance with a determination that a task is to be performed by the detected one or more additional electronic devices and not the second electronic device, requesting the detected one or more additional electronic devices to perform the task in accordance with the user request.

43. The method of claim 42, wherein audio data corresponding to performing of the task by the detected one or more additional electronic devices are transmitted to the accessory device.

* * * * *

UNITED STATES PATENT AND TRADEMARK OFFICE
CERTIFICATE OF CORRECTION

PATENT NO. : 11,495,218 B2
APPLICATION NO. : 16/119576
DATED : November 8, 2022
INVENTOR(S) : Brandon J. Newendorp et al.

It is certified that error appears in the above-identified patent and that said Letters Patent is hereby corrected as shown below:

In the Claims

Column 66, Line 39: In Claim 22, delete "where in" and insert -- wherein --, therefor.

Signed and Sealed this
Twelfth Day of September, 2023

Katherine Kelly Vidal
*Director of the United States Patent and Trademark Office*